United States Patent
Aoki et al.

(10) Patent No.: US 12,047,004 B2
(45) Date of Patent: Jul. 23, 2024

(54) LIGHT-EMITTING ELEMENT DRIVING CONTROL DEVICE AND LIGHT-EMITTING ELEMENT DRIVING CIRCUIT DEVICE

(71) Applicant: Rohm Co., Ltd., Kyoto (JP)

(72) Inventors: Akira Aoki, Kyoto (JP); Ryo Takagi, Kyoto (JP)

(73) Assignee: Rohm Co., Ltd.

( * ) Notice: Subject to any disclaimer, the term of this patent is extended or adjusted under 35 U.S.C. 154(b) by 0 days.

(21) Appl. No.: 18/357,377

(22) Filed: Jul. 24, 2023

(65) Prior Publication Data

US 2023/0369980 A1    Nov. 16, 2023

Related U.S. Application Data

(62) Division of application No. 17/903,491, filed on Sep. 6, 2022, now Pat. No. 11,764,683, which is a division
(Continued)

(30) Foreign Application Priority Data

| Jan. 29, 2018 | (JP) | 2018-012886 |
| Jan. 29, 2018 | (JP) | 2018-012892 |
| Jun. 1, 2018 | (JP) | 2018-106203 |

(51) Int. Cl.
    *H02M 3/158*  (2006.01)
    *H02M 1/00*   (2007.01)
    (Continued)

(52) U.S. Cl.
    CPC ........ *H02M 3/1588* (2013.01); *H05B 45/305* (2020.01); *H05B 45/375* (2020.01);
    (Continued)

(58) Field of Classification Search
    CPC ...... H02M 3/156; H02M 1/0009; H02M 3/07; H02M 3/158; H02M 3/1582;
    (Continued)

(56) References Cited

U.S. PATENT DOCUMENTS 9,577,063 B2    2/2017  Chi et al.
9,774,253 B2 *  9/2017  Xu ........................ H02M 3/156
(Continued)

FOREIGN PATENT DOCUMENTS

| CN | 101277571 | 10/2008 |
| CN | 101621876 | 1/2010 |

(Continued)

OTHER PUBLICATIONS

Author: Stoeger; Christian, Title: Driver Circuit for a Light-Emitting Diode Arrangement, Lighting Apparatus and Motor Vehicle (DE 102017214056.9), Date: Aug. 11, 2017 (Original) (Year: 2017).
(Continued)

*Primary Examiner* — Wei (Victor) Y Chan
(74) *Attorney, Agent, or Firm* — Fish & Richardson P.C.

(57) ABSTRACT

This light-emitting element drive control device (100) comprises: a drive logic unit (113) which performs a drive control of a switch output stage (N1, D1, L1) for dropping an input voltage (VIN) to an output voltage (VOUT) and supplying a light-emitting element therewith; a charge-pump power supply unit (α) which generates a step-up voltage (CP) higher than the input voltage (VIN); and a current detecting comparator (114) which receives a supply of the step-up voltage (CP) and the output voltage (VOUT) as power supply voltages, and generates control signals (SET, RST) for the drive logic unit (113) by directly comparing a current detection signal (Vsns) corresponding
(Continued)

to an inductor current (IL) of the switch output stage with a peak detection value (Vsns_pk) and a bottom detection value (Vsns_bt).

17 Claims, 36 Drawing Sheets

Related U.S. Application Data of application No. 16/963,734, filed as application No. PCT/JP2019/002081 on Jan. 23, 2019, now Pat. No. 11,502,608.

(51) Int. Cl.
*H05B 45/305* (2020.01)
*H05B 45/375* (2020.01)
*H05B 45/38* (2020.01)

(52) U.S. Cl.
CPC .......... *H05B 45/38* (2020.01); *H02M 1/0006* (2021.05); *H02M 1/0009* (2021.05)

(58) Field of Classification Search
CPC .. H02M 3/1584; H02M 3/157; H02M 1/0025; H02M 3/1566; H02M 3/1588; H02M 1/34; H02M 3/00
See application file for complete search history.

(56) References Cited

U.S. PATENT DOCUMENTS

| | | | |
|---|---|---|---|
| 11,502,608 B2 | 11/2022 | Aoki et al. | |
| 11,764,683 B2 | 9/2023 | Aoki et al. | |
| 2002/0067139 A1* | 6/2002 | Sabate | H05B 41/392 315/224 |
| 2010/0134029 A1 | 6/2010 | Gao | |
| 2011/0205770 A1 | 8/2011 | Isogai et al. | |
| 2011/0285313 A1 | 11/2011 | Naito et al. | |
| 2012/0181931 A1 | 7/2012 | Katsura et al. | |
| 2013/0320949 A1 | 12/2013 | Prexl et al. | |
| 2014/0159598 A1 | 6/2014 | Boezen | |
| 2016/0126848 A1 | 5/2016 | Sasaki | |
| 2016/0218194 A1 | 7/2016 | Chi et al. | |
| 2017/0201086 A1* | 7/2017 | Chen | H03K 3/017 |
| 2018/0178710 A1 | 6/2018 | Ichikawa et al. | |
| 2019/0053341 A1 | 2/2019 | Stoeger et al. | |
| 2019/0098710 A1 | 3/2019 | Murakami et al. | |
| 2019/0110349 A1* | 4/2019 | Tsukahara | G03B 21/2053 |
| 2020/0272040 A1* | 8/2020 | Yamamoto | H04N 9/3155 |
| 2020/0305245 A1* | 9/2020 | Yamada | G03B 21/2053 |
| 2021/0100082 A1 | 4/2021 | Aoki et al. | |
| 2022/0416667 A1 | 12/2022 | Aoki et al. | |

FOREIGN PATENT DOCUMENTS

| | | |
|---|---|---|
| CN | 102163920 | 8/2011 |
| CN | 102254526 | 11/2011 |
| CN | 103874283 | 6/2014 |
| JP | 2008-251276 | 10/2008 |
| JP | 2009-302295 | 12/2009 |
| JP | 2012-160436 | 8/2012 |
| JP | 2013-093214 | 5/2013 |
| JP | 2015-076363 | 4/2015 |
| JP | 2016-092955 | 5/2016 |
| WO | WO 2017-022633 | 2/2017 |

OTHER PUBLICATIONS

Author: Stoeger; Christian, Title: Driver Circuit for a Light-Emitting Diode Arrangement, Lighting Apparatus and Motor Vehicle (DE 102017214056.9), Date: Aug. 11, 2017 (Translation) (Year: 2017).

Japan Patent Office, International Search Report for PCT/JP2019/002081, dated Mar. 19, 2019 with English translation.

* cited by examiner

LIGHT-EMITTING ELEMENT DRIVING CONTROL DEVICE AND LIGHT-EMITTING ELEMENT DRIVING CIRCUIT DEVICE

CROSS-REFERENCE TO RELATED APPLICATIONS

This application is a divisional application of U.S. application Ser. No. 17/903,491, filed Sep. 6, 2022, which is a divisional of U.S. application Ser. No. 16/963,734, filed Jul. 21, 2020, which is a U.S. National Phase application under 35 U.S.C. § 371 of International Patent Application No. PCT/JP2019/002081, filed on Jan. 23, 2019, which claims the priority of Japanese Patent Application Nos. JP2018-106203, filed on Jun. 1, 2018; JP2018-012892, filed Jan. 29, 2018; and JP2018-012886, filed Jan. 29, 2018, the disclosures of which are incorporated herein by reference in their entirety.

TECHNICAL FIELD

The invention disclosed in the present description relates to a light-emitting element driving control device, and also to a light-emitting element driving circuit device that is driven by a switching regulator.

BACKGROUND ART

Conventionally, light-emitting element driving control devices (e.g., LED (light-emitting diode) driver controller ICs) that have the function of keeping the output current supplied to a light-emitting element at a predetermined target value through hysteresis control of an inductor current passing through a switching output stage have been in practical use.

One example of conventional technology related to what is mentioned above is seen in Patent Document 1 identified below.

Switching regulators are used as driving voltage sources in a variety of applications, and are employed as driving voltage sources for driving circuit devices for light-emitting elements (hereinafter referred to as LEDs). Many light-emitting element driving circuit devices even have a circuit function of sensing connection status. Here, connection status refers to the presence of absence of a broken line or a short circuit in an LED itself, a broken line or a short circuit in an electrical connection path between an LED and the outside, an open state associated with the mounting of an LED module on a printed circuit board, and the like.

Patent Document 2 identified below discloses a fault detection device for a light-emitting diode circuit. FIG. 7 of Patent Document 2 identified below shows a state where a current sense resistor is connected in series with a load circuit and the variation of the terminal-to-terminal voltage across the resistor is sensed with a broken-line detection circuit. If any one LED is faulty with a broken line, the output terminal of a direct-current constant-current power supply is left unloaded so that the current through the load circuit is zero; thus, the terminal-to-terminal voltage across the current sense resistor is 0 volts. This is exploited to detect a broken-line fault.

Patent Document 3 identified below discloses a fault detection device and a fault detection system for a backlight. The fault detection device of Patent Document 3 includes a fault detector that, when a fault is detected in a backlight driving circuit, generates fault notification pulses, which constitute a PWM signal with a duty ratio reflecting the kind of the fault detected, to notify a controller. The fault detector confirms the detected fault when the faulty state lasts for a predetermined time or more.

Patent Document 4 identified below discloses a switching converter, a control circuit and a control method for it, and a lighting device and an electronic appliance employing it. The switching converter of Patent Document 4 includes an inductor, a switching transistor, and a sense resistor that are connected in series between an output line and a ground line. The control circuit includes: a first comparator that, when a current sense signal commensurate with a voltage drop across the sense resistor exceeds a first threshold value, asserts a reset pulse; a second comparator that, when the current sense signal exceeds a second threshold value, asserts a comparison signal; and a fault detection circuit that takes as a fault detection period the period after the switching transistor turns on until a first time elapses and that, when the comparison signal is asserted during the fault detection period, confirms a fault.

CITATION LIST

Patent Literature

Patent Document 1: WO 2017/022633
Patent Document 2: JP-A-2008-251276
Patent Document 3: JP-A-2015-76363
Patent Document 4: JP-A-2016-92955

SUMMARY OF INVENTION

Technical Problem

Inconveniently, conventional light-emitting element driving control devices leave room for improvement in terms of their output current accuracy.

In view of the above-mentioned inconvenience encountered by the present inventors, an object of the invention disclosed in the present description is to provide light-emitting element driving control devices with high output current accuracy.

Light-emitting element driving circuit devices according to what is disclosed in the present description belong to much the same technical field as that to which Patent Documents 2 to 4 belong. Specifically, the invention disclosed in the present description offers light-emitting element driving circuit devices that have the function of sensing connection status such as the presence or absence of an open and a short circuit in the electrical connection of an LED. The present inventors tried two methods for sensing such connection status. The first method was one involving, as Patent Document 3 suggests, sensing the connection status of the switching voltage of a switching regulator for driving an LED to measure the time. The second method was one involving, as Patent Documents 2 and 4 suggest, sensing the current passing through an LED with a current sense resistor to detect, for example, an open state. However, the present inventors came to realize that those methods are not necessarily suitable to sense the connection status of an LED. Specifically, the first method does not sense the current passing through the LED, and this results in low sensing accuracy. The second method suffers from, when a switching regulator is used as a driving voltage source for the light-emitting element driving circuit device, ringing due to resonance in an inductor, a capacitor, or the like that is indispensable in the circuit configuration, and the ringing degrades the sensing accuracy of the current passing through the LED.

Devised to overcome the problems mentioned above, the invention disclosed in the present description provides a light-emitting element driving circuit device that employs a method of determining the connection status of an LED based on a combination of two sensing results yielded by a time-based determination method involving the measurement of the durations of the high-level and low-level states of a switching signal on the output side of a switching regulator and a determination method involving the sensing of the current that passes through a switching terminal.

Solution to Problem

According to one aspect of what is disclosed in the present description, a light-emitting element driving control device includes: a driving logic circuit configured to drive and control a switching output stage configured to buck an input voltage to an output voltage to supply the output voltage to a light-emitting element; a charge-pump power supply configured to generate a boosted voltage higher than the input voltage; and a current sense comparator configured to be supplied with, as a supply voltage, the boosted voltage and the output voltage and to compare a current sense signal commensurate with an inductor current in the switching output stage directly with a peak detection value and a bottom detection value to generate a control signal for the driving logic circuit.

According to another aspect of what is disclosed in the present description, a light-emitting element driving control device includes: a driving logic circuit configured to drive and control a switching output stage configured to generate an output voltage from an input voltage to supply the output voltage to a light-emitting element; a current sense comparator configured to compare a current sense signal commensurate with an inductor current in the switching output stage with a peak detection value and a bottom detection value to generate a control signal for the driving logic circuit; and a current adjuster configured to adjust, in accordance with a first time after the current sense signal reaches one of the peak detection value and the bottom detection value until the inductor current actually takes one of its extremal values, the other extremal value of the inductor current.

According to yet another aspect of what is disclosed in the present description, a light-emitting element driving circuit device includes: a high-side transistor and a low-side transistor of which the main conducting paths (drain-source channels) are connected in series in the named order between a power terminal and a ground potential; a clock signal generator configured to generate a clock signal that drives the high-side and low-side transistors to turn them on and off complementarily; an inductor, a current sense resistor, and a capacitor connected in series between the common connection node of the high-side and low-side transistors and the ground potential and supplied with a current by a switching signal appearing at the common connection node; a light-emitting element connected to a voltage source appearing at one terminal of the capacitor; a first comparator configured to sense the voltage appearing across the terminals of the current sense resistor; a light-emitting element current sense circuit configured to sense the light-emitting element current passing through the current sense resistor; and a duration determining circuit configured to measure the duration of the high level or the low level in the switching signal. The light-emitting element driving circuit device gives out a notification as to whether the connection status of the light-emitting element is good or bad based on the comparator output signal from the first comparator and the output from the duration determining circuit.

These and other features, elements, steps, benefits, and characteristics of the present invention will become clear from the following description of preferred embodiments taken in conjunction with the accompanying drawings.

Advantageous Effects of Invention

According to one aspect of the invention disclosed in the present description, it is possible to provide a light-emitting element driving control device with high output current accuracy.

According to another aspect of what is disclosed in the present description, a light-emitting element driving circuit device offers higher connection status determination accuracy because it determines the presence or absence of connection by sensing two targets: variation with time of the switching signal of a switching regulator and variation with time of the output current (load current).

DESCRIPTION OF EMBODIMENTS

LED Light-Emitting Device

Figure 1:
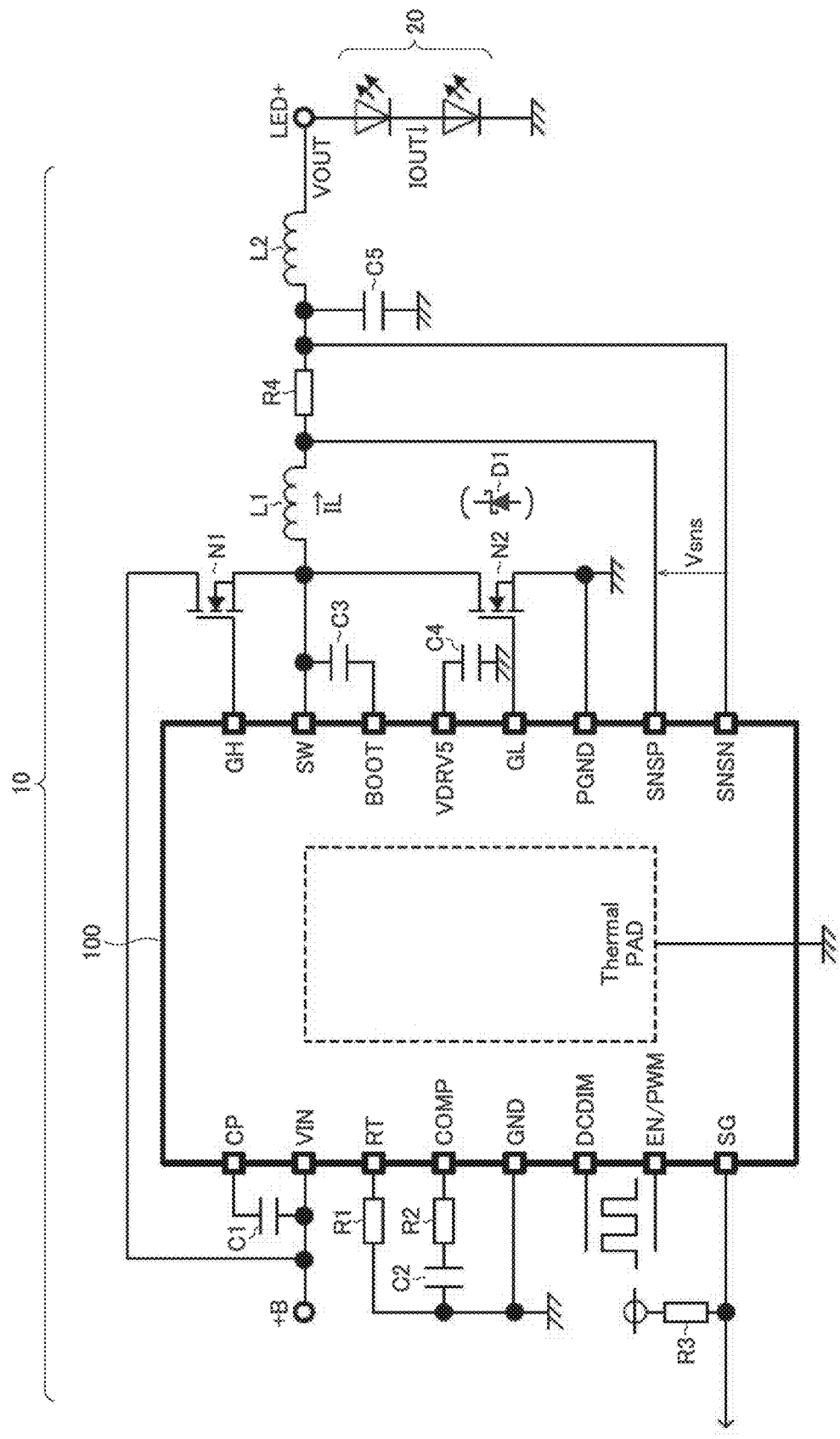
FIG. 1 is a diagram showing an overall configuration of an LED light-emitting device.

FIG. 1 is a diagram showing an overall configuration of an LED light-emitting device. The LED light-emitting device 1 of this configuration example includes an LED driving device 10 and at least one LED (in the diagram, an LED string 20 composed of a plurality of LEDs connected in series) that is driven by the LED driving device 10.

LED Driving Device

With reference still to FIG. 1, the LED driving device 10 will be described. The LED driving device 10 in this configuration example includes an LED driving control device 100 and various discrete components externally connected to it (N-channel MOS (metal-oxide-semiconductor) field-effect transistors N1 and N2, resistors R1 to R4, capacitors C1 to C5, and inductors L1 and L2). The LED driving device 10 supplies the LED string 20 with a constant output current IOUT.

The LED driving control device 100 is a silicon monolithic integrated circuit (what is generally called an LED driver-controller IC) that acts as the main controlling agent in the LED driving device 10. The LED driving control device 100 has, for establishing electrical connection with the outside, 16 external terminals (a CP pin, a VIN pin, an RT pin, a COMP pin, a GND pin, a DCDIM pin, an EN/PWM pin, an SG pin, an SNSN pin, an SNSP pin, a PGND pin, a GL pin, a VDRV5 pin, a BOOT pin, a SW pin, and a GH pin).

The CP pin (pin-1) is a terminal for connection with an externally connected capacitor for charge pumping. The VIN pin (pin-2) is a power input terminal. The RT pin (pin-3) is a terminal for connection with an externally connected resistor for setting a switching frequency. The COMP pin (pin-4) is a terminal for connection with a phase-compensation capacitor for frequency stabilization. The GND pin (pin-5) is a ground terminal. The DCDIM pin (pin-6) is a DC dimming input terminal. The EN/PWM pin (pin-7) is an enable input/PWM (pulse-width modulation) dimming input terminal. The SG pin (pin-8) is an open-drain terminal for output of a normal-state flag. The SNSN pin (pin-9) is an input terminal (−) for inductor-current sensing. The SNSP pin (pin-10) is an input terminal (+) for inductor-current sensing. The PGND pin (pin-11) is a ground terminal for the power system. The GL pin (pin-12) is an output terminal for driving the gate of a low-side NMOSFET. The VDRV5 pin (pin-13) is an output terminal for an internal reference voltage. The BOOT pin (pin-14) is a terminal for connection with an externally connected bootstrap capacitor for a high-side driver power supply. The SW pin (pin-15) is an input terminal for a high-side driver reference voltage. The GH pin (pin-16) is an output terminal for driving the gate of a high-side NMOSFET.

Usable as the package of the LED driving control device 100 is, for example, an HTSSOP (heat-sink thin shrink small outline package) provided with a heat-dissipating pad on the bottom face.

Next, the external connection of the LED driving control device 100 will be described. The CP pin is connected to the first terminal of the capacitor C1. The VIN pin is connected to each of a power terminal +B (e.g., the positive-pole terminal of a battery), the second terminal of the capacitor C1, and the drain of the transistor N1. The RT pin is connected to the first terminal of the resistor R1. The second terminal of the resistor R1 is connected to a grounded terminal. The COMP pin is connected to the first terminal of the resistor R2. The second terminal of the resistor R2 is connected to the first terminal of the capacitor C2. The second terminal of the capacitor C2 is connected to the grounded terminal. The GND pin is connected to the grounded terminal. The DCDIM pin is fed with an analog voltage for DC dimming. The EN/PWM pin is fed with an enable signal EN. The enable signal EN is pulse-driven for PWM dimming. The SG pin is pulled up via the resistor R3 to a powered terminal, and is also connected to a device for monitoring a normal-state flag (such as an unillustrated microcomputer).

The GH pin is connected to the gate of the transistor N1. The SW pin is connected to each of the source and the backgate of the transistor N1, the drain of the transistor N2, the first terminal of the inductor L1, and the first terminal of the capacitor C3. The BOOT pin is connected to the second terminal of the capacitor C3. The VDRV5 pin is connected to the first terminal of the capacitor C4. The second terminal of the capacitor C4 is connected to the grounded terminal. The GL pin is connected to the gate of the transistor N2. The PGND pin is connected to each of the source and the backgate of the transistor N2 and the grounded terminal. The SNSP pin is connected to the second terminal of the inductor L1 and to the first terminal of the resistor R4. The SNSN pin is connected to each of the second terminal of the resistor R4, the first terminal of the inductor L2, and the first terminal of the capacitor C5. The second terminal of the inductor L2 is, as the output terminal of an output voltage VOUT, to the anode terminal LED+ of the LED string 20. The second terminal of the capacitor C5 is connected to the grounded terminal.

Of the discrete components connected as described above, the transistors N1 and N2, the inductors L1 and L2, and the capacitor C5 function as a bucking (step-down) switching output stage that generates the output voltage VOUT from the input voltage VIN to supply the output voltage VOUT to the LED string 20. On the other hand, the resistor R4 functions as a shunt resistor (i.e., a sense resistor) that generates a current sense signal Vsns (=IL×R4) that is commensurate with the inductor current IL passing through the inductor L1.

In particular, in the LED driving device 10 in this configuration example, which employs a switching output stage of a synchronous-rectification type, the transistor N1, which corresponds to an output switch, and the transistor N2, which corresponds to a synchronous-rectification switch, are turned on and off complementarily. In the present description, the term "complementarily" should be interpreted in its wider sense to cover not only a configuration where the on/off states of the transistors N1 and N2 are completely reversed but also a configuration where, to prevent a through current, there is provided a period (what is generally called a dead time) in which the transistors N1 and N2 are simultaneously off.

The type of rectification in the switching output stage is not limited to synchronous rectification and can instead be diode rectification (i.e., asynchronous rectification). In that case, the transistor N2 can be replaced with a diode D1 (e.g., a Shottky barrier diode).

LED Driving Control Device (Overall Configuration)

Figure 2:
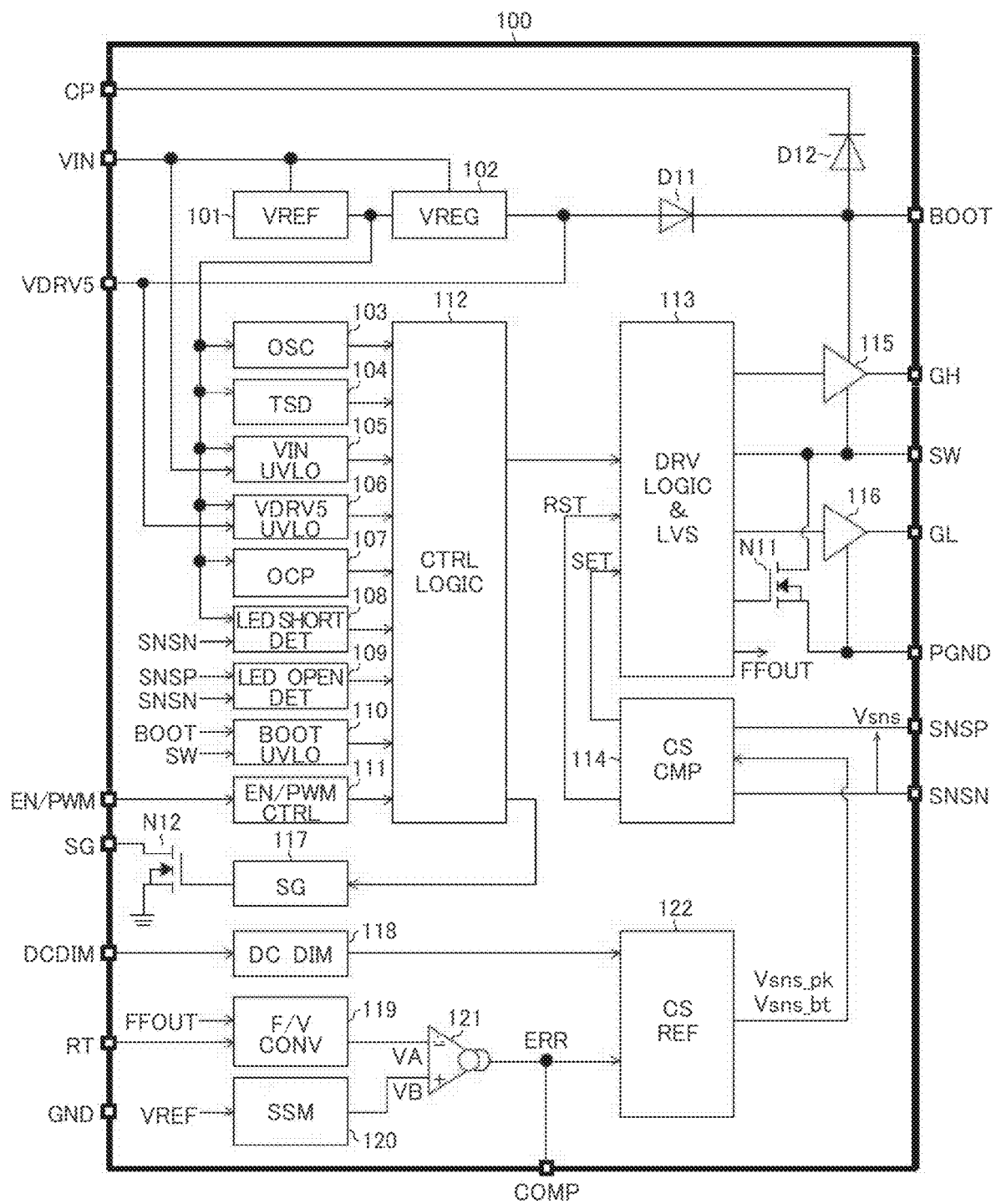
FIG. 2 is a diagram showing an overall configuration of an LED driving control device.

FIG. 2 is a diagram showing an overall configuration of the LED driving control device 100. The LED driving control device 100 of this configuration example has the following components integrated together: a reference voltage generator 101, a constant voltage generator 102, an oscillator 103, a TSD (thermal shut-down) circuit 104, an VINUVLO (undervoltage lockout) circuit 105, a VDRV5UVLO circuit 106, an OCP (overcurrent protection) circuit 107, an LED short detector 108, an LED open detector 109, a BOOTVULO circuit 110, an EN/PWM controller 111, a control logic circuit 112, a driving logic circuit (doubling as a level shifter) 113, a current sense comparator 114, a high-side driver 115, a low-side driver 116, an SG (status good) output circuit 117, a DC dimmer 118, an F/V (frequency-to-voltage) converter 119, an SSM (spread-spectrum nodulation) circuit 120, an error amplifier 121, a detection value setter 122, N-channel MOS field-effect transistors N11 and N12, and diodes D11 and D12.

The reference voltage generator 101 generates from an input voltage VIN fed to the VIN pin a predetermined reference voltage VREF to feed it to different parts of the LED driving control device 100 (the constant voltage generator 102, the oscillator 103, the TSD circuit 104, the VINUVLO circuit 105, the VDRV5UVLO circuit 106, the OCP circuit 107, and the LED short detector 108).

The constant voltage generator 102 generates from the input voltage VIN a predetermined constant voltage VDRV5 (e.g., 5 V) to feed it to the VDRV5 pin. The constant voltage VDRV5 is used as an internal supply voltage for the LED driving control device 100. To prevent oscillation of the constant voltage VDRV5, it is preferable that a phase-compensation capacitor C4 be externally connected to the VDRV5 pin.

The oscillator 103 generates a driving clock signal to feed it to the control logic circuit 112.

The TSD circuit 104 is a temperature protection circuit that monitors the junction temperature Tj in the LED driving control device 100 to prevent IC destruction due to abnormal heat generation. The TSD circuit 104 feeds the detection result to the control logic circuit 112 so that it stops the driving of the switching output stage when Tj=175° C. and restarts the driving of the switching output stage when Tj=150° C.

The VINUVLO circuit 105 is an undervoltage malfunction prevention circuit that monitors the input voltage VIN to prevent IC malfunction at power-on or at a momentary power interruption. The VINUVLO circuit 105 feeds the detection result to the control logic circuit 112 so that it stops the driving of the switching output stage on detection of an undervoltage fault in the input voltage VIN.

The VDRV5UVLO circuit 106 is an undervoltage malfunction prevention circuit that monitors the constant voltage VDRV5 to prevent IC malfunction at power-on and at a momentary power interruption. The VDRV5UVLO circuit 106 feeds the detection result to the control logic circuit 112 so that it stops the driving of the switching output stage on detection of an undervoltage fault in the constant voltage VDRV5.

The OCP circuit 107 monitors a VIN-SW voltage (=IL× RonH, where RonH is the on-state resistance of the transistor N1) to feed the detection result to the control logic circuit 112 so that, even when the inductor current IL is not limited through peak current detection (e.g., even when the SNSP pin and the SNSN pin are short-circuited together), the inductor current IL passing through the transistor N1 is limited to a predetermined upper-limit value or less. As overcurrent protection operation, for example, first, overcurrent protection operation of a pulse-by-pulse type can be performed and then, if the overcurrent state persists, overcurrent protection operation of a timer-latch type can be performed.

The LED short detector 108 detects an LED short (a short circuit in an LED) by comparing the LED anode voltage (=SNSN=VOUT) with the internal reference voltage, and feeds the detection result to the control logic circuit 112. In a case where the SNSN terminal voltage has ripples, the average value of the SNSN terminal voltage can be taken as the detection target.

The LED open detector 109 detects an LED open (an open circuit in an LED) when the LED string 20 has an open fault or a connector to the LED circuit board is open, and feeds the detection result to the control logic circuit 112. On occurrence of an LED open, no current passes through the resistor R4; thus, the current sense signal Vsns (=SNSP− SNSN) is not generated, so that the transistor N1 remains on. Accordingly, the LED open detector 109 detects an LED open when the current sense signal Vsns falls below a predetermined LED open detection value.

The BOOTVULO circuit 110 is an undervoltage malfunction prevention circuit that monitors a BOOT-SW voltage (i.e., the terminal-to-terminal voltage across the capacitor C3) to prevent malfunction at power-on and at a momentary power interruption. The BOOTVULO circuit 110 feeds a fault detection signal to the control logic circuit 112 so that it stops the driving of the switching output stage on detection of an undervoltage fault in the BOOT-SW voltage.

The EN/PWM controller 111 governs the stand-by function and the PWM dimming function of the LED driving control device 100. The stand-by function is a function of keeping the EN/PWM pin at low level for a predetermined period to shift into a low-power-consumption mode. On the other hand, the PWM dimming function is a function of feeding the EN/PWM pin with a rectangular-wave signal for dimming for the purpose of limiting the time for which the output current IOUT is supplied to the LED string 20 thereby to adjust the brightness. With this PWM dimming function, it is possible to dim the LED string 20 by switching the switching output stage between an enabled and a disabled state with no need for an externally connected FET for PWM dimming. In a case where a rectangular-wave signal is fed to the EN/PWM pin, the low-level period of the rectangular-wave signal can be set appropriately within the range in which no shift into the low-power-consumption mode takes place.

The control logic circuit 112 operates by being fed with the driving clock signal from the oscillator 103, and controls in a comprehensive manner the overall operation of the LED driving control device 100 (e.g., by controlling the control logic circuit 112 between an enabled and a disabled state and controlling the output of a normal-state flag using SG output circuit 117).

The driving logic circuit 113 drives and controls the switching output stage (in particular, the transistors N11 and N12) in accordance with a set signal SET and a reset signal RST fed from the current sense comparator 114. The driving logic circuit 113 generates a frequency-feedback signal FFOUT to feed it to the F/V converter 119. The frequency-feedback signal FFOUT is a rectangular-wave signal that contains information on the switching frequency Fsw of the switching output stage, and can be substituted by, for example, a high-side control signal that is fed to the high-side driver 115.

The current sense comparator 114 monitors the terminal-to-terminal voltage between the SNSP pin and the SNSN pin (i.e., the current sense signal Vsns commensurate with the inductor current IL) and compares it directly with a predetermined peak detection value Vsns_pk and a predetermined bottom detection value Vsns_bt to generate the set signal SET and the reset signal RST for the driving logic circuit 114. The current sense comparator 114 is supplied with a boosted voltage and employs a floating configuration so as to be capable of rail-to-rail operation over the full dynamic range (from 0 V to VIN). This will be described in detail later.

The high-side driver 115 generates a high-side gate signal GH in accordance with a high-side control signal from the driving logic circuit 113, and feeds the high-side gate signal GH to the GH pin. The transistor N1, which is externally connected to the GH pin, is on when the high-side gate signal GH is at high level and is off when the high-side gate signal GH is at low level. The high-side driver 115 is fed with, as a high-side supply voltage, the BOOT terminal voltage, and is fed with, as a low-side supply voltage, the SW terminal voltage. Accordingly, the high level of the high-side gate signal GH equals BOOT (≈VIN+VDRV5), and the low level of the high-side gate signal GH equals SW (≈PGND).

The low-side driver 116 generates a low-side gate signal GL in accordance with a low-side control signal from the driving logic circuit 113, and feeds the low-side gate signal GL to the GL pin. The transistor N2, which is connected to the GL pin, is on when the low-side gate signal GL is at high level and is off when the low-side gate signal GL is at low level. The low-side driver 116 is fed with, as a high-side supply voltage, the VDRV5 terminal voltage, and is fed with, as a low-side supply voltage, the PGND terminal voltage. Accordingly, the high level of the low-side gate signal GL equals VDRV5, and the low level of the low-side gate signal GL equals PGND.

The SG output circuit 117 drives and controls the transistor N12 so as to output a normal-state flag (i.e., a status good signal SG) in accordance with instructions from the control logic circuit 112. Specifically, when a fault is detected in any of the TSD circuit 104, the VINUVLO circuit 105, the VDRV5UVLO circuit 106, the OCP circuit 107, the LED short detector 108, and the LED open detector 109, the SG output circuit 117 turns on the transistor N12 to turn the status good signal SG to low level, thereby to give out a notification of the fault. When no fault is detected in any of the blocks mentioned above, the SG output circuit 117 keeps the transistor N12 off and keeps the status good signal SG at high level, thereby to give out a notification that no fault is being detected (or that a fault has been eliminated).

The DC dimmer 118 varies, in accordance with the analog voltage fed to the DCDIM pin, the DC bias values of the peak detection value Vsns_pk and the bottom detection value Vsns_bt set in the detection value setter 122, and thereby increases or decreases the average current value IL_ave (≈the output current IOUT) of the inductor current IL to adjust the brightness of the LED string 20. A DC dimming function like this is useful in a case where the output current IOUT is derated in accordance with the temperature of the LED string 20 by use of a thermistor resistor or the like. Thus, the LED driving control device 100 incorporates two means for adjusting the output current IOUT: a PWM dimming function and a DC dimming function. When the DC dimming function is not used, the DCDIM pin can be left open, or can be pulled up to the VDRV5 pin.

The F/V converter 119 converts the frequency-feedback signal FFOUT fed from the driving logic circuit 113 into an analog voltage VA to output it to the error amplifier 121. The F/V conversion gain (and hence the target setting value for the switching frequency Fsw) can be adjusted as desired by use of the resistor R1, which is externally connected to the RT pin.

The SSM circuit 120 subjects the predetermined reference voltage VREF to spread-spectrum modulation to generate a modulated reference voltage VB.

The error amplifier 121 generates an error signal ERR commensurate with the difference value (=VB−VA) between the analog voltage VA, which is fed to the inverting input terminal (−) of the error amplifier 121, and the modulated reference voltage VB, which is fed to the non-inverting input terminal (+) of the error amplifier 121, to feed the error signal ERR to the COMP pin. To prevent oscillation of the error signal ERR, it is preferable that the resistor R2 and the capacitor C2 for phase compensation be externally connected to the COMP pin.

The detection value setter 122 sets the peak detection value Vsns_pk and the bottom detection value Vsns_bt, of which each is to be compared with the current sense signal Vsns, to feed them to the current sense comparator 114. The detection value setter 122 also has the function of varying the DC bias values of the peak detection value Vsns_pk and the bottom detection value Vsns_bt in accordance with instructions from the DC dimmer 118 (i.e., a DC dimming function) and the function of variably controlling the peak detection value Vsns_pk and the bottom detection value Vsns_bt in accordance with the error signal ERR fed from the error amplifier 121 (i.e., a frequency stabilizing function). These features will be described in detail later.

The F/V converter 119, the error amplifier 121, and the detection value setter 122 function as a frequency feedback controller for stabilizing the switching frequency Fsw (details will be given later).

The transistor N11 functions as a pull-down switch for coping with diode rectification. The drain of the transistor N11 is connected to the SW pin. The source and the backgate of the transistor N11 are connected to the PGND pin. The gate of the transistor N11 is connected to the driving logic circuit 113. In a case where the switching output stage employs diode rectification (i.e., in a case where a diode D1 is used instead of the transistor N2), during normal operation, when the transistor N1 is off, a negative voltage appears at the SW pin. At this point, if a current passes through the parasitic diode in the transistor N11, the parasitic transistor turns on; thus, the switch (not shown) connected between the drain of the transistor N11 and the SW pin is turned off and the current path is cut off. It is thus possible to guarantee the negative-side rated voltage (−2V) at the SW pin (because the choice of components is limited for diodes with a low forward drop voltage Vf). The transistor N11, being on during detection of UVLO_VDRV5 and UVLO_BOOT-SW, pulls down the SW pin and thereby charges the capacitor C3 with electric charge. When an LED open is detected, to continue switching, the transistor N1 turns on in synchronization with the on timing at the GL pin and charges the capacitor C3 with electric charge.

The transistor N12 functions as an open-drain output stage that outputs a status good signal SG. The drain of the transistor N12 is connected to the SG pin. The source and the backgate of the transistor N12 are connected to the grounded terminal. The gate of the transistor N12 is connected to the SG output circuit 117. The transistor N12 is on when its own gate signal is at high level, and is off when the gate signal is at low level.

The diode D11 is one of the circuit elements that constitute a bootstrap power supply (details will be given later). The anode of the diode D11 is connected to the VDRV5 pin. The cathode of the diode D11 is connected to the BOOT pin.

The diode D12 is one of the circuit elements that constitute a charge-pump power supply (details will be given later). The anode of the diode D12 is connected to the BOOT pin. The cathode of the diode D12 is connected to the CP pin.

LED Driving Control Device (First Embodiment)

Figure 3:
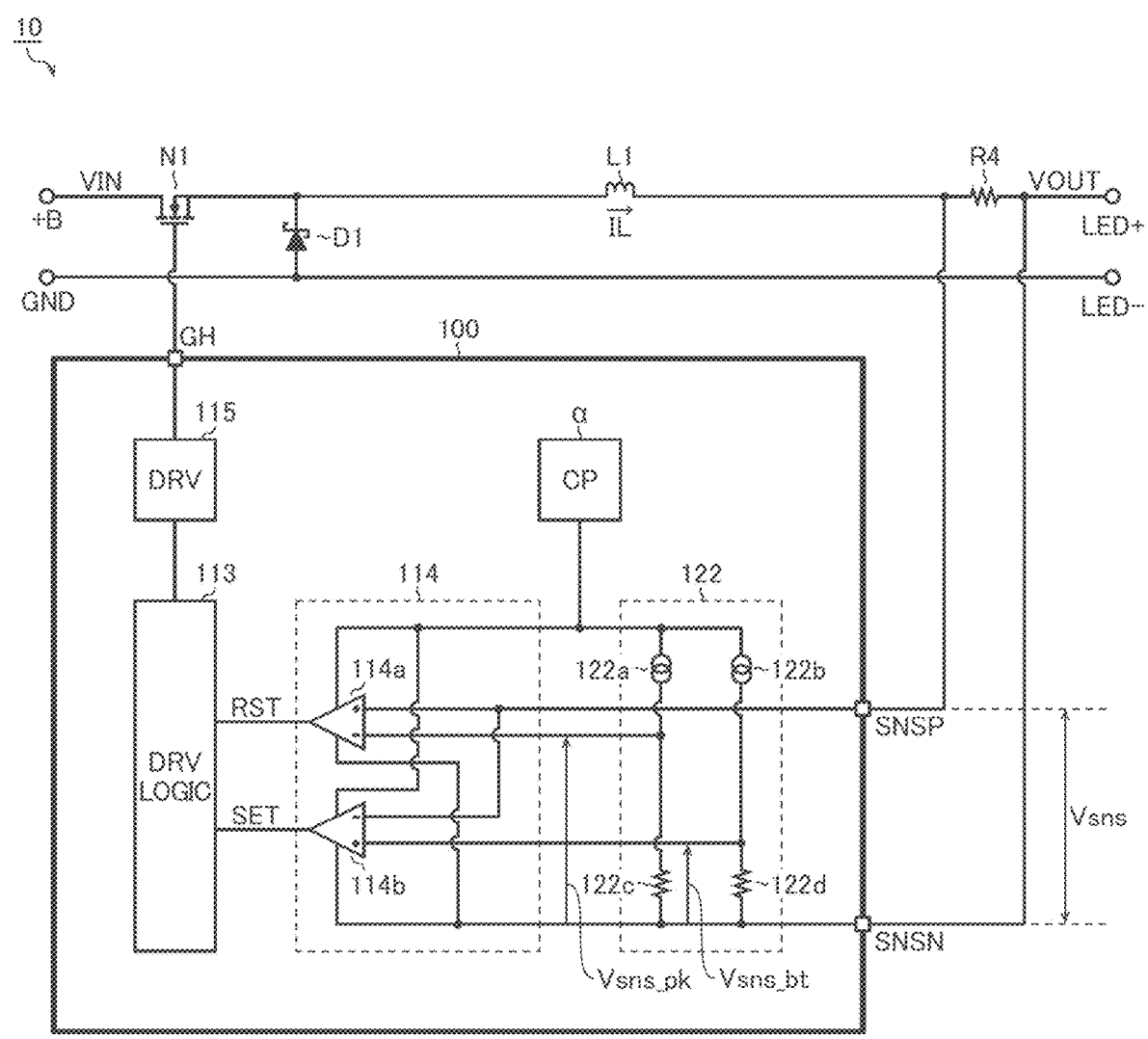
FIG. 3 is a diagram showing an LED driving control device (around a current sense comparator) according to a first embodiment.

FIG. 3 is a diagram showing an LED driving control device 100 (around the current sense comparator 114 in particular) according to a first embodiment. In the LED driving control device 100 of this embodiment, the current sense comparator 114 includes comparators 114a and 114b. The detection value setter 122 includes current sources 122a and 122b (with output current values Ia and Ib respectively) and resistors 122c and 122d (with resistance values Rc and Rd respectively).

While FIG. 3 shows an example where the switching output stage employs diode rectification, it can instead employ synchronous rectification as in FIG. 1 referred to previously.

In the following description, the current sense signal Vsns, the peak detection value Vsns_pk, and the bottom detection value Vsns_bt are all dealt with as voltage signals relative to the output voltage VOUT appearing at the SNSN pin.

The respective high-side power terminals of the comparators 114a and 114b and the respective first terminals of the current sources 122a and 122b are all connected to the output terminal of a charge-pump power supply α (details will be given later), and are fed with a boosted voltage CP (≈VIN+VDRV5) higher than the input voltage VIN. The non-inverting input terminal (+) of the comparator 114a and the inverting input terminal (−) of the comparator 114b are both connected to the SNSP pin, and are fed with the current sense signal Vsns. The inverting input terminal (−) of the comparator 114a is connected to the second terminal of the current source 122a and to the first terminal of the resistor 122c, and is fed with the peak detection value Vsns_pk (=Ia×Rc). The non-inverting input terminal (+) of the comparator 114b is connected to the second terminal of the current source 122b and to the first terminal of the resistor 122d, and is fed with the bottom detection value Vsns_bt (=Ib×Rd). The respective low-side power terminals of the comparators 114a and 114b and the respective second terminals of the resistors 122c and 122d are all connected to the SNSN pin, and is fed with the output voltage VOUT.

The comparator 114a generates the reset signal RST by comparing the current sense signal Vsns, which is fed to the non-inverting input terminal (+) of the comparator 114a, with the peak detection value Vsns_pk, which is fed to the inverting input terminal (−) of the comparator 114a. The reset signal RST is at high level when Vsns>Vsns_pk, and is at low level when Vsns<Vsns_pk.

The comparator 114b generates the set signal SET by comparing the current sense signal Vsns, which is fed to the inverting input terminal (−) of the comparator 114b, with the bottom detection value Vsns_bt, which is fed to the non-inverting input terminal (+) of the comparator 114b. The set signal SET is at high level when Vsns<Vsns_bt, and is at low level when Vsns>Vsns_bt.

The driving logic circuit 113 controls the high-side driver 115 so that it turns on the transistor N1 when the set signal SET rises to high level and turns off the transistor N1 when the reset signal RST rises to high level.

With an output feedback loop formed as described above, the inductor current IL can be subjected to hysteresis control (details will be given later). It is thus possible to keep the output current IOUT supplied to the LED string 20 at a predetermined target value.

In a common output feedback loop for hysteresis control of an inductor current, a current sense signal is first fed to a current sense amplifier operating relative to GND that can amplify the current sense signal in a rail-to-rail manner, and the amplified output signal is compared with each of a peak detection value and a bottom detection value in a current sense comparator operating relative to GND (see, for example, Patent Document 1).

However, a current sense amplifier generally has such a frequency response as to be stable in a frequency band around 1 MHz. Thus, with an output feedback loop employing a current sense amplifier, even when the response speed of the current sense comparator is increased, it is difficult to reduce the control delay over the entire output feedback loop, and this leads to degraded output current accuracy.

On the other hand, the LED driving control device 100 of this embodiment does not include a current sense amplifier that would produce a control delay in the output feedback loop, and instead the current sense signal Vsns is fed directly to the current sense comparator 114.

Here, the current sense comparator 114 needs to monitor the terminal-to-terminal voltage (i.e., the current sense signal Vsns) across the resistor R4 (shunt resistor) connected in series with the inductor L1 to sense the inductor current IL (which is a continuous current), and in addition needs to sense the current accurately even when the output voltage VOUT appearing at the SNSN pin equals 0 V (i.e., at start-up).

Moreover, on occurrence of an overshoot in the inductor current IL, the reset signal RST has to be output all the time, and thus it is impossible to employ hysteresis control in which a single threshold voltage (i.e., a peak or bottom detection value) is varied.

Accordingly, the current sense comparator 114 and the detection value setter 122 both employ a floating configuration where they operate in a state potentially floating relative to the SNSN pin as a reference potential terminal.

For the current sense comparator 114 with the floating configuration described above to operate, it requires a supply voltage higher than the output voltage VOUT appearing at the SNSN pin. The output voltage VOUT can be equal to the input voltage VIN. Accordingly, the LED driving control device 100 in this configuration example is provided with a charge-pump power supply α (details will be given later) that generates a boosted voltage CP higher than the input voltage VIN, and the current sense comparator 114 is supplied with, as the supply voltage for it, the just-mentioned boosted voltage CP.

As described above, the current sense comparator 114 is configured, owing to the supply of the boosted voltage CP and the employment of a floating configuration, to be capable of rail-to-rail operation over the full dynamic range (from 0 V to VIN) by comparing the current sense signal Vsns directly with the peak detection value Vsns_pk and the bottom detection value Vsns_bt without first feeding the current sense signal Vsns to a current sense amplifier that would produce a control delay in the output feedback loop. It is thus possible to increase the response speed of the entire output feedback loop and enhance the output current accuracy.

Hysteresis Control

Figure 4:
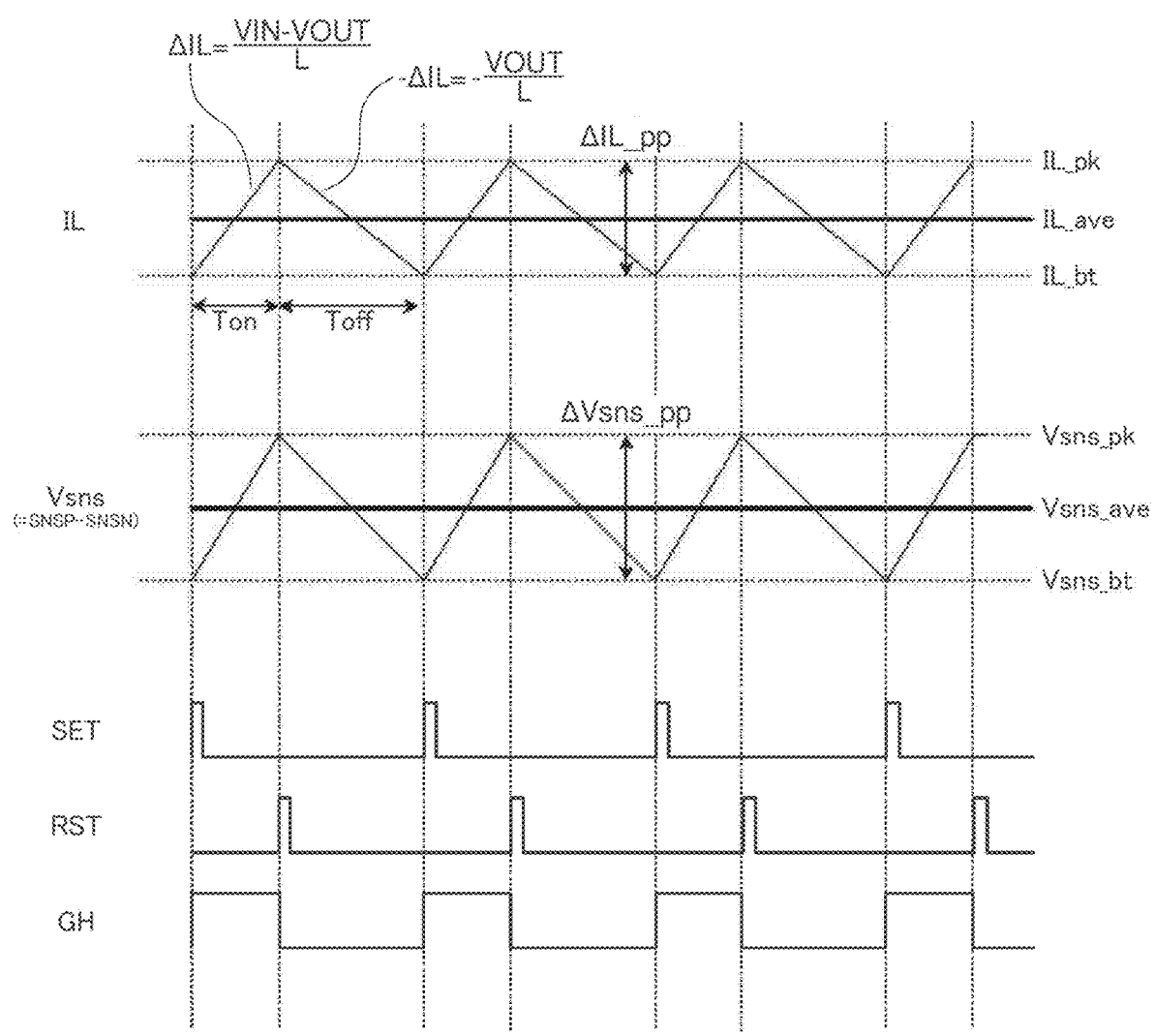
FIG. 4 is a diagram showing one example of hysteresis control.

FIG. 4 is a diagram showing an example of hysteresis control in the LED driving control device 100, depicting, from top down, the inductor current IL, the current sense signal Vsns (=SNSP−SNSN), the set signal SET, the reset signal RST, and the high-side gate signal GH.

When the inductor current IL increases until the current sense signal Vsns becomes higher than the peak detection value Vsns_pk, the reset signal RST rises to high level. Thus, the high-side gate signal GH is reset to low level, and the transistor N1 turns off. Consequently, the inductor current IL switches from increasing to decreasing with the peak current value IL_pk as a maximal value.

On the other hand, when the inductor current IL decreases until the current sense signal Vsns becomes lower than the bottom detection value Vsns_bt, the set signal SET rises to high level. Thus, the high-side gate signal GH is set to high level, and the transistor N1 turns on. Consequently, the inductor current IL switches from decreasing to increasing with the bottom current value IL_bt as a minimal value.

Through the repetition of the peak and bottom detection described above, the inductor current IL comes to have a ripple waveform with a predetermined peak-to-peak value ΔIL_pp (=IL_pk−IL_bt), and is subjected to hysteresis control such that its average current value IL_ave remains constant.

The average current value IL_ave of the inductor current IL is the current value that results from averaging the peak current value IL_pk and the bottom current value IL_bt. Accordingly, it is preferable that the comparators 114a and 114b be so designed that their respective offsets and sensing delay times are as small and short as possible and vary little.

An overshoot and an undershoot in the inductor current IL vary in accordance with the rate of increase ΔIL (=(VIN−VOUT)/L) and the rate of decrease −ΔIL (=−VOUT/L) of the inductor current IL (where L is the inductance value of the inductor L1). Accordingly, the average current value IL_ave of the inductor current IL basically has dependence on voltage variation (how to cope with it will be discussed later).

Figure 5:
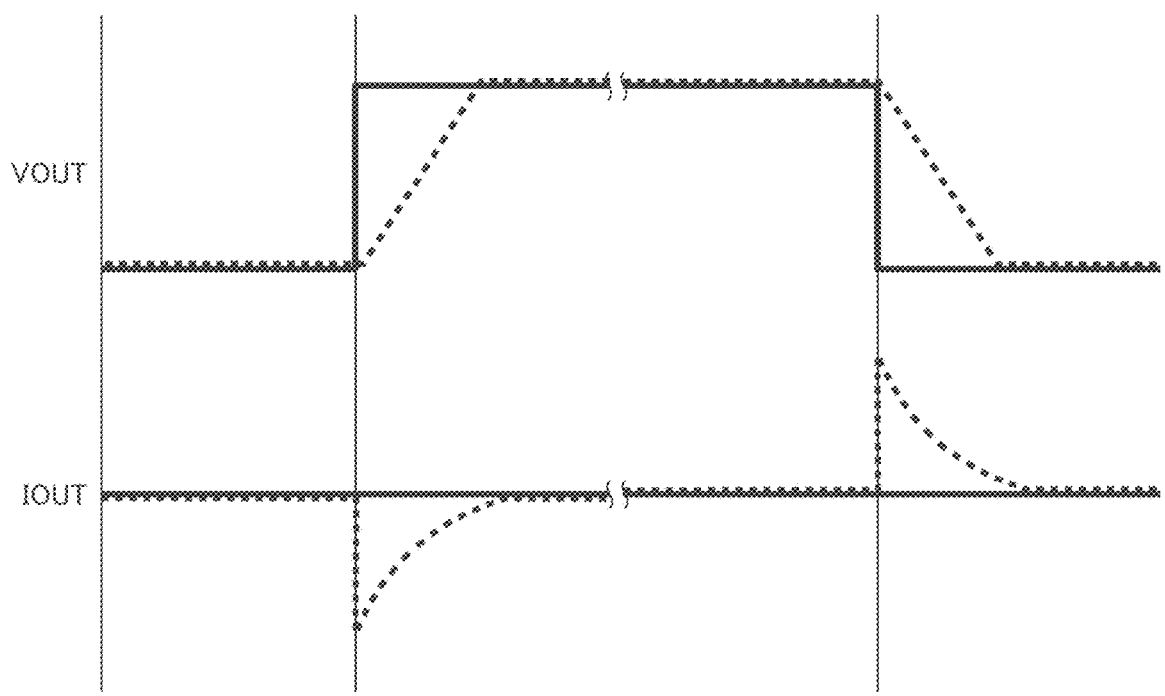
FIG. 5 is a diagram showing fast response of hysteresis control.

FIG. 5 is a diagram showing fast response of hysteresis control, depicting, from top down, the behavior of the output voltage VOUT and the output current IOUT. Solid lines represent the behavior during hysteresis control and broken lines represent, for comparison, the behavior during voltage-mode feedback control (during linear feedback control using an error amplifier).

As will be understood from FIG. 5, through hysteresis control of the inductor current IL, even when the output voltage VOUT varies, it is possible to keep the output current IOUT at a constant value all the time without causing an overshoot or an undershoot in the output current IOUT.

In particular, using the current sense comparator 114 with a floating configuration helps increase the response speed of the entire output feedback loop and enhance the output current accuracy. It is thus possible to enhance the reliability of the LED light-emitting device 1.

LED Driving Control Device (Second Embodiment)

Figure 6:
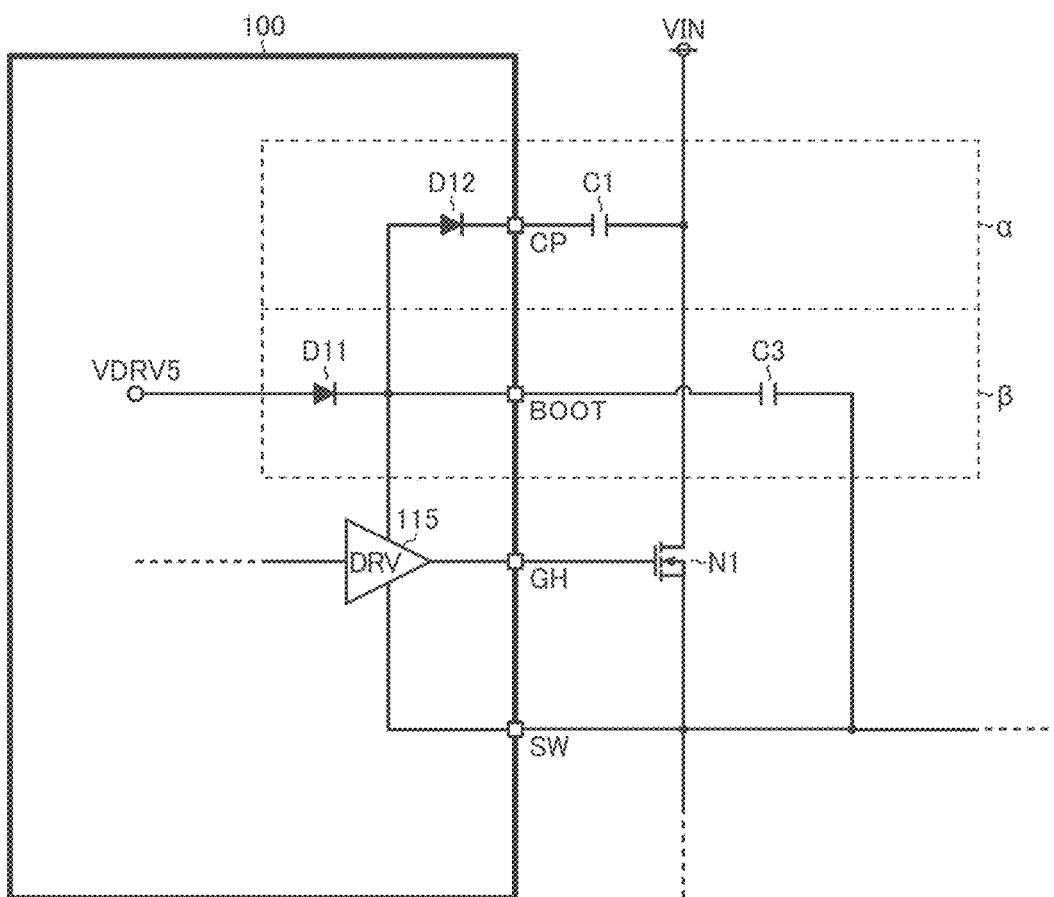
FIG. 6 is a diagram showing an LED driving control device (around a charge-pump power supply) according to a second embodiment.

FIG. 6 is a diagram showing an LED driving control device 100 (around the charge-pump power supply α) according to a second embodiment, and shows a combination of parts extracted respectively from FIGS. 1 and 2 referred to previously.

In the LED driving control device 100 of this embodiment, the diode D11 and the capacitor C3 constitute a bootstrap power supply β. The bootstrap power supply β raises, by a predetermined value (≈VDRV5), the switching voltage (i.e., the SW terminal voltage) with a rectangular waveform that appears at the source of the transistor N1, and thereby generates a high-side supply voltage (i.e., the BOOT terminal voltage) for the high-side driver 115. Accordingly, when the SW terminal voltage is at high level (≈VIN), the BOOT terminal voltage also is at high level (≈VIN+VDRV5), and when the SW terminal voltage is at low level (≈PGND), the BOOT terminal voltage also is at low level (≈VDRV5).

On the other hand, the diode D12 and the capacitor C1 function as the components of the charge-pump power supply α. As mentioned previously, the charge-pump power supply α generates a boosted voltage CP (≈VIN+VDRV5) higher than the input voltage VIN. In particular, the charge-pump power supply α has, instead of a common configuration that employs a flying capacitor, a configuration that is fed with electric charge from the bootstrap power supply β to generate the boosted voltage CP.

Figure 7:
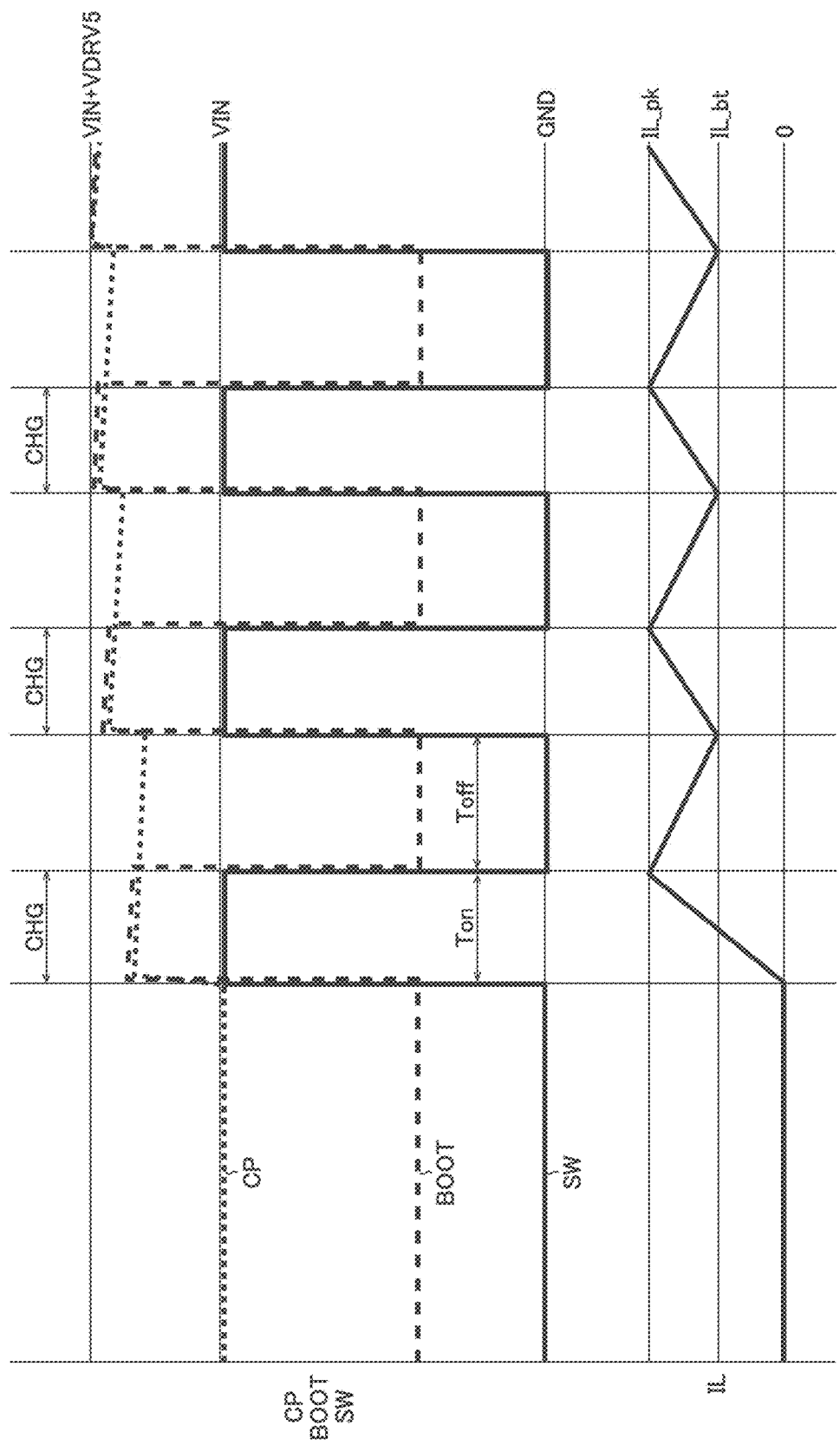
FIG. 7 is a diagram showing one example of charge-pump operation.

FIG. 7 is a diagram showing one example of the charge-pump operation in the charge-pump power supply α. Depicted in the upper tier is the CP terminal voltage (a short-stroke broken line), the BOOT terminal voltage (a long-stroke broken line), and the SW terminal voltage (a solid line), and depicted in the lower tier is the inductor current IL.

During the high-level period of the BOOT terminal voltage (i.e., during the on-period of the transistor N1), electric charge is supplied from the capacitor C3, which is externally connected to the BOOT pin, to the capacitor C1, which is externally connected to the CP pin (i.e., the latter is charged). Accordingly, the CP terminal voltage (i.e., the boosted voltage CP) rises to about the same voltage ($\approx$VIN+VDRV5) as the BOOT terminal voltage.

On the other hand, during the low-level period of the BOOT terminal voltage (i.e., during the off-period of the transistor N1), the BOOT terminal voltage falls together with the SW terminal voltage, and the diode D12 becomes reverse-biased. Accordingly, the discharge path for the capacitor C1 is cut off, and thus the CP terminal voltage (i.e., the boosted voltage CP) is kept at the voltage value ($\approx$VIN+VDRV5) at which it has been up to then.

In this way, the charge-pump power supply α supplies electric charge from the BOOT pin to the CP pin (to perform charging) by use of the capacitor C3 in the bootstrap power supply β every on-period of the transistor N1, and thereby generates the boosted voltage CP ($\approx$VIN+VDRV5) higher than the input voltage VIN. During the on-period Ton of the transistor N1, the BOOT terminal voltage rises up to a voltage ($\approx$VIN+VDRV5) higher than the input voltage VIN. This makes the BOOT terminal voltage suitable as an electric charge supply source for the charge-pump power supply α.

Moreover, in the charge-pump power supply α, the charging operation for the boosted voltage CP is performed in synchronization with the switching output stage; thus, unlike in a common charge pump that employs a flying capacitor, no noise (i.e., asynchronous nose) is generated out of synchronization with the switching operation of the transistor N1. This makes it possible to restrain the malfunctioning of the current sense comparator 114, which is susceptible to noise, and thus it is possible to enhance the peak/bottom detection accuracy and hence to enhance the output current accuracy.

One reservation is that, as mentioned previously, the supply of electric charge from the BOOT pin to the CP pin takes place only during the on-period Ton of the transistor N1. Accordingly, at the start-up of the LED driving control device 100, it is necessary to forcibly turn on the transistor N1 to raise the boosted voltage CP to a voltage equal to or higher than the operable voltage of the current sense comparator 114. In particular, to raise the boosted voltage CP to a voltage equal to or higher than the operable voltage of the current sense comparator 114 during the initial on-period Ton, it is preferable that the ratio C3:C1 be set at, for example, about 4:1.

As a result of the charge-pump power supply α synchronized with the switching output stage, a drop in the switching frequency Fsw may cause a shortage in the electric charge supplied to the charge-pump power supply α, adversely affecting the generation of the boosted voltage CP. To avoid that, on occurrence of a drop in the switching frequency Fsw, it is preferable to reduce the current consumption by the current sense comparator 114 so that the boosted voltage CP does not fall below the operable voltage of the current sense comparator 114. To follow is a specific description taking as an example the charge-pump operation on occurrence of an LED open.

Figure 8:
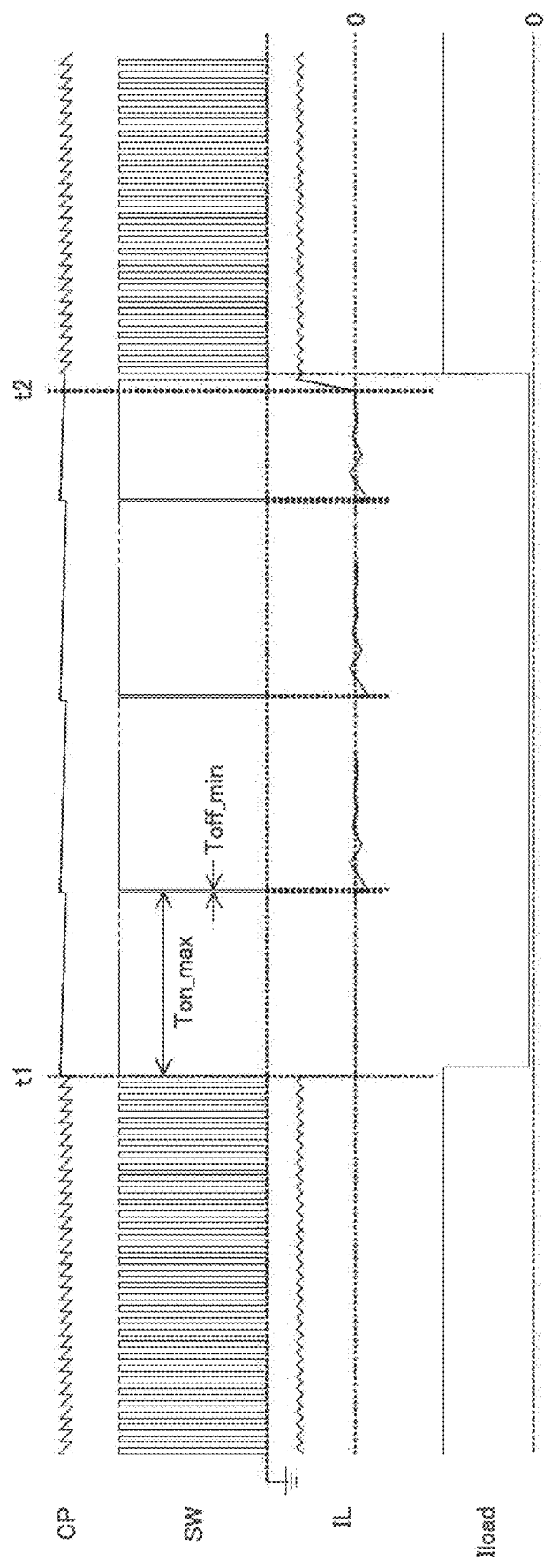
FIG. 8 is a diagram showing one example of charge-pump operation on occurrence of an LED open.

FIG. 8 is a diagram showing one example of charge-pump operation on occurrence of an LED open, depicting, from top down, the CP terminal voltage (i.e., the boosted voltage CP), the SW terminal voltage, the inductor current IL, and the load current Iload that is supplied from the charge-pump power supply α to a load (chiefly the current sense comparator 114). In the diagram, it is assumed that an LED open occurs at time point t1 and that the LED open dissolves at time point t2.

On occurrence of an LED open (or when VIN$\approx$VOUT), the inductor current IL does not reach the peak detection value (i.e., the reset detection value), and thus the switching output stage basically operates with the maximum on-period Ton_max. More specifically, when an LED open occurs, and the on-period Ton of the transistor N1 reaches the maximum on-period Ton_max, the high-side gate signal GH is forcibly reset; thus, the transistor N1 is kept off for the minimum off-period Toff_min and is then turned back on. Thereafter, until the LED open dissolves, the switching operation described above is repeated.

As described above, on occurrence of an LED open, the switching output stage is driven only for the purpose of refreshing (recharging) the capacitor C3, which is externally connected to the BOOT terminal, and thus the switching frequency Fsw lowers. As a result, the on-period Ton of the transistor N1 increases (to become equal to Ton_max); it is thus then necessary to prevent the CP terminal voltage (i.e., the boosted voltage CP) from lowering.

To that end, on occurrence of an LED open, it is preferable to reduce the current consumption by the current sense comparator 114, which is the load to the charge-pump power supply α, to zero to maintain the CP terminal voltage (i.e., the boosted voltage CP). On occurrence of an LED open, no peak/bottom detection is performed with respect to the inductor current IL, and thus stopping the supply of electric power to the current sense comparator 114 does not pose any problem.

LED Driving Control Device (Third Embodiment)

Figure 9:
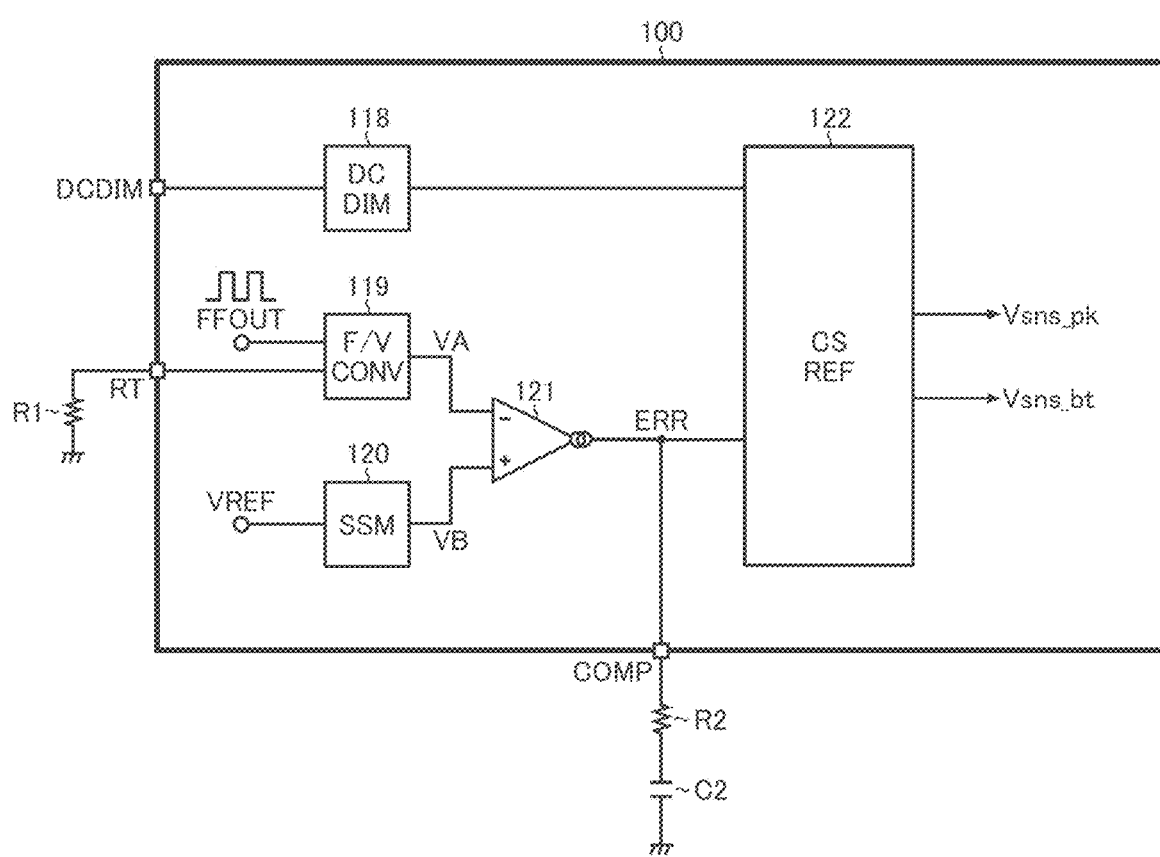
FIG. 9 is a diagram showing an LED driving control device (around a frequency-feedback controller) according to a third embodiment.

FIG. 9 is a diagram showing an LED driving control device 100 (around a frequency feedback controller) according to a third embodiment, and shows a combination of parts extracted respectively from FIGS. 1 and 2 referred to previously.

As mentioned previously, the F/V converter 119 converts the frequency-feedback signal FFOUT (i.e., frequency information) fed from the driving logic circuit 113 into the analog voltage VA to feed it to the error amplifier 121. The analog voltage VA decreases as the switching frequency Fsw increases (as the on-period Ton shortens), and increases as the switching frequency Fsw decreases (as the on-period Ton lengthens). The F/V conversion formula is VA=(1/C)×Ibias× (1/FFOUT) (where C represents the internal capacitance, Ibias represents the internal constant current, and FFOUT represents the frequency information). As the frequency increases, the analog voltage VA, with which the internal capacitor is charged by the internal constant current Ibias, decreases. The analog voltage VA has the peak hold value of the voltage-converted frequency-feedback signal FFOUT.

The error amplifier 121 generates an error signal ERR that is commensurate with the difference value (=VB−VA) between the analog voltage VA, which is fed to the inverting input terminal (−) of the error amplifier 121, and the modulated reference voltage VB, which is fed to the non-inverting input terminal (+) of the error amplifier 121, to output the error signal ERR to the COMP pin. When VA>VB, the error signal ERR rises in accordance with the above-mentioned difference value; when VA<VB, the error signal ERR falls in accordance with the above-mentioned difference value.

The detection value setter 122 variably controls the peak detection value Vsns_pk and the bottom detection value Vsns_bt in accordance with the error signal ERR fed from the error amplifier 121. Specifically, the higher the error signal ERR, the detection value setter 122 lowers the peak detection value Vsns_pk and raises the bottom detection value Vsns_bt; on the other hand, the lower the error signal ERR, the detection value setter 122 raises the peak detection value Vsns_pk and lowers the bottom detection value Vsns_bt. The above-mentioned means for setting detection values can be achieved, for example, by adjusting the output current values of the current sources 122a and 122b (FIG. 3).

As described above, the LED driving control device 100 of this embodiment is provided with, independently of the output feedback loop for hysteresis control, a frequency feedback controller that adjusts the peak detection value Vsns_pk and the bottom detection value Vsns_bt such that, even when the output voltage VOUT varies, the switching frequency Fsw of the switching output stage remains at a constant value.

Now, prior to a discussion of the effect of introducing the frequency feedback controller described above, the problems encountered without its introduction will be reviewed.

Figure 10:
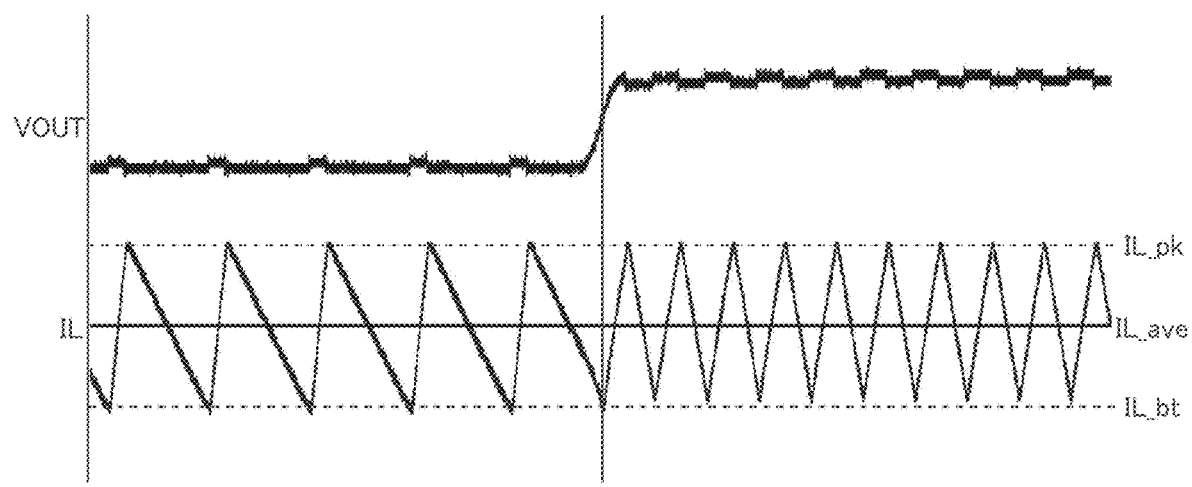
FIG. 10 is a diagram showing a first example (with no frequency-feedback control) of hysteresis control.

FIG. 10 is a diagram showing a first example (without frequency feedback control) of hysteresis control, depicting, from top down, the output voltage VOUT and the inductor current IL. As mentioned previously, the gradient of the inductor current IL has input/output dependence (see FIG. 4). Accordingly, when, during hysteresis control, the output voltage VOUT varies and the gradient of the inductor current IL varies, the switching frequency Fsw varies. This widens the band in which to cope with noise, and thus makes noise-resistant designing difficult. Accordingly, in an application where the output voltage VOUT is changed frequently (e.g., an LED light-emitting device of a variable-light-distribution type, performing hysteresis control on the inductor current IL requires the stabilization of the switching frequency Fsw.

Next, the effect of introducing the frequency feedback controller described above will be described specifically.

Figure 11:
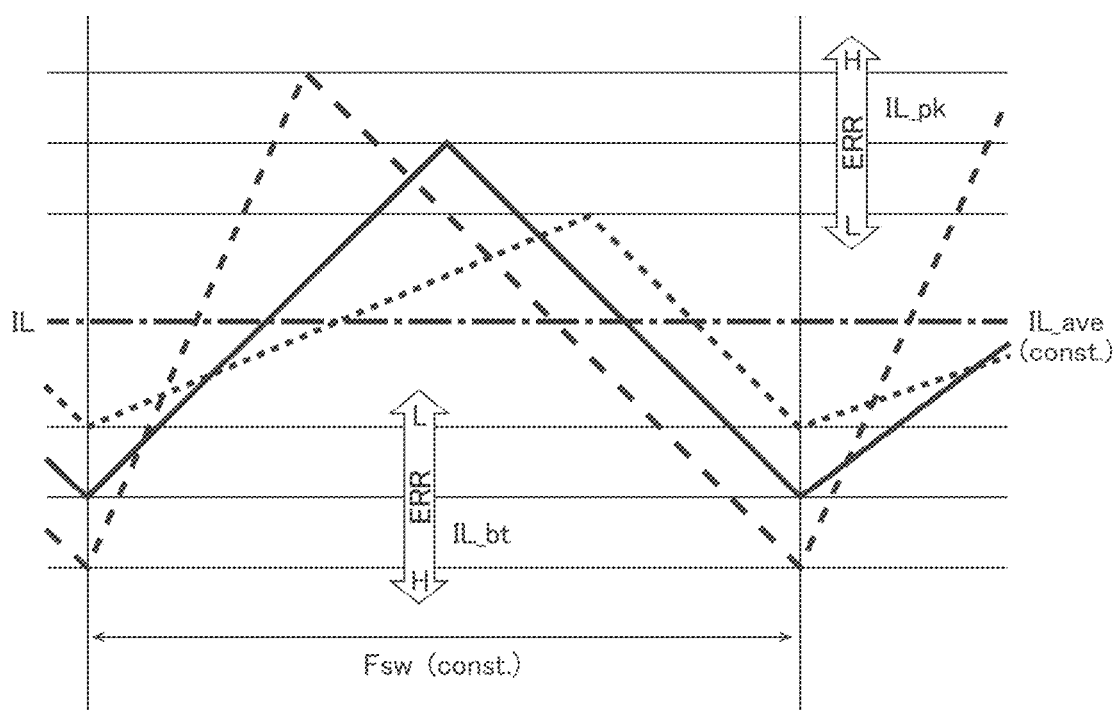
FIG. 11 is a diagram showing a second example (with frequency-feedback control) of hysteresis control.

FIG. 11 is a diagram showing a second example (with frequency feedback control) of hysteresis control, depicting three inductor currents IL (a solid line, a long-stroke broken line, and a short-stroke broken line) with different gradients.

For example, when the output voltage VOUT rises and the gradient of the inductor current IL becomes sharp, the switching frequency Fsw tends to increase and deviate from the target value. However, as the switching frequency Fsw rises, the analog voltage VA lowers and the error signal ERR rises; thus, the peak detection value Vsns_pk (and hence the peak current value IL_pk) is increased, and the bottom detection value Vsns_bt (and hence the bottom current value IL_bt) is decreased. As a result, the timing of the peak/bottom detection on the inductor current IL delays, and thus the switching frequency Fsw is kept at a constant value without deviating from the target value.

In the opposite case, that is, when the output voltage VOUT falls and the gradient of the inductor current IL becomes gentle, the switching frequency Fsw tends to decrease and deviate from the target value. However, as the switching frequency Fsw falls, the analog voltage VA rises and the error signal ERR falls; thus, the peak detection value Vsns_pk (and hence the peak current value IL_pk) is decreased, and the bottom detection value Vsns_bt (and hence the bottom current value IL_bt) is increased. As a result, the timing of the peak/bottom detection on the inductor current IL advances, and thus the switching frequency Fsw is kept at a constant value without deviating from the target value.

In this way, even when the gradient of the inductor current IL varies, by adjusting the peak detection value Vsns_pk and the bottom detection value Vsns_bt individually, it is possible to keep the switching frequency Fsw at a constant value.

In the frequency feedback control described above, by setting the amounts of adjustment for the peak detection value Vsns_pk and the bottom detection value Vsns_bt equal as necessary, it is possible to stabilize the switching frequency Fsw without varying the average current value IL_ave (≈IOUT) of the inductor current IL.

As described above, with the LED driving control device 100 of this embodiment, it is possible to achieve both fast response through hysteresis control and easy noise-resistant designing through frequency feedback control.

Figure 12:
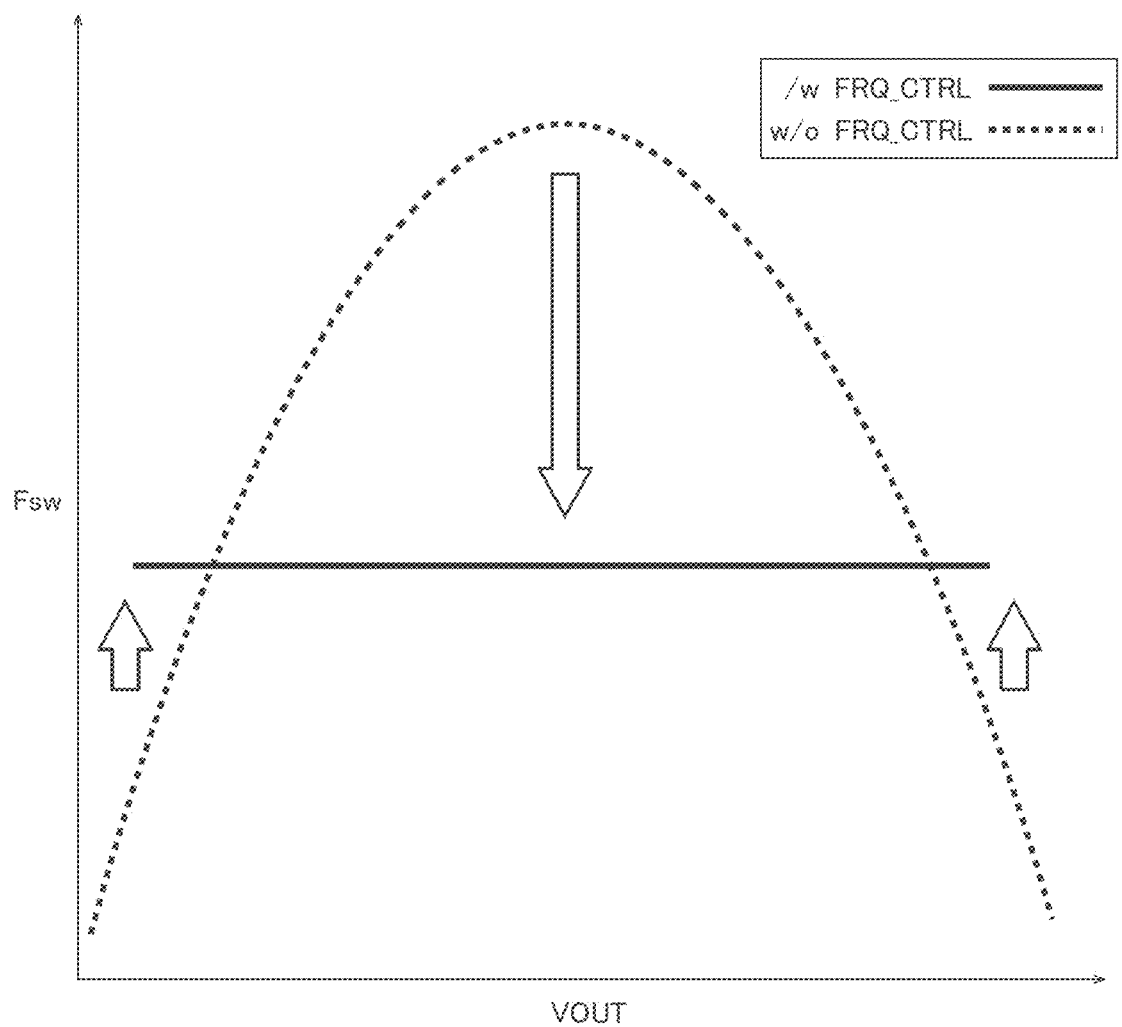
FIG. 12 is a diagram showing a relationship between an output voltage and a switching frequency.

FIG. 12 is a diagram showing a relationship between the output voltage VOUT and the switching frequency Fsw. The solid line represents the behavior observed with the frequency feedback controller introduced, and the broken line represents the behavior without the frequency feedback controller introduced. As will be understood from the diagram, with the frequency feedback controller described above introduced, even when the output voltage VOUT varies, the switching frequency Fsw of the switching output stage remains at a constant value all the time.

Figure 13:
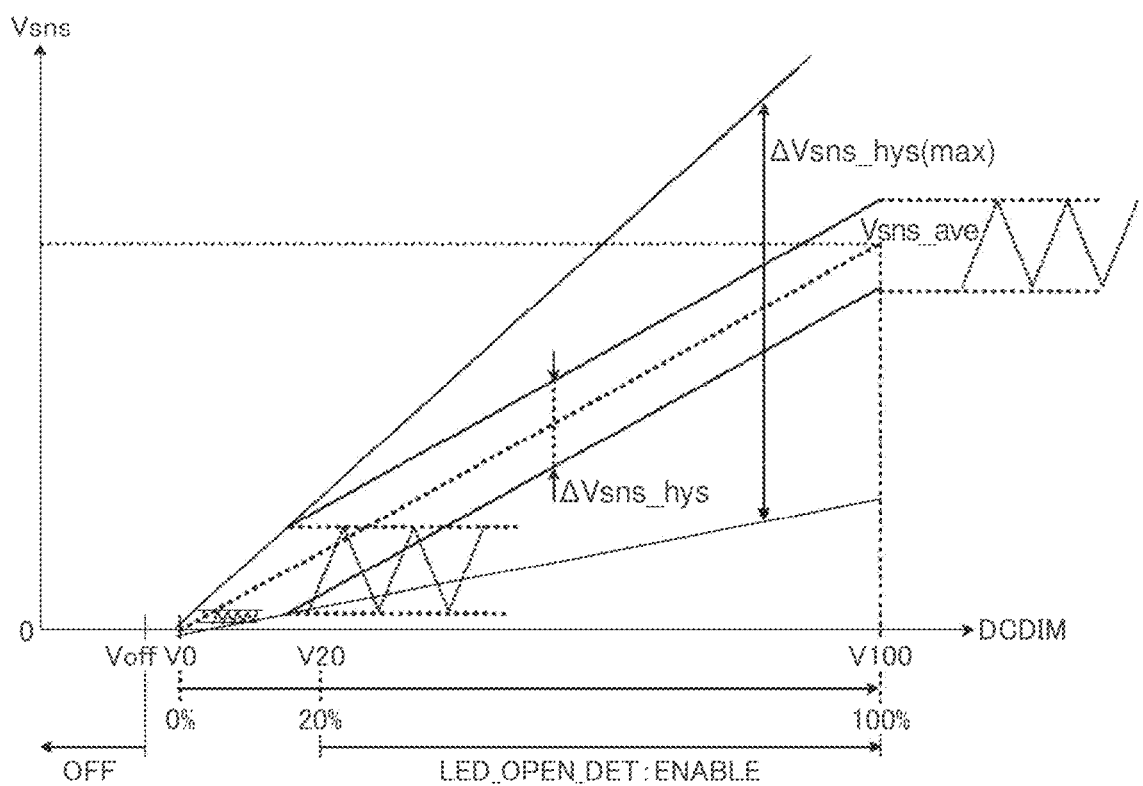
FIG. 13 is a diagram showing a relationship between frequency-feedback control and DC dimming control.

FIG. 13 is a diagram showing a relationship between frequency feedback control and DC dimming control. The horizontal axis represents the DCDIM terminal voltage, and the vertical axis represents the current sense signal Vsns (=SNSP−SNSN).

As shown in FIG. 13, applying an analog voltage from V0 (corresponding to a dimming duty of 0%) to V100 (corresponding to a dimming duty of 100%) as the DCDIM terminal voltage results in the average current sense signal Vsns_ave (=the average value of the peak detection value Vsns_pk and the bottom detection value Vsns_bt) increasing linearly. That is, the DCDIM terminal voltage corresponds to a target setting value for the output current IOUT supplied to the LED string 20.

So long as an analog voltage from V20 (corresponding to a dimming duty of 20%) to V100 is being applied as the DCDIM terminal voltage, LED-open detection is enabled.

The control range ΔVsns_hys of the current sense signal Vsns (i.e., the difference between the peak detection value Vsns_pk and the bottom detection value Vsns_bt) is variably controlled in accordance with the DCDIM terminal voltage.

In particular, in a low-input range where V0<DCDIM<V20 (i.e., the range where the frequency control loop is disabled), the above-mentioned control range ΔVsns_hys is limited in proportion to the DCDIM terminal voltage, and thus the switching frequency Fsw becomes higher than the target value. On the other hand, in the voltage range where DCDIM≤Voff (<V0), the switching frequency Fsw reaches its upper limit value, and thus, through forcible turning-off operation, the output of the inductor current IL (and hence the output current IOUT) is stopped.

With variable control on the control range ΔVsns_hys as described above, it is possible to drive the inductor current IL in a continuous mode all the time. This makes it possible to perform output current control over the entire variable range (V0≤DCDIM≤V100) of the DCDIM terminal voltage.

In the low-input range (V0<DCDIM<V20) of the DCDIM terminal voltage, the highest priority is given to maintaining the output current accuracy, and thus even if the switching frequency Fsw deviates from the target value, this does not pose any serious problem.

LED Driving Control Device (Fourth Embodiment)

Figure 14:
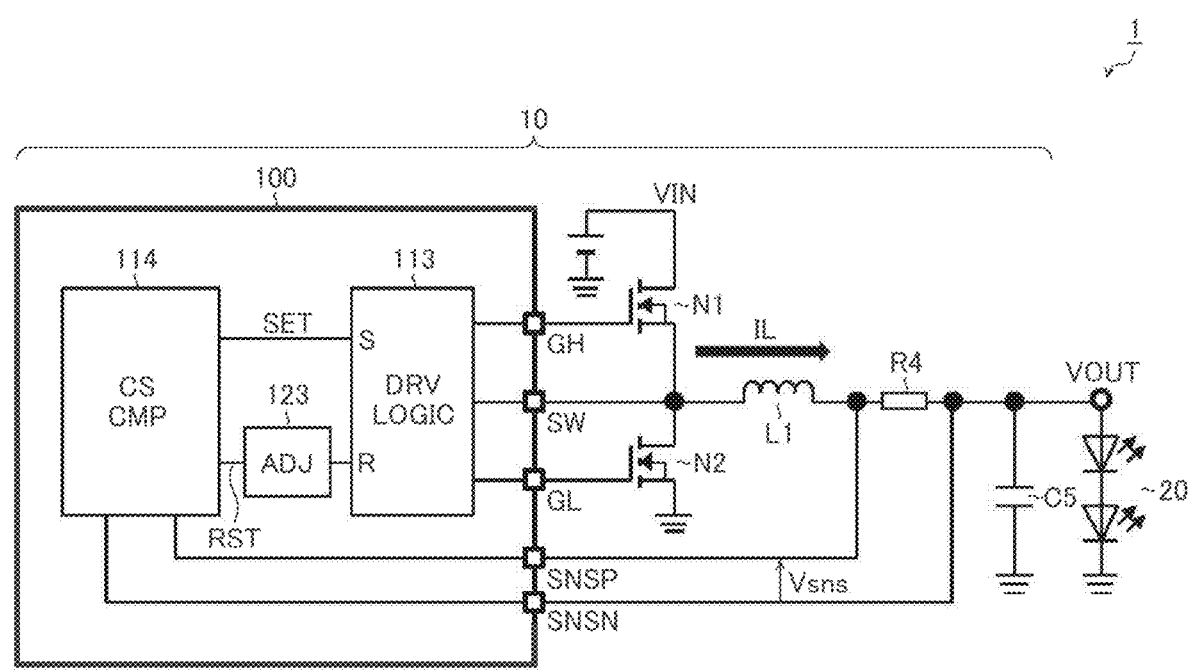
FIG. 14 is a diagram showing an LED driving control device (around a peak-current adjuster) according to a fourth embodiment.

FIG. 14 is a diagram showing an LED driving control device 100 (around a peak current adjuster) according to a fourth embodiment. The LED driving control device 100 of this embodiment further includes, between the current sense comparator 114 and the driving logic circuit 113, a peak current adjuster 123. The peak current adjuster 123 delays the reset signal RST by a predetermined adjustment time Tadj to feed the result to the driving logic circuit 113.

Now, prior to a discussion of the effect of introducing the peak current adjuster 123 mentioned above, the problems encountered without its introduction will be reviewed.

Figure 15:
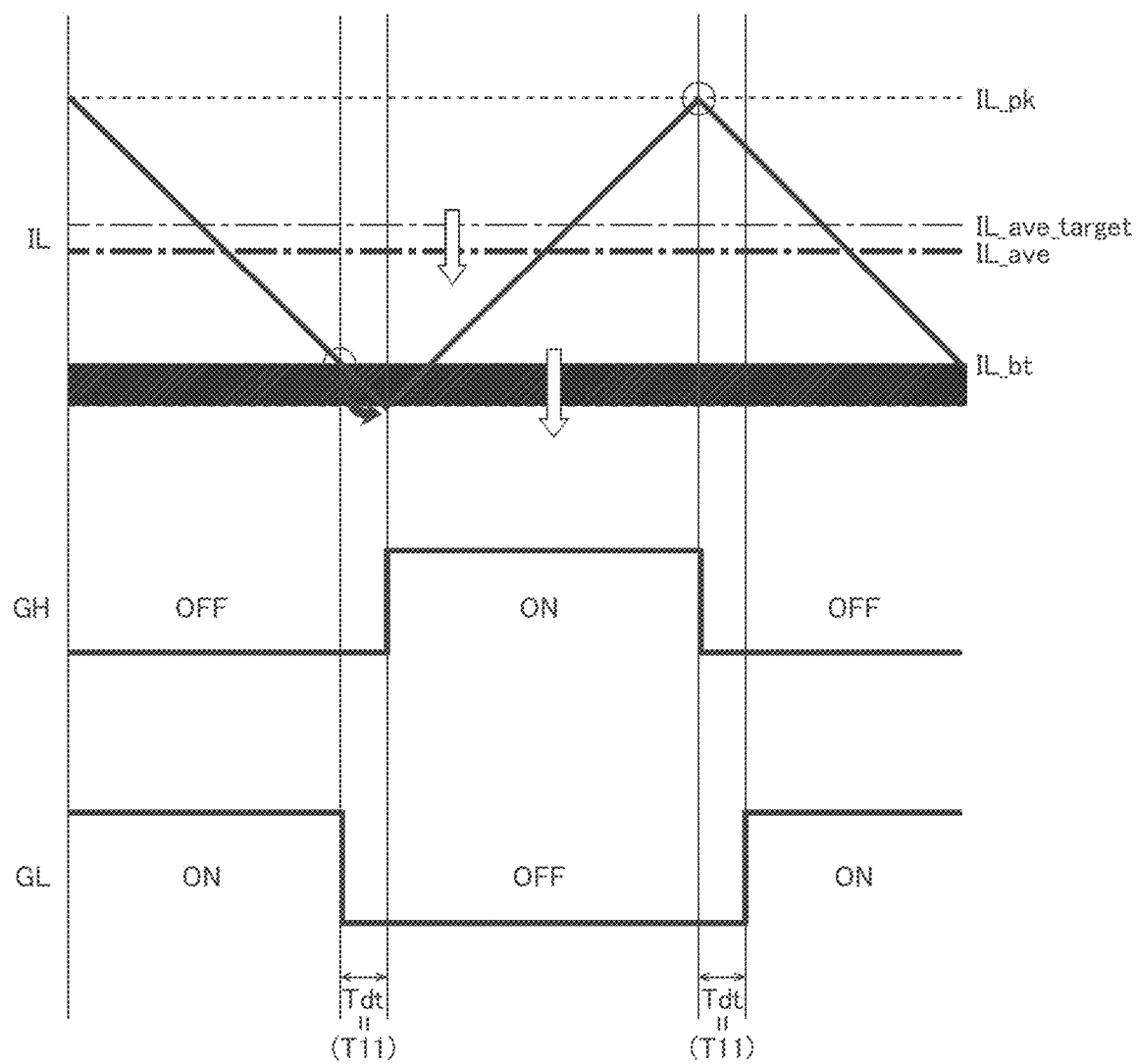
FIG. 15 is a diagram showing how a dead time degrades output current accuracy.

FIG. 15 is a diagram showing how a simultaneously-off time for the transistors N11 and N12 degrades output current accuracy, depicting, from top down, the inductor current IL, the high-side gate signal GH, and the low-side gate signal GL.

In a case where synchronous rectification is employed in the switching output stage to cope with high-current driving of the inductor current IL, it is necessary to secure a simultaneously-off time Tdt for the transistors N11 and N12 to prevent an excessive through current from passing through them.

Here, with the simultaneously-off time Tdt secured, even when the current sense signal Vsns falls below the bottom detection value Vsns_bt with the result that the low-side gate signal GL is reset to low level and the transistor N2 is turned off, until the simultaneously-off time Tdt expires, the high-side gate signal GH is not set to high level and thus the transistor N1 remains off. Consequently, the inductor current IL exhibits an undershoot from the intrinsic bottom current value IL_bt. As a result the average current value IL_ave (≈IOUT) of the inductor current IL becomes smaller than its target value IL_ave_target, leading to degraded output current accuracy.

Next, the effect of introducing the peak current adjuster 123 described above will be described specifically.

Figure 16:
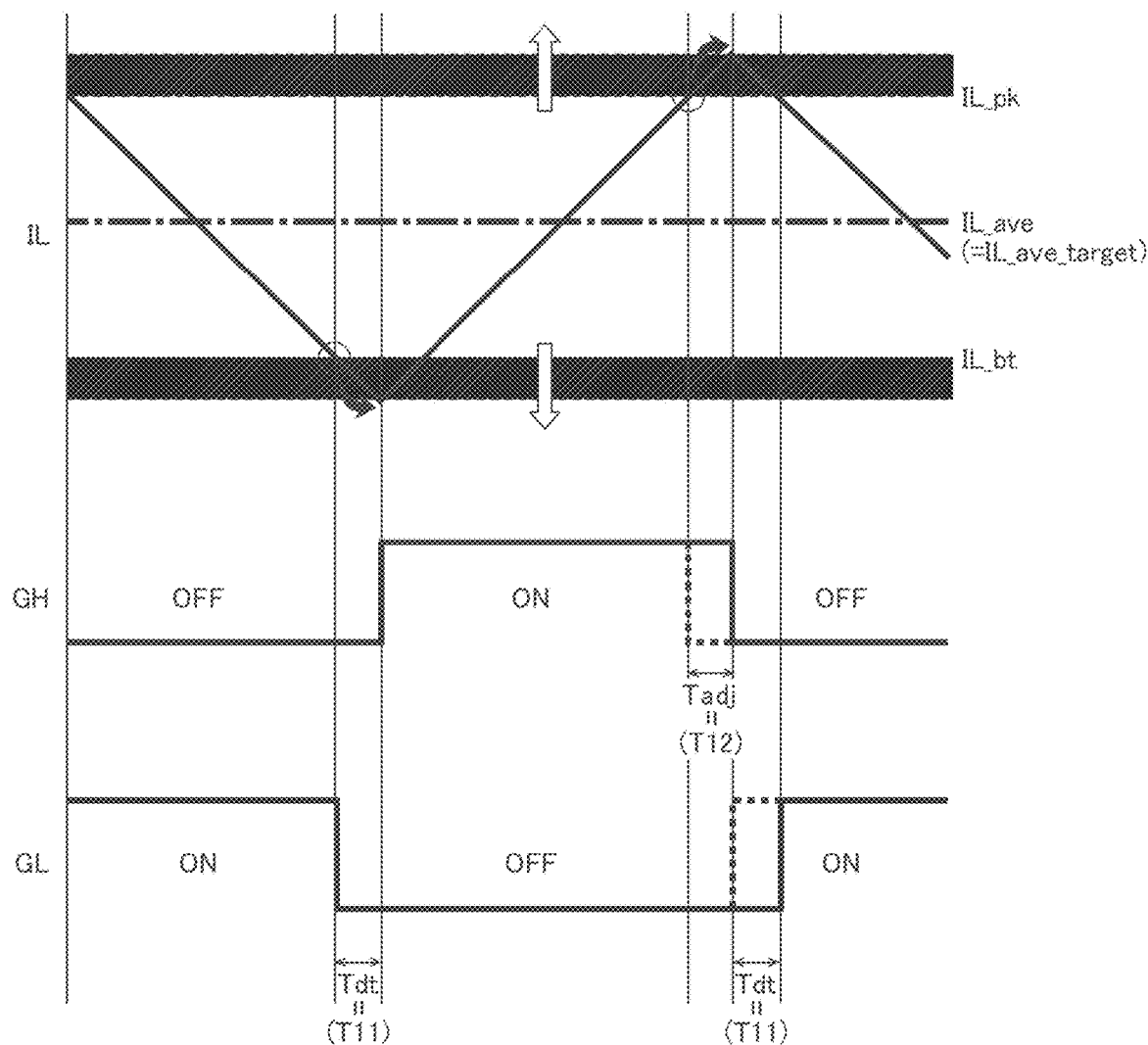
FIG. 16 is a diagram showing how peak-current adjustment improves output current accuracy.

FIG. 16 is a diagram showing how the introduction of the peak current adjuster 123 improves output current accuracy, depicting, like FIG. 15 referred to previously, from top down, the inductor current IL, the high-side gate signal GH, and the low-side gate signal GL.

As mentioned previously, during the simultaneously-off time Tdt for the transistors N1 and N2, the inductor current IL exhibits an undershoot from the intrinsic bottom current value IL_bt. However, in the LED driving control device 100 of this embodiment, owing to the peak current adjuster 123 being introduced, the on-period Ton of the transistor N1 is extended to cancel the above-mentioned undershoot so as to intentionally cause an overshoot in the peak current value IL_pk of the inductor current IL.

More specifically, the peak current adjuster 123 delays the reset signal RST fed from the current sense comparator 114 by the adjustment time Tadj commensurate with the simultaneously-off time Tdt to feed the result to the driving logic circuit 113.

The simultaneously-off time Tdt mentioned above corresponds to the first time T11 after the current sense signal Vsns reaches the bottom detection value Vsns_bt and turns off the transistor N2 until it turns on the transistor N1 (i.e., after the inductor current IL switches to increasing until it actually takes a minimal value). On the other hand, the adjustment time Tadj mentioned above corresponds to the second time T12 after the current sense signal Vsns reaches the peak detection value Vsns_pk until it turns off the transistor N1 (after the inductor current IL switches to decreasing until it actually takes a maximal value).

The deviation (the amount of undershoot) of the bottom current value IL_bt can be expressed by (VOUT/L)×T11. On the other hand, the amount of adjustment of the peak current value IL_pk (i.e., the amount of intentional overshoot) can be expressed by [(VIN−VOUT)/L]×T12.

Accordingly, setting the adjustment time Tadj (=T12) such that T12=[VOUT/(VIN−VOUT)]×T11 makes it possible to cancel the undershoot in the bottom current value IL_bt with the overshoot in the peak current value IL_pk. In this way, the average current value IL_ave (≈IOUT) can be kept at its target value IL_ave_target, and it is thus possible to achieve both high-current driving by synchronous rectification and enhanced output current accuracy.

Figure 17:
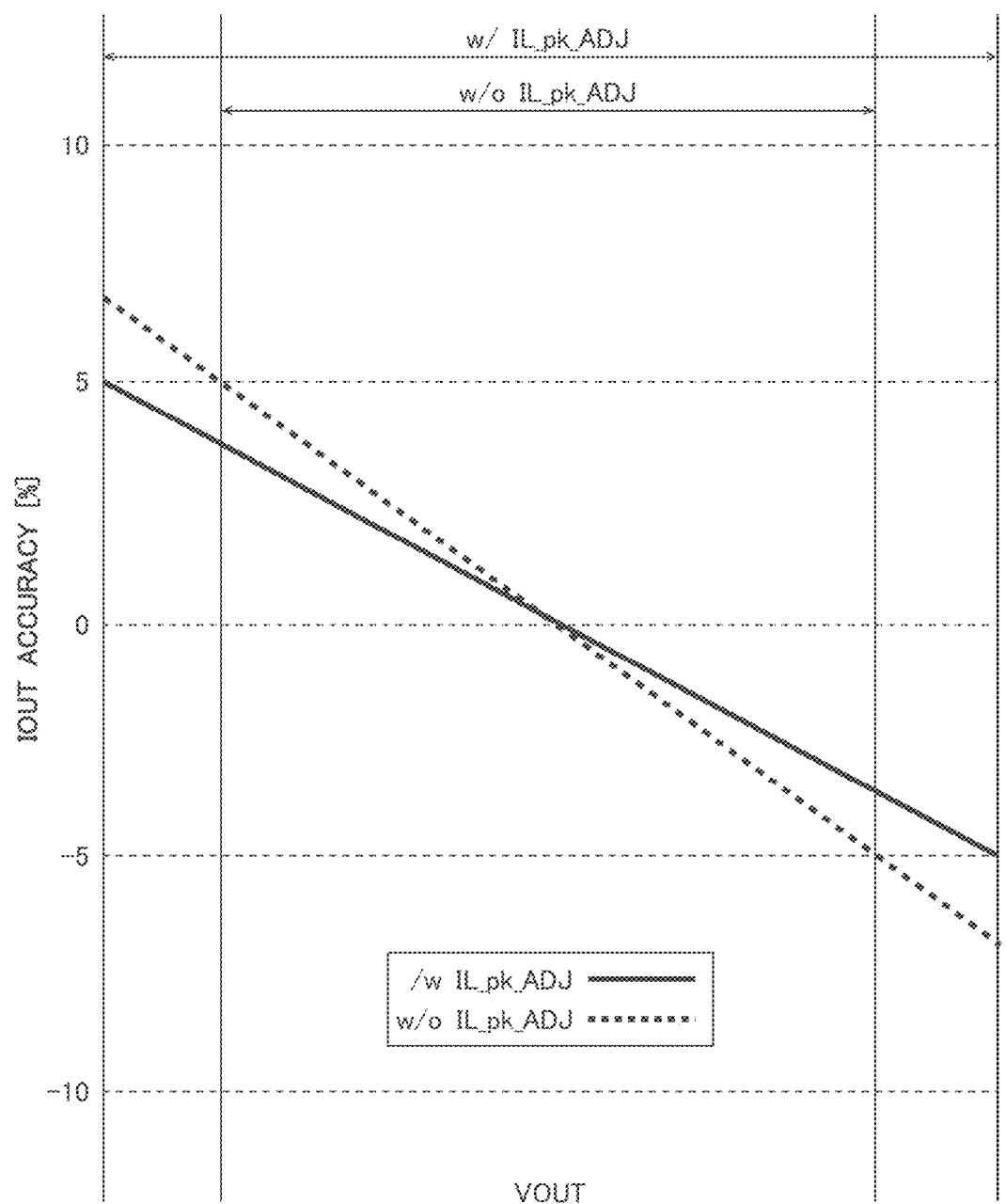
FIG. 17 is a diagram showing a relationship between an output voltage and output current accuracy.

FIG. 17 is a diagram showing a relationship between the output voltage VOUT and the output current accuracy. The solid line represents the behaving observed with the peak current adjuster 123 introduced, and the broken line represents the behavior observed without the peak current adjuster 123 introduced. As will be understood from the diagram, with the peak current adjuster 123 introduced, even when the output voltage VOUT varies over a large width, it is possible to maintain higher output current accuracy.

Then, for example in the LED light-emitting device 1 (FIG. 18) of a variable-light-distribution type described later, it is possible, while fulfilling the accuracy required in the output current IOUT, to increase the LEDs constituting the LED string 20 and widely switch the number of LEDs lit, and hence to contribute to enhancing the resolution of ADB (adaptive driving beam) headlights.

While this embodiment deals with an example of the peak current adjuster 123 that cancels the deviation (i.e., undershoot) of the bottom current value IL_bt through the adjustment of the peak current value IL_pk, this can be applied to obtain the opposite configuration by introducing a bottom current adjuster that cancels the deviation (i.e., overshoot) of the peak current value IL_pk through the adjustment of the bottom current value IL_bt.

Thus, as a boarder concept encompassing those different configurations, it is possible to propose the introduction of a current adjuster that adjusts, in accordance with the first time T11 after the current sense signal Vsns reaches one of the peak detection value Vsns_pk and the bottom detection value Vsns_bt until the inductor current IL actually takes one maximal value, the other maximal value of the inductor current IL.

Variable-Light-Distribution Type

Figure 18:
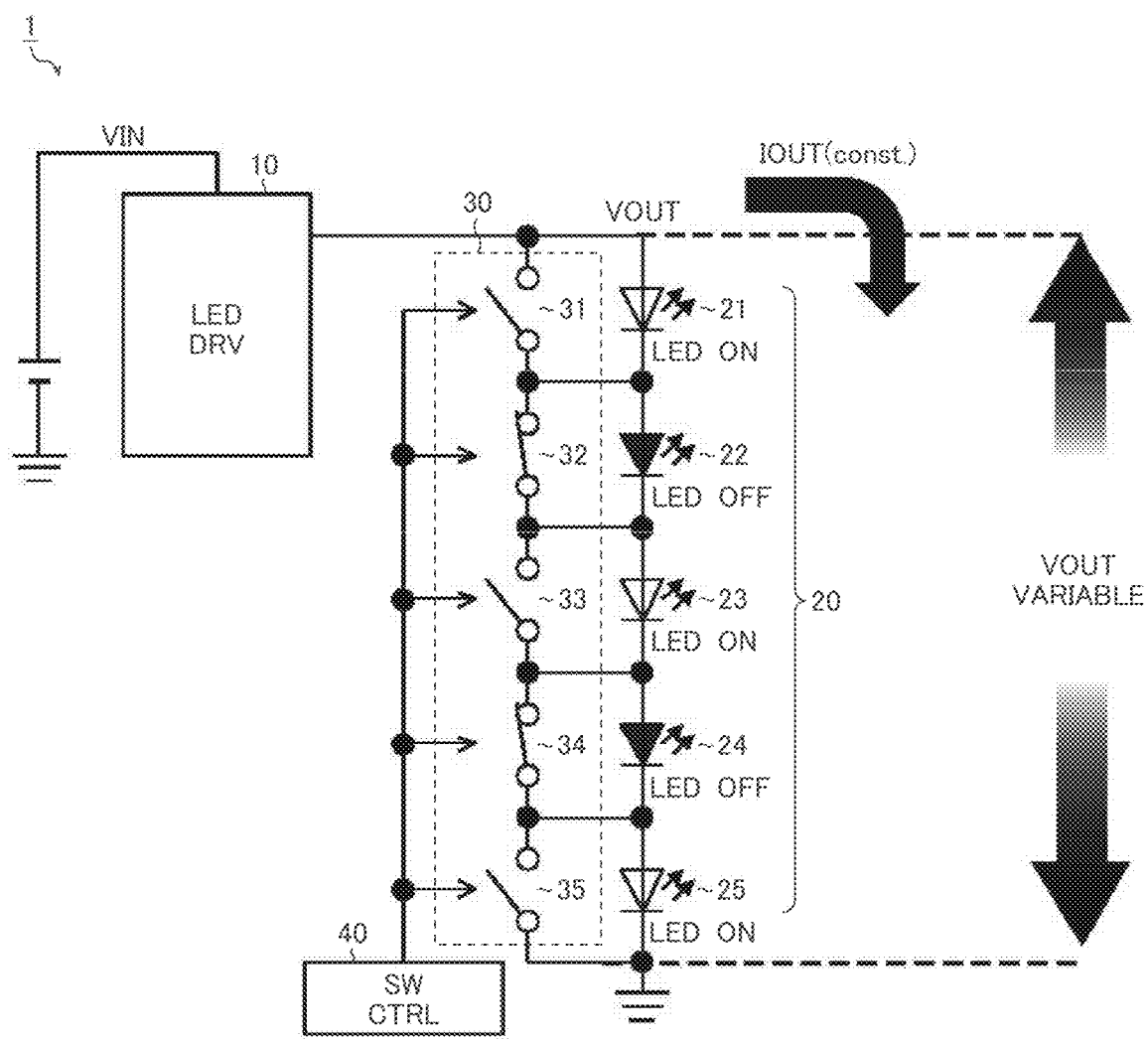
FIG. 18 is a diagram showing an LED light-emitting device of a variable-light-distribution type.

FIG. 18 is a diagram showing an LED light-emitting device 1 of a variable-light-distribution type. The LED light-emitting device 1 of this configuration example further includes, in addition to the components shown as an example in FIG. 1, a switch matrix 30 and a switch controller 40.

The switch matrix 30 is a means for individually lighting and extinguishing LEDs 21 to 25 that are connected in series as the LED string 20, and includes switches 31 to 35. The switches 31 to 35 are connected in parallel with the LEDs 21 to 25 respectively.

The switch controller 40 is the main agent for the control of the switch matrix 30. For example, keeping the LEDs 21, 23, and 25 lit while keeping the LEDs 22 and 24 extinguished can be achieved by keeping the switches 31, 33, and 35 off and the switches 32 and 34 on as shown in FIG. 18.

LED light-emitting devices 1 of a variable-light-distribution type as described above are in increasingly common use these days as next-generation headlights (what is generally called ADB headlights) on vehicles. Using headlights of a variable-light-distribution type makes it possible, during cruising with high beams, to control the light distribution pattern so as to partly turn off the light emission from the headlights. It is thus possible to secure a far field of view without dazzling the drivers of on-coming and preceding vehicles.

Figure 19:
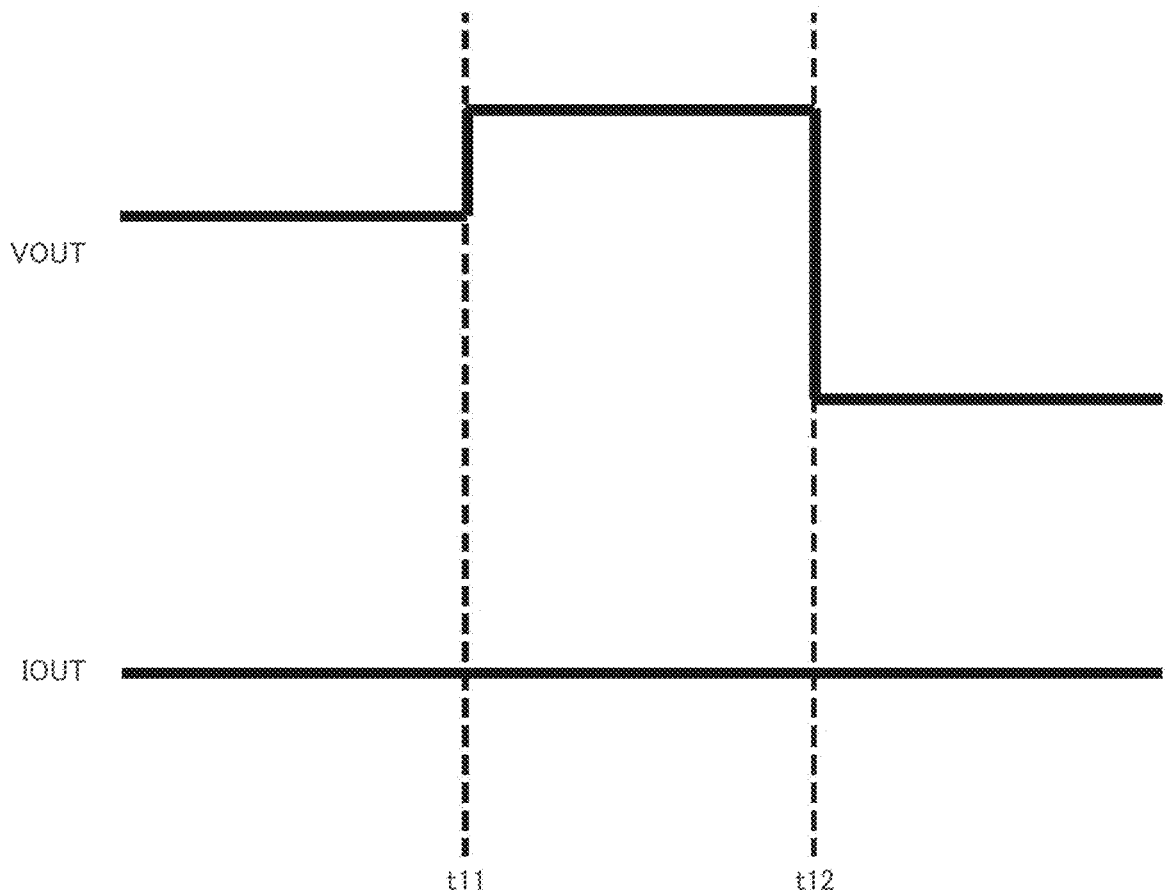
FIG. 19 is a diagram showing a relationship between an output voltage and an output current.

FIG. 19 is a diagram showing a relationship between the output voltage VOUT and the output current IOUT in the LED light-emitting device 1 of a variable-light-distribution type. In the diagram, at each of time points t11 and t12, the number of LEDs lit in the LED string 20 is changed and the output voltage VOUT varies accordingly. In an application like this in which the output voltage VOUT changes frequently, keeping the output current IOUT at a constant value requires fast response of the output current IOUT to the variation of the output voltage VOUT.

In view of that, it can be understood that, for a driving control means in the LED light-emitting device 1 of the variable-light-distribution type, the LED driving control device 100 described previously is very suitable.

Application to Vehicles

Figure 20:
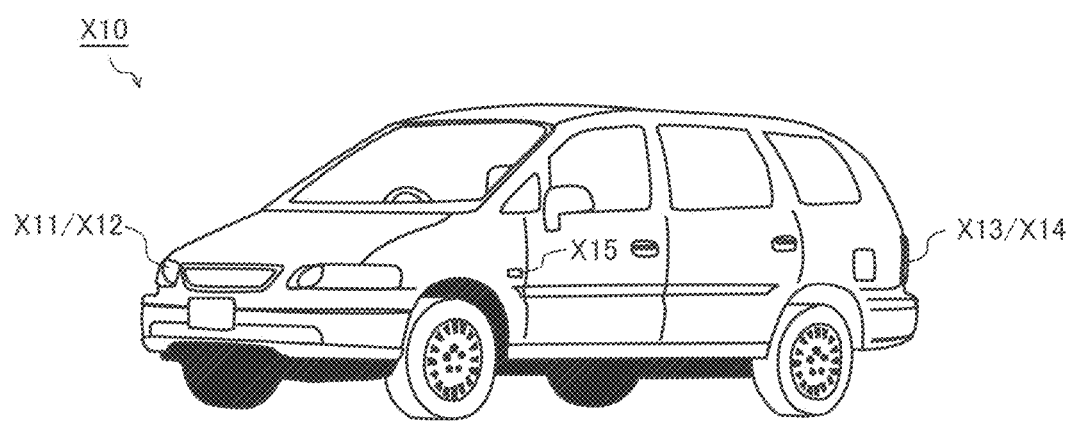
FIG. 20 is an exterior view (front) of a vehicle incorporating an LED light-emitting device.
Figure 21:
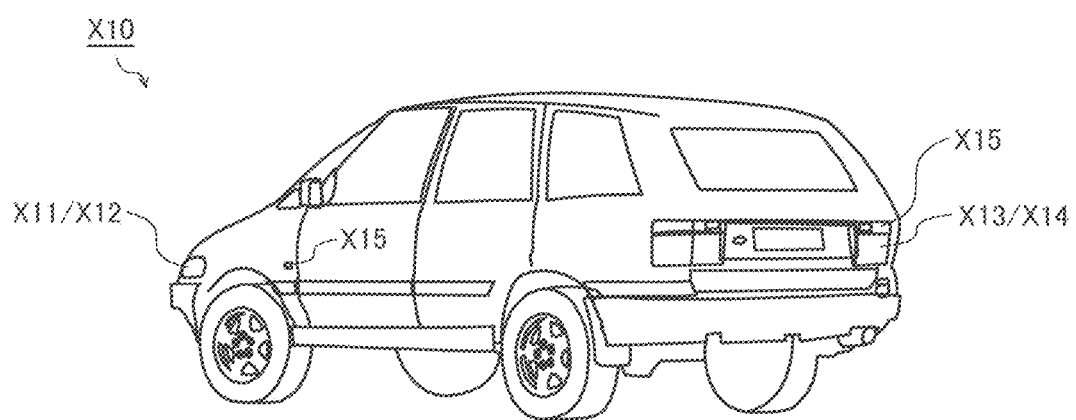
FIG. 21 is an exterior view (rear) of a vehicle incorporating an LED light-emitting device.

The LED light-emitting device 1 can be suitably used, as shown in FIGS. 20 and 21, as various lights on a vehicle X10, such as headlights (including, as necessary, high beams, low beams, small lights, fog lights, etc.) X11, daylight running lights (DRLs) X12, taillights (including, as necessary, small lights, rear lights, etc.) X13, stoplights X14, turn lights X15, etc.

Figure 22:
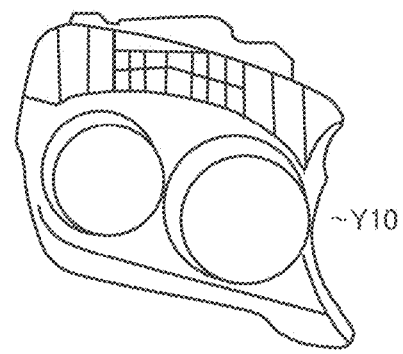
FIG. 22 is an exterior view of an LED headlight module.
Figure 23:
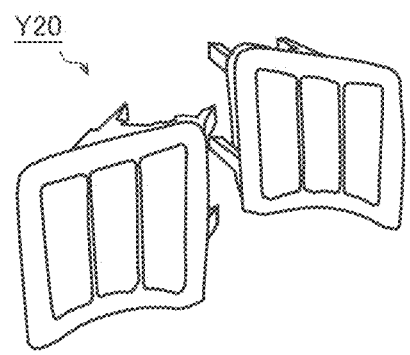
FIG. 23 is an exterior view of an LED turn light module.
Figure 24:
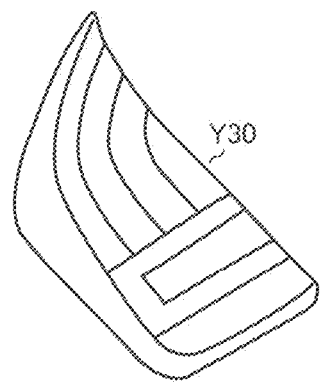
FIG. 24 is an exterior view of an LED taillight module.

The LED driving control device 100 can be provided as a module that it constitutes together with the LED string 20 as the driving target (like the LED headlight module Y10 in FIG. 22, the LED turn light module Y20 shown in FIG. 23, and the LED taillight module Y30 shown in FIG. 24), or can be provided as a separate IC independent of the LED string 20.

Light-Emitting Element Driving Circuit Device

Figure 25:
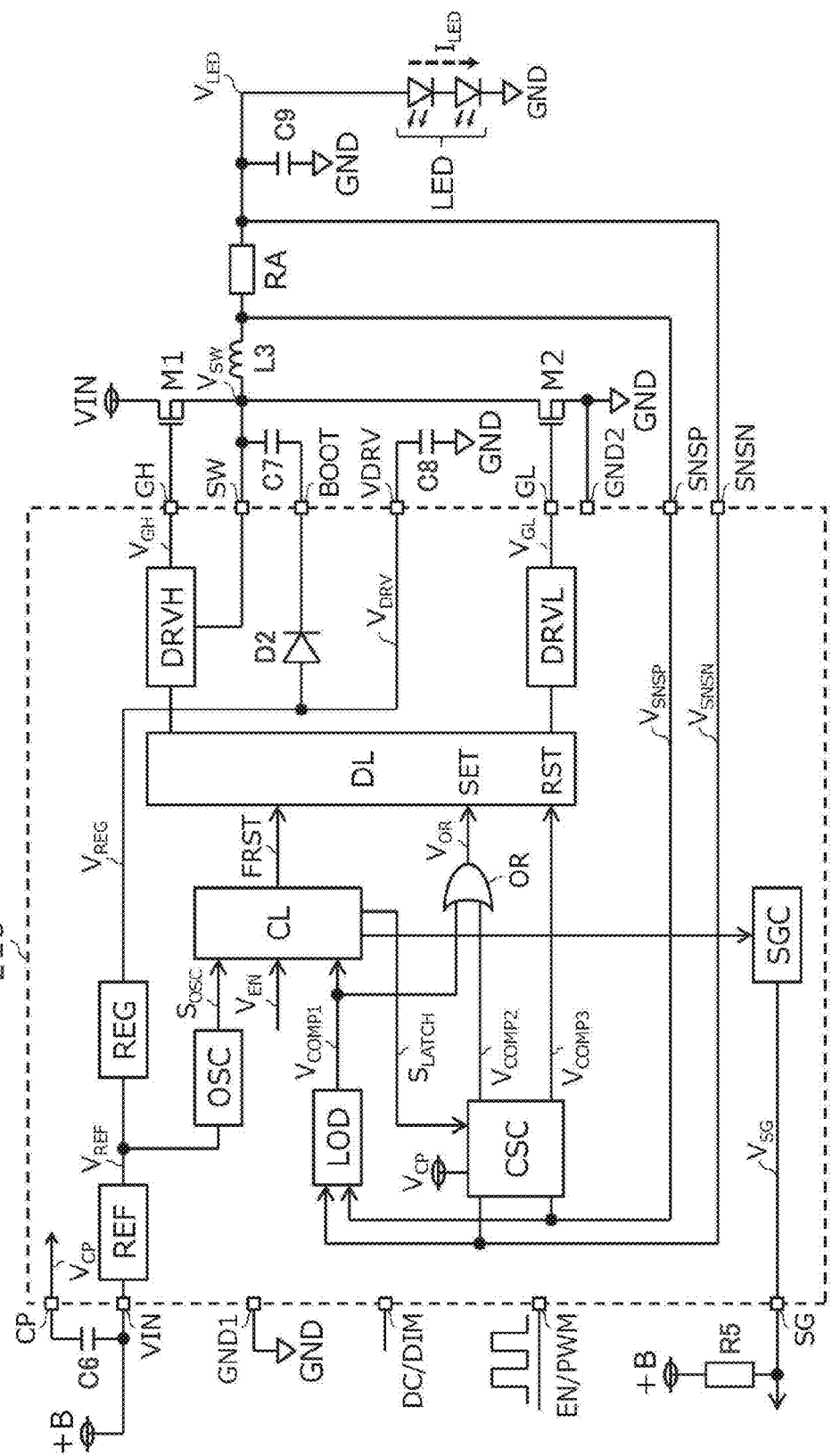
FIG. 25 is a circuit diagram showing an outline of a light-emitting element driving circuit device according to the present invention.

FIG. 25 is a circuit diagram showing an outline of a light-emitting element driving circuit device according to the present invention. The light-emitting element driving circuit device 200 includes an integrated circuit 210 configured as, for example, a semiconductor integrated circuit.

The integrated circuit 210 includes external terminals GH, SW, BOOT, VDRV, GL, GND 2, SNSP, SNSN, SG, EN/PWM, DC/DIM, GND1, VIN and CP.

The above-mentioned external terminals are coupled directly or via other circuit elements to external components such as a high-side transistor M1, a low-side transistor M2, a resistor R5, a current sense resistor RA, capacitors C6 to C9, an inductor L3, and an LED in an organic manner to constitute a switching regulator and the light-emitting element driving circuit device 200. In the LED, a plurality of light-emitting elements are connected in series. The current sense resistor RA serves to sense the LED current ILED that passes through the LED, and also serves to set the LED current ILED.

The external terminal GH is a high-side driving terminal for the driving of the high-side transistor M1, and the gate of the high-side transistor M1 is connected to it. The high-side transistor M1 is configured as, for example, an NMOS transistor or a bipolar NPN transistor. In one embodiment of the present invention, an NMOS transistor is used. The high-side transistor M1 acts as a high-side switching transistor that is connected to the power terminal VIN side. The external terminal SW is intended, in a configuration that employs a bootstrap circuit, to level-shift a high-side driver DRVH to the high-potential side. With the switching signal VSW that appears at the external terminal SW, the circuit operating point of the high-side driver DRVH is level-shifted to the high-potential side. No description of the circuit in this aspect, however, will be given. The high-side transistor M1 can be replaced with a PMOS transistor or a bipolar PNP transistor.

Between the external terminal SW and a ground potential GND, the inductor L3, the current sense resistor RA, and the capacitor C9 are connected in series. The first terminal of the capacitor C9 is connected to the anode of one LED. The cathode of the LED is connected to the anode of another LED, and such circuit connection is repeated so that a plurality of LEDs are connected in series. The cathode of the LED in the last stage is connected to the ground potential GND. The second terminal of the capacitor C9 is connected to the ground potential GND.

The external terminal BOOT is a bootstrap terminal. Between the external terminal BOOT and the external terminal SW, the capacitor C7 is connected to constitute a well-known bootstrap circuit. The capacitor C7 can be provided, instead of outside the integrated circuit 210, inside it. In that case, the external terminal BOOT is not necessary.

The external terminal VDRV is intended for connection with the capacitor C8 for stabilizing a internal circuit supply voltage VREG that is generated from the supply voltage +B supplied to the input voltage VIN and that is used to drive the integrated circuit 210.

The external terminal GL is a low-side driving terminal for the driving of the low-side transistor M2, and the gate of the low-side transistor M2 is connected to it. The low-side transistor M2 is configured as, for example, an NMOS transistor or a bipolar NPN transistor. In one embodiment of the present invention, like the high-side transistor M1, an NMOS transistor is used. The low-side transistor M2 serves as a synchronous rectification transistor that is connected to a ground terminal GND2, and also serves as a current path for the charging of the bootstrap capacitor C7. The ground terminal GND2 is, together with the ground terminal GND1 described later, connected to the ground potential GND.

Now, the circuit connection between and related to the low-side and high-side transistors M2 and M1 will be described. The drain of the high-side transistor M1 is connected to the power terminal VIN. The source of the high-side transistor M1 is connected to the drain of the low-side transistor M2. The source of the low-side transistor M2 is connected to the ground potential GND2 (GND). Thus, the main conducting path of the high-side transistor M1 and the main conducting path of the low-side transistor M2 are connected in series between the power terminal VIN and the ground terminal GND2 (ground potential GND). Between the common connection node of the high-side and low-side transistors M1 and M2 (i.e., the external terminal SW) and the ground potential GND, the inductor L3, the current sense resistor RA, and the capacitor C9 are connected in series.

At the first terminal of the capacitor C9, an LED driving voltage VLED for driving the LED appears. As a result of the LED driving voltage VLED being supplied to the LED, the LED current ILED is supplied to the LED.

FIG. 25 shows a well-known synchronous-rectification bucking (step-down) switching regulator of a bootstrap type. Light-emitting element driving circuit devices according to the present invention, however, can be applied to boosting/bucking switching regulators and boosting switching regulators as well. Actually, their application encompasses switching regulators in general and is not limited to those of a bootstrap type.

The ground terminal GND2 is intended as a grounded terminal for circuit blocks that handle a comparatively high current that passes in the high-side and low-side transistors M1 and M2, the inductor L3, the capacitor C9, the LED, etc.

The external terminals SNSP and SNSN are for sensing the current that passes through the inductor L3 and the current sense resistor RA. The sensing of the current here is achieved by sensing the voltage drop that occurs across the terminals of the current sense resistor RA.

The external terminal SG is intended to give out, with sound, a lamp, or the like, a signal resulting from determining whether or not the circuit operation of the integrated circuit 210 is normal. Inside the integrated circuit 210, to which the external terminal SG is connected, an unillustrated open-drain transistor is connected. Between the external terminal SG and the supply voltage +B, the pull-up resistor R5 is connected.

The external terminal EN/PWM is an enable input/WPM dimming input terminal. Feeding an enable signal VEN via the external terminal EN/PWM permits the integrated circuit 210 and the entire light-emitting element driving circuit device 200 to be brought into an enabled state. On the other hand, feeding an unillustrated rectangular-wave signal for dimming via the external terminal EN/PWM permits adjustment of the time for which a current is passed through the LED and thereby achieve dimming No description of the circuit configuration in this aspect, however, will be given.

The external terminal DC/DIM is a DC dimming input terminal. In accordance with the voltage value fed to the external terminal DC/DIM, the average current that is passed through the LED is adjusted.

The external terminal GND1 is intended as a grounded terminal for, of the various circuit blocks incorporated in the integrated circuit 210, those which handle comparatively low currents (i.e., low-signal circuit blocks). The external terminals GND1 and GND2 are eventually connected together to the ground potential GND.

The external terminal VIN is a terminal to which the supply voltage +B for driving the integrated circuit 210 is fed. The external terminal CP is a terminal for connection with the charge-pump capacitor C6. The capacitor C6 is connected between the external terminal CP and the external terminal VIN. The external terminal CP is intended to serve as a voltage source separate from the external terminal VIN in the integrated circuit 210. The charge-pump voltage VCP fed in via the external terminal CP is used as a voltage source for circuits with comparatively low circuit currents, such as an LED current sense circuit CSC, which will be described later. The charge-pump voltage VCP appears at the external terminal CP, and the external terminal CP and the external terminal BOOT are connected together by an unillustrated diode provided within the integrated circuit 210.

Next, the internal circuit configuration of the integrated circuit 210 and the external terminals around it will be described.

A reference voltage source REF is supplied with the supply voltage +B connected to the external terminal VIN to generate a reference voltage Vref. The reference voltage source REF is configured as, for example, a bandgap constant voltage circuit, and generates a reference voltage Vref of, for example, about 1.2 V.

A power regulator REG is configured as, for example, a linear regulator, and generates a predetermined internal circuit supply voltage VREG by using the reference voltage Vref as a reference voltage source. The internal circuit supply voltage VREG generated by the power regulator REG is fed, for example as a bootstrap voltage source, to the anode of a diode D2. The cathode of the diode D2 is connected to the external terminal BOOT.

A clock signal oscillator OSC can be configured as, for example, a well-known type of oscillator such as a CR oscillator or a ring oscillator. The clock signal oscillator OSC incorporates a constant current source circuit, a comparator, a capacitor, etc., of which none is illustrated. The unillustrated constant current source circuit etc. are driven based on the reference voltage Vref generated by the reference voltage source REF. The clock signal oscillator OSC generates a clock signal SOSC with a frequency of, for example, 200 kHz to 10 MHz (a period of 5 μs to 0.1 μs).

A control logic circuit CL includes: a frequency division circuit that is fed with the clock signal Sosc generated by the clock signal oscillator OSC to generate predetermined frequency-divided signals; a combining circuit that combines together a plurality of frequency-divided signals generated by the frequency division circuit to generate a predetermined signal; a counter that counts a predetermined time based on the output signal from the combining circuit; etc. A specific circuit configuration of the control logic circuit CL will be described later. The control logic circuit CL comes into an enabled state when the enable signal VEN is set to, for example, high level.

An LED open detection circuit LOD monitors whether the LED is in a normal state or in an abnormal state. As will be clarified later, the LED open detection circuit LOD includes at least one comparator. The first terminal (high-potential-side terminal) of the LED open detection circuit LOD is fed with the voltage VSNSP that appears at the external terminal SNSP, that is, the voltage that appears at the first terminal of the current sense resistor RA. The second terminal (low-potential-side terminal) of the LED open detection circuit LOD is fed with the voltage VSNSN (=VLED) that appears at the external terminal SNSN. Thus, the LED open detection circuit LOD receives the voltage that appear across the terminals of the current sense resistor RA. When the LED is operating normally, the voltage at the first terminal of the current sense resistor RA (at the external terminal SNSP) is higher than the voltage at the second terminal of the current sense resistor RA (at the external terminal SNSN) (VSNSP>VSNSN). When the electrical connection of the LED is normal, the comparator output signal VCOMP1 of the LED open detection circuit LOD is set at, for example, low level. When the LED goes into the open state, the level relationship of the voltages reverses. Specifically, the voltage at the second terminal of the current sense resistor RA (at the external terminal SNSN) becomes higher than the voltage at the first terminal of the current sense resistor RA (at the external terminal SNSP) (VSNSN>VSNSP), and the comparator output signal VCOMP1 of the LED open detection circuit LOD turns to high level.

As will be clarified later, the LED current sense circuit CSC includes at least two comparators for detecting the peak value and the bottom value of the current that passes through the current sense resistor RA. For example, they output, on detecting the bottom value, a high-level comparator output signal VCOMP2 and, on detecting the peak value, a high-level comparator output signal VCOMP3. The comparator output signal VCOMP2 is fed to one input terminal of an OR circuit OR. The other input terminal of the OR circuit OR is fed with the comparator output signal VCOMP1 of the LED open detection circuit LOD. Accordingly, from the output of the OR circuit OR, when at least one of the comparator output signals VCOMP1 and VCOMP2 is at high level, the OR output signal VOR is output at high level and, when the comparator output signals VCOMP1 and VCOMP2 are both at low level, the OR output signal VOR is at low level. The OR output signal VOR is, as the set signal SET for a driving logic circuit DL, fed directly to the driving logic circuit DL. The reason that the set signal SET for the driving logic circuit DL is generated through an OR operation between the comparator output signals VCOMP1 and VCOMP2 is to detect an LED open state by keeping the switching signal VSW at high level even when the LED is in the open state or even when the LED current ILED has reached the bottom value.

The comparator output signal VCOMP3 output from the LED current sense circuit CSC acts as a reset signal RST for detecting the peak value of the LED current ILED to reduce the LED current ILED and keep it at a predetermined average value. The reset signal RST (=VCOMP3) acts, while the LED is operating normally, to detect the peak value of the LED current ILED and reduce it down to the bottom value. Accordingly, as the reset signal RST, the comparator output signal VCOMP3 output from the LED current sense circuit CSC is fed directly to the driving logic circuit DL without being subjected to any operational processing.

Figure 26:
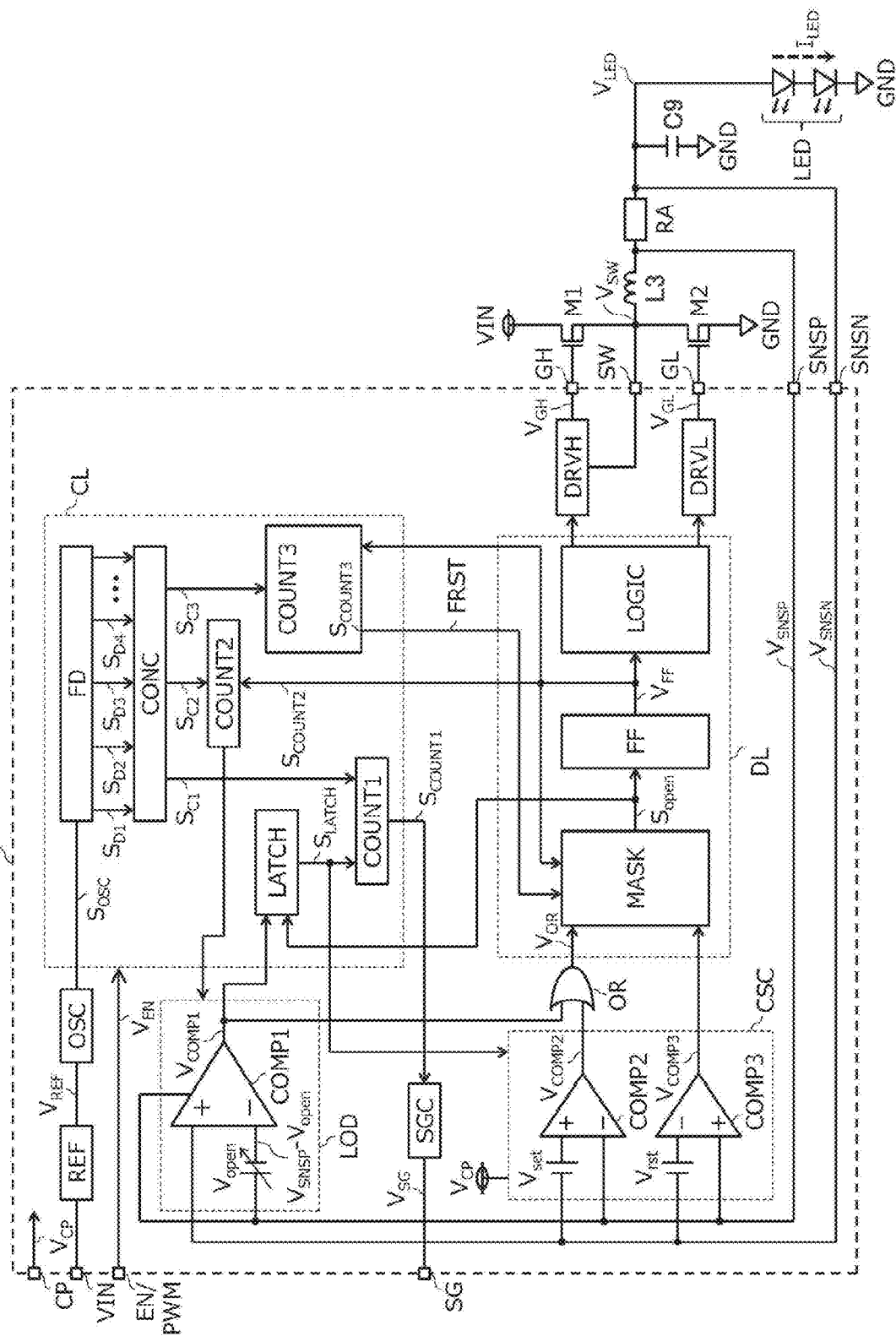
FIG. 26 is a circuit diagram showing the details of the light-emitting element driving circuit device in FIG. 25.

FIG. 26 is a circuit diagram showing the details of the light-emitting element driving circuit device 200 in FIG. 25. In the light-emitting element driving circuit device 200A as it is shown in FIG. 26, the circuit configuration of the LED open detection circuit LOD, the control logic circuit CL, the LED current sense circuit CSC, and the driving logic circuit DL is shown more specifically.

The LED open detection circuit LOD is composed of a first comparator COMP1 and a first threshold value Vopen. The first threshold value Vopen is connected to the inverting input terminal (−) of the first comparator COMP1. The first threshold value Vopen is varied at least between two levels. One level of the first threshold value Vopen is a voltage (current) with a comparatively low level that is used when the light-emitting device is in the normal state, the level being, for example, about 10 mV and being set in accordance with the resistance of the current sense resistor RA and the level of the LED current ILED whenever necessary. The other level of the first threshold value Vopen is a voltage (current) that is used when the LED is in the open state, the level being set at one digit or more higher than 10 mV, for example, at about 150 mV. The reason that the first threshold value Vopen is switched, for example, from 10 mV to 150 mV is to enable the first comparator COMP1 to output a signal of which the polarity is inverted between when the LED is normal and when it is open.

The non-inverting input terminal (+) of the first comparator COMP1 is fed with the voltage VSNSN that appears at the external terminal SNSN. The inverting input terminal (−) of the first comparator COMP1 is fed with a voltage (VSNSP−Vopen) that is lower by the first threshold value Vopen than the voltage VSNSP appearing at the external terminal SNSP. During the normal operation of the LED, the relationship VSNSP>VSNSN is maintained. Here, for example, settings such that VSNSP−VSNSN≈170 mV and Vopen≈10 mV make the potential at the inverting input terminal (−) of the first comparator COMP1 10 mV lower than the voltage VSNSP. Even then, the potential at the inverting input terminal (−) is still about 160 mV higher than that at the non-inverting input terminal (+), and thus the comparator output signal VCOMP1 of the first comparator COMP1 is at low level. Here, if, for the sake of discussion, the level of the first threshold value Vopen is set higher than 10 mV, for example, at about 50 mV, this inconveniently results in lower LED open detection accuracy. To avoid that, in one embodiment of the present invention, the first threshold value Vopen is set at 5 mV to 15 mV. As the voltage source for the first comparator COMP1, the voltage VSNSP appearing at the external terminal SNSP is used. As the power source for the first comparator COMP1, the charge-pump voltage VCP, which is the power source for the LED current sense circuit CSC, can also be used. However, using the charge-pump voltage VCP as the power source for the first comparator COMP1 results in a lower charge-pump voltage VCP and hence insufficient accumulation of electric charge in the capacitor C1, adversely affecting the circuit operation. To avoid this, in one embodiment of the present invention, the voltage on the output side of the switching regulator is used.

The control logic circuit CL includes a frequency division circuit FD, a combining circuit CONC, a first counter COUNT1, a second counter COUNT2, a third counter COUNT3, and a latch circuit LATCH.

The frequency division circuit FD receives the clock signal SOSC generated by the clock signal oscillator OSC to generate, for example, four frequency-divided signals comprising, for example, a first frequency-divided signal SD1, a second frequency-divided signal SD2, a third frequency-divided signal SD3, and a fourth frequency-divided signal SD4. The first frequency-divided signal SD1 is set at, for example, the same frequency (period) as the clock signal SOSC. The second frequency-divided signal SD2 is a signal resulting from subjecting the clock signal SOSC to, for example, one-fourth frequency division (four-times period multiplication). The third frequency-divided signal SD3 is a signal resulting from subjecting the clock signal SOSC to, for example, one-sixteenth frequency division (sixteen-times period multiplication). The fourth frequency-divided signal SD4 is a signal resulting from subjecting the clock signal SOSC to, for example, one-sixty-fourth frequency division (sixty-four-times period multiplication). These frequency division ratios N are set appropriately in accordance with the operation of the combining circuit CONC and the count times in the respective counters in the subsequent stages.

The combining circuit CONC combines together the first, second, third, and fourth frequency-divided signals SD1, SD2, SD3, and SD4 output from the frequency division circuit FD to generate a first combination signal SC1, a second combination signal SC2, and a third combination signal SC3 that are fed respectively to the first, second, and third counters COUNT1, COUNT2, and COUNT3 in the subsequent stage. The combining circuit CONC is configured as a combination of various logic circuits such as NAND circuits and inverters.

The first, second, and third counters COUNT1, COUNT2, and COUNT3 are used as a measuring means for measuring, when the LED goes into the open state, the duration of that state by use of the combination signals SC1, SC2, and SC3 generated by the combining circuit CONC in the preceding stage. They are also used, when the LED goes into a normal or open state, to output some alert signal (sounding, lighting, or the like) to outside the integrated circuit 210 via the external terminal SG.

The first counter COUNT1 receives the combination signal SC1 output from the combining circuit CONC to measure a time of, for example, 1.28 ms. Here, a time of 1.28 ms is merely one design choice taken for the measurement of the duration of an LED open state. When, after the detection of an LED open state, a time of 1.28 ms elapses, a notification as to the presence or absence of connection is given out via a notifying means SGC and the external terminal SG to outside the integrated circuit 210 by sounding or by lighting, extinguishing, or blinking a lamp.

The second counter COUNT2 receives the second combination signal SC2 output from the combining circuit CONC to measure a time of, for example 100. Here, a time of 10 μs is, like a time of 1.28 ms, merely a design choice. A time of 10 μs here is a time relative to which to determine whether or not the circuit connection of the LED is in a normal or open state. A time of 10 μs is set as a criterion for determining whether or not the high-level duration of the switching signal VSW appearing at the switching terminal SW is within 10 μs, in other words, for determining an LED open state.

The third counter COUNT3 receives the third combination signal SC3 from the combining circuit CONC to measure a time of, for example, about 80 μs. Here, a time of 80 μs is, like a time of 1.28 μs and a time of 10 μs, merely one design choice. The third counter COUNT3 sets the high-level duration of the switching signal VSW appearing at the external terminal SW at, for example, 80 μs. The low-level duration of the switching signal VSW is set at, for example, 250 ns, the overall period being 80.25 μs. A period of 80.25 μs recurs during the period of 1.28 ms. Here, let the high-level duration be DH and the low-level duration be DL. Then the proportion of the high-level duration in the overall period, that is, the duty ratio αDH, is given by αDH=80/(80+0.25)≈0.997. In the present invention, it is preferable that αDH be set in the range from 0.950 to 0.999. This makes it possible to supply the capacitor C7 with sufficient electric charge within the range of the permissible current in the low-side transistor M2.

As one embodiment of the present invention, a configuration has been dealt with that uses a counter (timer) for measurement as a duration determining means for measuring the high-level or low-level duration. This, however, is not meant as any limitation. For example, the duration determining means can include an integrator that integrates the switching signal VSW and a comparator that compares the integrated voltage output from the integrator with a predetermined reference voltage and be configured to give out a notification as to whether the connection status of the LED is good or poor based on the output from the comparator. In one embodiment of the present invention, when the LED goes into the open state, the peak value of the switching signal VSW becomes nearly equal to the supply voltage +B, and the duty ratio is set at 95% or higher; thus, a high integrated voltage can be generated. It is thus possible to easily distinguish the state from one during normal operation.

Instead, the duration determining means can include a voltage-current (V-I) converting means for converting the switching signal VSW into a current and be configured to amplify the current resulting from conversion by the V-I converting means with a current mirror circuit and then convert the amplified current into a voltage so as to give out, based on the level of the output voltage, a notification as to whether the connection status of light-emitting elements is good or poor.

The latch circuit LATCH is fed with the output signal VCOMP1 of the first comparator COMP1 and an open detection enable/disable signal Sopen. The latch circuit LATCH receives the comparator output signal VCOMP1 to generate a latch signal SLATCH by using the open detection enable/disable signal Sopen as a trigger.

The LED current sense circuit CSC includes a second comparator COMP2 and a third comparator COMP3 that operate by using the charge-pump voltage VCP as a voltage source. While the second comparator COMP2 detects the bottom value of the LED current ILED passing through the LED and the third comparator COMP3 detects the peak value of the LED current ILED passing through the LED, the LED current ILED is controlled to remain at a predetermined average value. The LED current ILED is sensed with the current sense resistor RA. The average value of the LED current ILED is, for example, about 1.4 A, and the current sense resistor RA is set at, for example 0.1Ω to 0.15Ω. Accordingly, across the ends of the current sense resistor RA appears a voltage difference of about 140 mV to 210 mV.

The non-inverting input terminal (+) of the second comparator COMP2 is connected to the high-potential terminal of a voltage source that sets a second threshold value Vset. The low-potential terminal of the voltage source that sets the second threshold value Vset is connected to the external terminal SNSN to be fed with the voltage VSNSN. The external terminal SNSN is a terminal to which the potential at the low-potential terminal of the current sense resistor RA is applied. The inverting input terminal (−) of the second comparator COMP2 is connected to the external terminal SNSP to be fed with the voltage VSNSP. The external terminal SNSP is a terminal to which the potential at the high-potential terminal of the current sense resistor RA is applied. The non-inverting input terminal (+) of the second comparator COMP2 is fed with a voltage (VSNSN+Vset) which is the sum of the voltage VSNSN appearing at the external terminal SNSN and the second threshold value Vset.

The non-inverting input terminal (+) of the third comparator COMP3 is connected to the external terminal SNSP to be fed with the voltage VSNSP. The external terminal SNSP is a terminal to which the potential at the high-potential terminal of the current sense resistor RA is applied. The inverting input terminal (−) of the third comparator COMP3 is connected to the high-potential terminal of a voltage source that sets a third threshold value Vrst. The low-potential terminal of the voltage source that sets the third threshold value Vrst is connected to the external terminal SNSN to be fed with the voltage VSNSN. The external terminal SNSN is a terminal to which the potential at the low-potential terminal of the current sense resistor RA is applied. The inverting input terminal (−) of the third comparator COMP3 is fed with a voltage (VSNSN+Vset) which is the sum of the voltage VSNSN appearing at the external terminal SNSN and the third threshold value Vrst.

The driving logic circuit DL includes a masking circuit MASK, a flip-flop FF, and a logic circuit LOGIC. The masking circuit MASK suspends the operation of detecting the connection status of the LED for a predetermined time to prevent erroneous detection of the connection status of the LED when the LED has gone into the open state or when it comes from the open state back into the normal state. Specifically, to prevent malfunctioning due to ringing and switching noise that occurs at the time point that the switching signal VSW turns from high level to low level and at the time point that the switching signal VSW turns from low level to high level, the masking circuit MASK suspends the operation of detecting the connection status of the LED for a predetermined time T4 starting at the time point that the switching signal VSW turns from high level to low level and for the predetermined time T4 starting at the time point that the switching signal VSW turns from low level to high level. In other words, when the predetermined time T4 elapses, the masking circuit MASK starts the operation of detecting the connection status of the LED. The masking circuit MASK generates an unillustrated masking signal in synchronization with the rise and fall of a flip-flop signal VFF. The masking signal invalidates the action of the set signal SET that is fed to the masking circuit MASK.

The flip-flop FF generates unillustrated driving input signals that drive the high-side and low-side drivers DRVH and DRVL in the succeeding stage in synchronization with the open detection enable/disable signal Sopen output from the masking circuit MASK. The flip-flop signal VFF from the flip-flop FF is used as a control and synchronizing signal for the second and third counters COUNT2 and COUNT3.

The logic circuit LOGIC includes circuit blocks such as a dead time generation circuit and a level shift circuit. The dead time generation circuit is for securing a dead time between the high-side and low-side gate signals VGH and VGL that drive the high-side and low-side driver DRVH and DRVL in the succeeding stage and of which another is.

The high-side driver DRVH receives a signal from the logic circuit LOGIC, and generates a high-side gate signal VGH which drives the high-side transistor M1. The high-side driver DRVH incorporates a level shift circuit that shifts the circuit operating point to the high-potential side based on the switching signal VSW appearing at the switching terminal SW.

The low-side driver DRVL receives a signal from the logic circuit LOGIC, and generates a low-side gate signal VGH which drives the low-side transistor M2.

In FIG. 26, signals and voltages are exchanged among the LED open detection circuit LOD, the LED current sense circuit CSC, the control logic circuit CL, and the driving logic circuit DL. The interaction among these will now be described. First, the purpose of feeding the comparator output signal VCOMP1 of the first comparator COMP1 provided in the LED open detection circuit LOD to the latch circuit LATCH is, as mentioned previously, to keep the comparator output signal VCOMP1 at high level for a predetermined time T3 when the LED goes into the open state. This makes it possible to measure the duration of an LED open state. The purpose of controlling the LED current sense circuit CSC with the latch signal SLATCH output from the latch circuit LATCH is to stop the circuit operation of the LED current sense circuit CSC on occurrence of an LED open. The LED current sense circuit CSC is intended to measure the peak value and the bottom value of the LED current ILED passing through the LED; on occurrence of an LED open, however, no LED current ILED passes through the LED and thus the LED current sense circuit CSC does not need to operate. Accordingly, the circuit operation of the LED current sense circuit CSC is suspended with the latch signal SLATCH to save power, and the drop in the charge-pump voltage VCP, which is the voltage source for the LED current sense circuit CSC, is restrained to stabilize the circuit operation.

In FIG. 26, the comparator output signal VCOMP1 of the first comparator COMP1 and the comparator output signal VCOMP2 of the second comparator COMP2 are subjected to operation processing by the OR circuit OR so that the OR signal VOR of the OR circuit OR is fed to the masking circuit MASK. Intrinsically, the comparator output signal VCOMP2 of the second comparator COMP2 acts, as what is generally termed a set signal SET, to set the flip-flop FF so that the LED current ILED rises on detection of the bottom value of the LED current ILED passing through the LED. Accordingly, The comparator output signal VCOMP2 of the second comparator COMP2 can be used as it is as the set signal SET. However, in one embodiment of the present invention, in an LED open state, the circuit operation of the second and third comparators COMP2 and COMP3 is suspended, and this inconveniently results in the set signal SET and the reset signal RST not being generated. To cope with this, the comparator output signal VCOMP1 of the first comparator COMP1, which is kept at high level on occurrence of an LED open is used as one input signal to the OR circuit OR. With this circuit configuration, when the LED is in the normal state, the comparator output signal VCOMP2 keeps the OR signal VOR at high level, and when the LED is in the open state, the comparator output signal VCOMP1 keeps the OR signal VOR at high level without fail; thus, the circuit operation of the driving logic circuit DL is kept in a predetermined operating state.

In FIG. 26, the comparator output signal VCOMP3 of the third comparator COMP3 is fed directly to the masking circuit MASK, which is part of the driving logic circuit DL.

Figure 27:
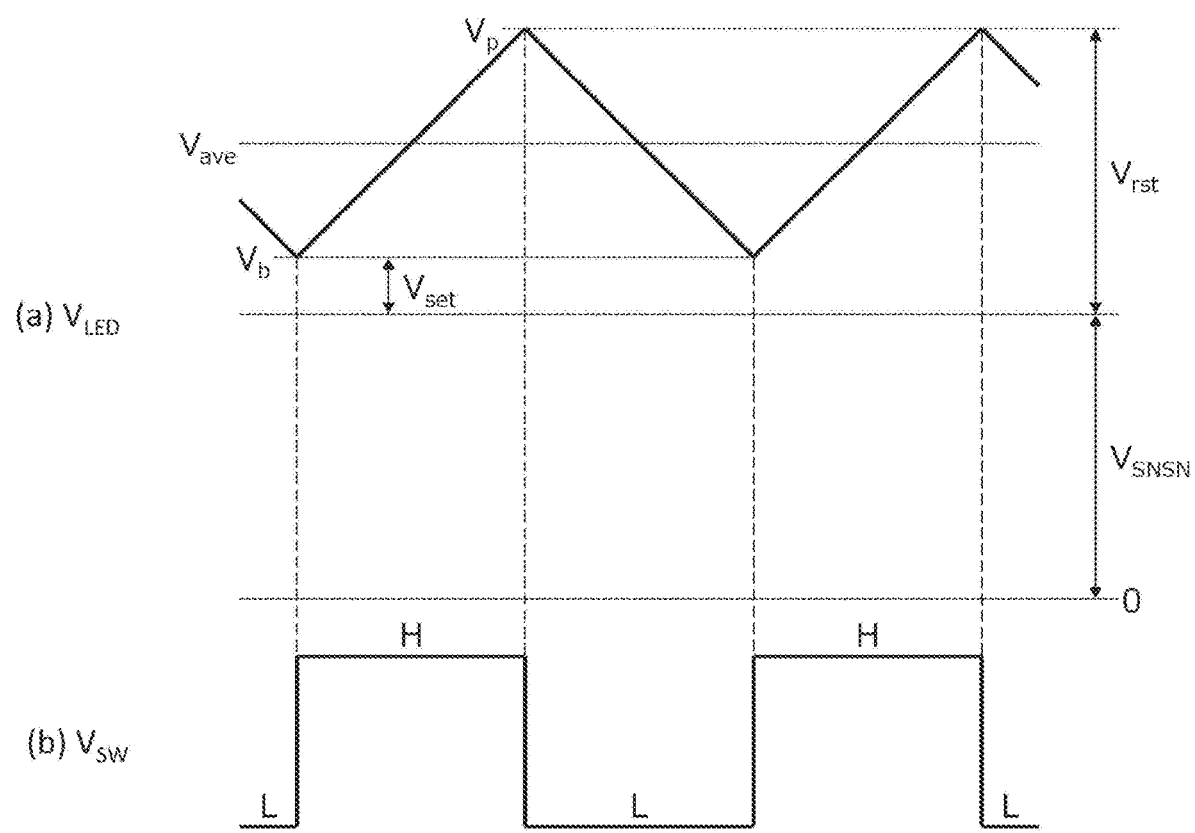
FIG. 27 is a timing chart showing the operation of the light-emitting element driving circuit device in FIG. 26 in a normal state.

FIG. 27 is a timing chart showing the operation of the light-emitting element driving circuit device 200A in FIG. 26 during normal operation. Specifically, it shows, in a case where no fault is recognized in the electrical connection of the LED in the light-emitting element driving circuit device 200A, the LED voltage VLED (=VSNSN), the second threshold value Vset, the third threshold value Vrst, and the switching signal VSW output to the external terminal SW.

(a) The LED voltage VLED is a triangular-wave voltage. The peak value Vp of the triangular-wave voltage equals the sum of the voltage VSNSN appearing at the external terminal SNSN and the third threshold value Vrst. The bottom value of the triangular-wave voltage equals the sum of the voltage VSNSN and the second threshold value Vset. The average of the peak value Vp and the bottom value Vb is the average voltage Vave.

(b) The switching signal VSW shifts from low level L to high level H when the LED voltage VLED is at the bottom value Vb, and shifts from the high level H to the low level L when the LED voltage VLED is at the peak value Vp. The bottom value Vb and the peak value Vp are detected respectively by the comparators COMP2 and COMP3 in FIG. 26.

Figure 28:
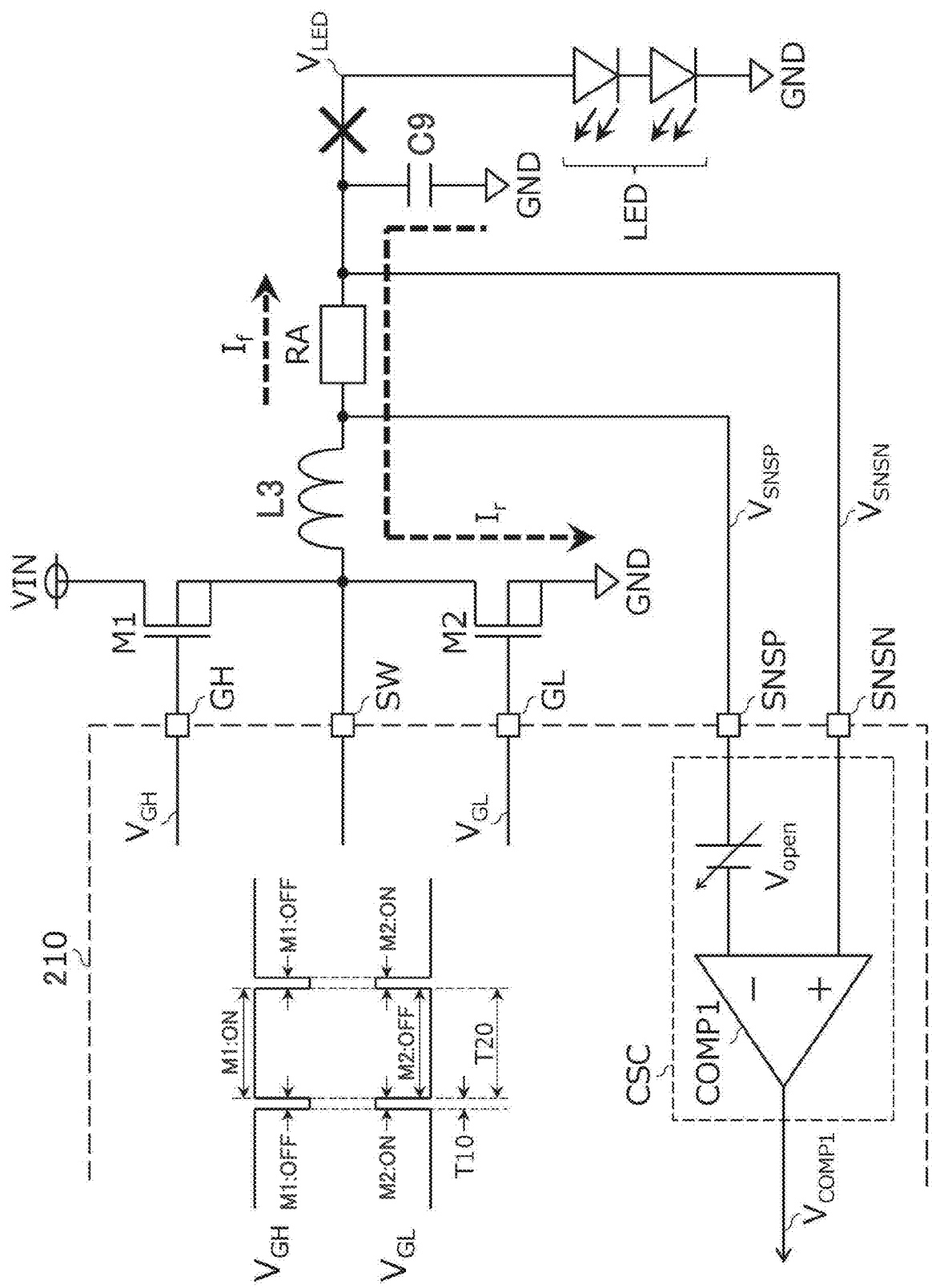
FIG. 28 is a timing chart showing the operation of the light-emitting element driving circuit device in FIG. 26 in an open state.

FIG. 28 is a diagram showing one example of the operation of the light-emitting element driving circuit device 200A in FIG. 26 in the open state. Specifically, it schematically shows the external terminals GH, GL, SW, SNSP, and SNSN along with the states of the circuit elements, currents, voltages, and driving signals connected to them.

When the LED is in the normal state, that is, when the LED is in the state connected to the current sense resistor RA, the LED current ILED passes in the direction indicated by the symbol If. On the other hand, in the open state, that is, when the electrical connection between the current sense resistor RA and the LED is cut as indicated by the cross sign, no LED current ILED passes, and the LED voltage VLED falls down to zero volts. At this point, a certain amount of electric charge has been accumulated in the capacitor C9, and thus, if the low-side transistor M2 is in the on state, the capacitor C9 functions as a voltage source, and a reverse current Jr passes along the path from the capacitor C9 to the current sense resistor RA to the inductor L3 to the low-side transistor M2. That is, a current can be passed through the current sense resistor RA in the direction indicated by the symbol Ir.

In one embodiment of the present invention, when the LED goes into the open state, owing to the circuit configuration employed, the high-side gate signal VGH fed to the gate of the high-side transistor M1 is kept at high level, and the low-side gate signal VGL fed to the gate of the low-side transistor M2 is kept at low level. Accordingly, intrinsically, with the high-side transistor M1 on and the low-side transistor M2 off, no reverse current Jr should pass. In this embodiment, however, a period T10 is secured in which, even when the LED goes into the open state, the high-side transistor M1 is off and the low-side transistor M2 is on. On the other hand, in a period T20, the high-side transistor M1 is on and the low-side transistor M2 is off. The ratio of the period T10 in which the low-side transistor M2 is on to the period T20 in which the high-side transistor M1 is on (i.e., T10:T20) is set at, for example, 1:999 to 5:995; thus, the time for which the low-side transistor M2 is kept on is far shorter than the time for which the high-side transistor M1 is kept on.

When the LED goes into the open state, the low-side transistor M2 remains on for the predetermined period T10 and a reverse current Jr passes as described above. In the LED open state, the voltage VSNSP appearing at the external terminal SNSP and the voltage VSNSN appearing at the external terminal SNSN has the level relationship VSNSN>VSNSP. The inverting input terminal (−) of the first comparator COMP1 is fed with a voltage lower than the voltage VSNSP by the first threshold value Vopen. Here, as mentioned earlier, the first threshold value Vopen is not 10 mV but is switched to about, for example, 150 mV. Accordingly, the potential at the non-inverting input terminal (+) of the first comparator COMP1 is far higher than that at the inverting input terminal (−); thus, the output signal VCOMP1 of the first comparator COMP1 is kept at high level H, and the output signal VCOMP1 is output with its polarity inverted as compared with the low level L that it has when the LED is in the normal state. The switching of the first threshold value Vopen from about 10 mV to about 150 mV that takes place when the LED shifts from the normal state to the open state is achieved, as described previously, by use of switch signals such as the flip-flop signal VFF and the switching signal VSW. The low-side gate signal VGL for turning on the low-side transistor M2 on occurrence of an LED open is generated, as described previously, by the control logic circuit CL and the driving logic circuit DL.

Figure 29:
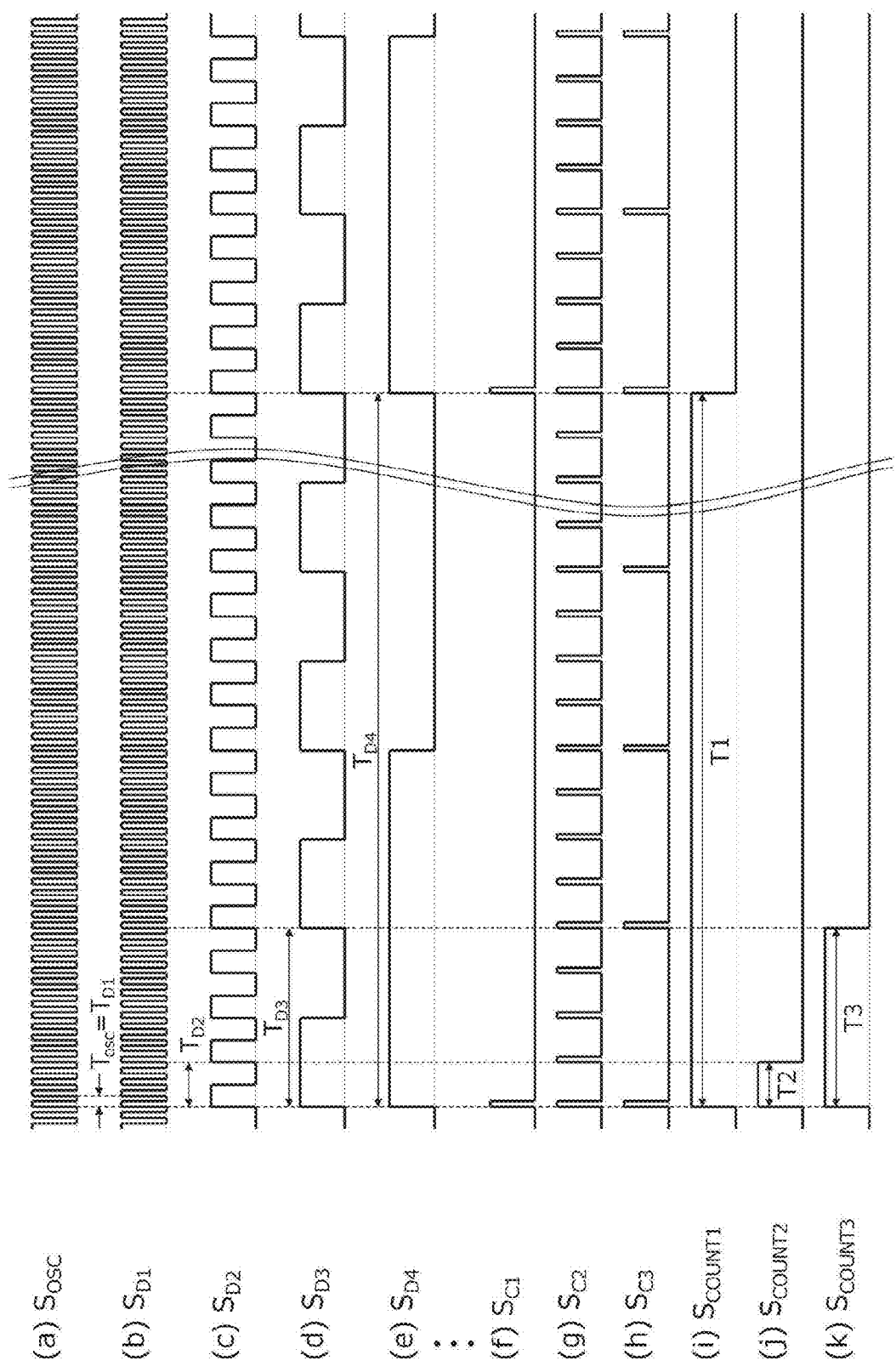
FIG. 29 is a timing chart showing signals at relevant nodes in the control logic circuit in FIG. 28.

FIG. 29 is a timing chart showing the signals at relevant nodes in the control logic circuit CL in FIG. 26. FIG. 29 will now be described with reference to FIGS. 25 to 28.

(a) The clock signal SOSC is generated by the clock signal oscillator OSC. Let the period of the clock signal SOSC be, for example, a period TOSC.

(b) The frequency-divided signal SD1 is generated by the frequency division circuit FD. The frequency-divided signal SD1 is a signal resulting from subjecting the clock signal SOSC to frequency division of, for example, 1/1 time. Accordingly, the period TD1 of the frequency-divided signal SD1 is TD1=1·TOSC.

(c) Like the frequency-divided signal SD1, the frequency-divided signal SD2 is generated by the frequency division circuit FD. The frequency-divided signal SD2 is a signal resulting from subjecting the frequency-divided signal SD1 to frequency division of, for example, ¼ times. Accordingly the period TD2 of the frequency-divided signal SD2 is TD2=4·TD1.

(d) Like the frequency-divided signals SD1 and SD2, the frequency-divided signal SD3 is generated by the frequency division circuit FD. The frequency-divided signal SD3 is a signal resulting from subjecting the frequency-divided signal SD2 to frequency division of, for example, ¼ times. Accordingly, the period TD3 of the frequency-divided signal SD3 is TD3=4·TD2=16·TD1.

(e) Like the frequency-divided signals SD1, SD2, and SD3, the frequency-divided signal SD4 is generated by the frequency division circuit FD. The frequency-divided signal SD4 is a signal resulting from subjecting the frequency-divided signal SD3 to frequency division of, for example, ¼ times. Accordingly, the period TD4 of the frequency-divided signal SD4 is TD4=4·TD3=16·TD2=64·TD1.

The number of frequency-divided signals generated by the frequency division circuit FD and their frequency division ratios are not limited to what has been specifically mentioned above; they can be set appropriately to suit, for example, the configuration of the combining circuit and the counters in the succeeding stages.

(f) The combination signal SC1 is generated by the combining circuit CONC. The combination signal SC1 is a signal resulting from combining together, for example, the frequency-divided signals SD1 and SD4. The combining circuit CONC outputs, as the combination signal SC1, the frequency-divided signal SD1 with the timing that the frequency-divided signal SD4 rises from low level to high level.

(g) The combination signal SC2 is generated by the combining circuit CONC. The combination signal SC2 is a signal resulting from combining together, for example, the frequency-divided signals SD1 and SD2. The combining circuit CONC outputs, as the combination signal SC2, the frequency-divided signal SD1 with the timing that the frequency-divided signal SD2 rises from low level to high level.

(h) The combination signal SC3 is generated by the combining circuit CONC. The combination signal SC1 is a signal resulting from combining together, for example, the frequency-divided signals SD1 and SD3. The combining circuit CONC outputs, as the combination signal SC3, the frequency-divided signal SD1 with the timing that the frequency-divided signal SD3 rises from low level to high level.

The number of combination signals generated by the combining circuit CONC and their periods are not limited to what has been specifically mentioned above; they can be set appropriately to suit, for example, the configuration of the counters in the succeeding stage.

(i) A count signal SCOUNT1 is generated by the first counter COUNT1. The first counter COUNT1 counts, for example, a time T1 (e.g., 1.28 ms) based on the combination signal SC1.

(j) A count signal SCOUNT2 is generated by the second counter COUNT2. The second counter COUNT2 counts, for example, a time T2 (e.g., 10 µs) based on the combination signal SC2.

(k) A count signal SCOUNT3 is generated by the third counter COUNT3. The third counter COUNT3 counts, for example, a time T3 (e.g., 80 µs) based on the combination signal SC3.

The control logic circuit CL eventually generates the count signals SCOUNTT1, SCOUNTT2, and SCOUNTT3 mentioned at (i) to (k) above. As will be understood from what has been described above, the signals generated by the control logic circuit CL are used as a detection signal indicating an open state in the light-emitting element driving circuit device 200 or 200A, a control signal, and a notification signal giving out a notification of the normal state and the abnormal state.

Figure 30:
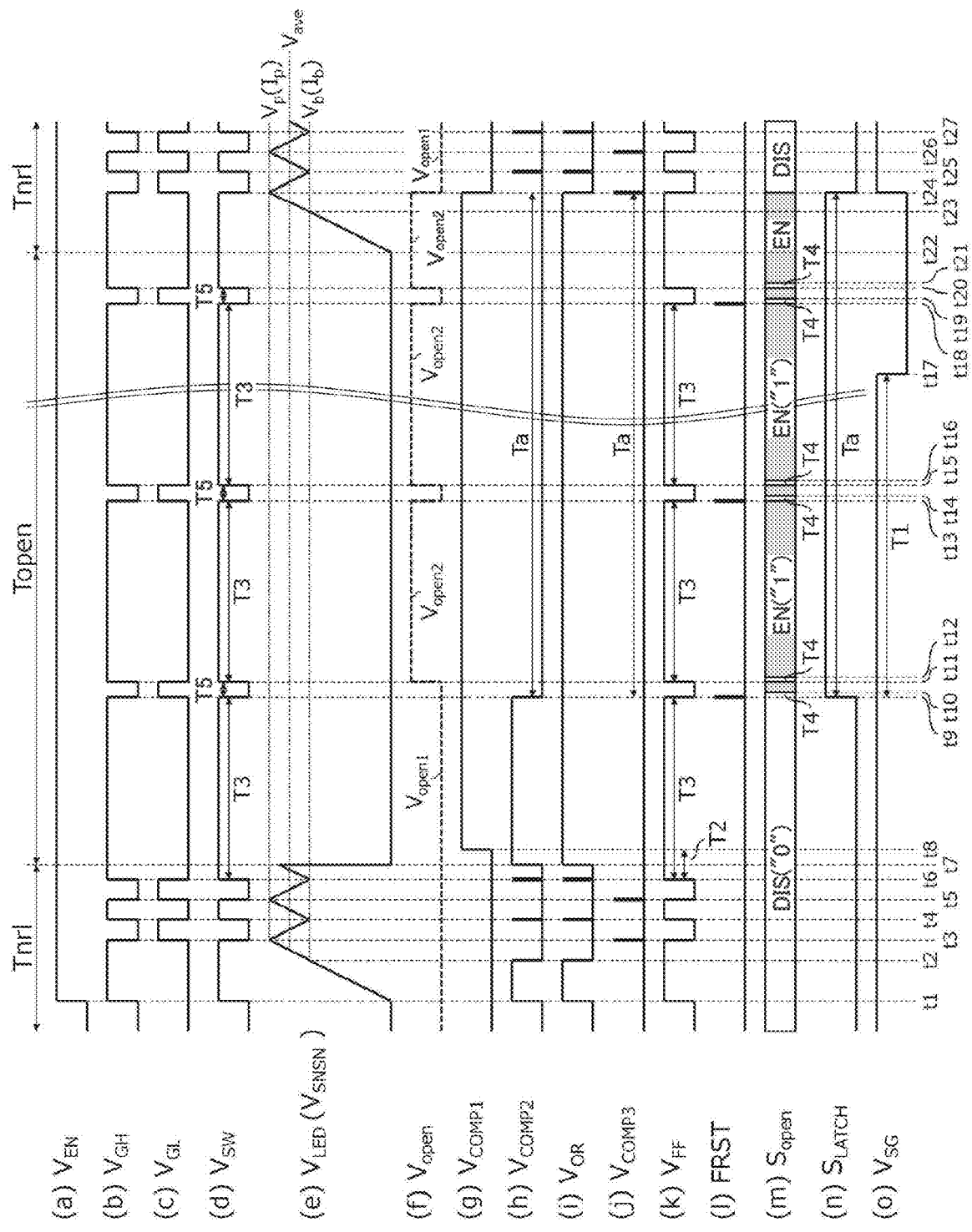
FIG. 30 is a timing chart showing signals at relevant nodes in the light-emitting element driving circuit device in FIG. 26.

FIG. 30 is a timing chart showing the signals at relevant modes in the light-emitting element driving circuit device 200A in FIG. 26. The period Tnrl (between time points t1 and t7 and between time points t22 and t27) is the period (normal period) where the operation of the LED is normal. The period Topen (between time points t7 and t22) is the period (LED-open period) where the LED has gone into the open state and the operation of the LED is abnormal.

The signals, voltages, and the like indicated by (a) to (o) in FIG. 30 will now be described with reference to FIGS. 25 to 29.

(a) The enable signal VEN is fed via the external terminal EN/PWM to the control logic circuit CL. The enable signal VEN shifts from low level to high level at time point t1. When the enable signal VEN turns to high level, the operation of the entire light-emitting element driving circuit device 200 or 200A is permitted.

(b) The high-side gate signal VGH is generated by the LED current sense circuit CSC, the driving logic circuit DL, and the high-side driver DRVH. In the normal period Tnrl, the high-side gate signal VGH is a PWM (pulse-width modulation signal) signal of which the pulse width varies with time. In the LED-open period Topen, the high-side gate signal VGH is not a PWM signal that it intrinsically is but a signal of which the high-level period HH is longer than the low-level period HL. In the LED-open period Topen, the high-level period HH is, for example, 80 μs and the low-level period HL is, for example, 250 ns. In other words, the high-level period HH takes 99.7% of one period and the low-level period HL takes 0.3% of one period. That is, the high-level period HH is far longer than the low-level period HL. These signals are set by the control logic circuit CL and the driving logic circuit DL.

(c) The low-side gate signal VGL is generated by the LED current sense circuit CSC, the driving logic circuit DL, and the low-side driver DRVL. In the normal period Tnrl, the low-side gate signal VGL is a PWM (pulse-width modulation) signal of which the pulse width varies with time. In the LED-open period Topen, the low-side gate signal VGL is not a PWM signal that it intrinsically is but is a signal of which the low-level period LL is longer than the high-level period LH. The low-side gate signal VGL is so controlled as to be in a complementary relationship with the high-side gate signal VGH irrespective of in the normal period Tnrl or in the LED-open period Topen. That is, the low-side gate signal VGL maintains an inverted-polarity relationship with the high-side gate signal VGH. In the LED-open period Topen, the low-level period LL is, for example, 80 μs and the high-level period LH is, for example, 250 ns. That is, the low-level period LL is far longer than the high-level period LH. The reason that the high-level period LH of the low-side gate signal VGL is chosen to be comparatively short is because it has only to be so long as to secure an on-period of the low-side transistor M2 sufficient to detect an LED open state.

The switching signal VSW depends on the operation of both of the transistor M1, which is controlled to turn on and off by the high-side gate signal VGH, and the low-side transistor M2, which is controlled to turn on and off by the low-side gate signal VGL. Essentially, the switching signal VSW has largely the same waveform as the high-side gate signal VGH.

(e) The LED voltage VLED is the voltage that is supplied to the LED, and is the voltage VSNSN that appears at the low-potential side of the current sense resistor RA, that is, at the external terminal SNSN. In the normal period Tnrl, the LED voltage VLED is a triangular-wave voltage that has the peak value Vp (Ip), the bottom value Vb (Ib), and the average voltage Vave as regular voltages. In the LED-open period Topen, the LED voltage VLED is 0 V. On return from the LED-open period Topen to the normal period Tnrl, the LED voltage VLED comes back into the normal state in which it intrinsically is.

(f) The first threshold value Vopen is the voltage that is fed to the inverting input terminal (−) of the first comparator COMP1. The first threshold value Vopen has two voltages, namely a first threshold voltage Vopen1 and a second threshold voltage Vopen2, and is switched so as to have the first threshold voltage Vopen1 in the normal period Tnrl and the second threshold voltage Vopen2 in the LED-open period Topen. Specifically, the first threshold value Vopen is switched in synchronization with a switch signal such as the flip-flop signal VFF or the switching signal VSW in the period in which the first comparator COMP1 is detecting an LED open, that is, in the period in which the comparator output signal VCOMP1 of the first comparator COMP1 is at high level. The first threshold value Vopen 1 is set at, for example, about 10 mV, and the second threshold value Vopen 2 is set at, for example, about 150 mV.

(g) The comparator output signal VCOMP1 is output from the first comparator COMP1. The comparator output signal VCOMP1 depends on the voltage VSNSN fed to the non-inverting input terminal (+) of the first comparator COMP1 and the voltage (VSNSP−Vopen) fed to its inverting input terminal (−). Accordingly, the comparator output signal VCOMP1 is at high or low level according to whether the voltage VSNSN is higher or lower, respectively than the voltage (VSNSP−Vopen). The comparator output signal VCOMP1 is set to be at low level when the operation of the LED is normal and at high level when the LED is in the open state.

(h) The comparator output signal VCOMP2 is output from the second comparator COMP2. The second comparator COMP2 outputs a high level when the bottom value Vb of (e) the LED voltage VLED is detected. The comparator output signal VCOMP2 depends on the voltage (VSNSN+Vset) fed to the non-inverting input terminal (+) of the second comparator COMP2 and the voltage VSNSP fed to its inverting input terminal (−). Accordingly, the comparator output signal VCOMP2 is at high or low level according to whether the voltage (VSNSN+Vset) is higher or lower, respectively, than the voltage VSNSP. The comparator output signal VCOMP2 shifts from high level to low level at time point t9 in the LED-open period Topen. After return from the LED-open period Topen to the normal period Tnrl, the comparator output signal VCOMP2 shifts from low level to high level at time point t25 when the LED voltage VLED reaches the bottom value Vb.

(i) The OR signal VOR is output from OR circuit OR. The OR signal VOR is generated through an OR operation between the output signal VCOMP1 of the first comparator COMP1 and the output signal VCOMP2 of the second comparator COMP2. The OR signal VOR is at high level when at least one of the comparator output signals VCOMP1 and VCOMP2 is at high level. Accordingly, the OR signal VOR remains at high level in the LED-open period Topen.

Even after return from the LED-open period Topen to the normal period Tnrl, the OR signal VOR remains at high level until time point t24 when (3) the LED voltage VLED is detected having the normal value, that is, when the LED voltage VLED exceeds the first threshold value Vopen. In the normal state after time point t24, the OR signal VOR is equivalent to the comparator output signal VCOMP2. The OR signal VOR acts as the what is generally termed a set signal SET for setting the flip-flop FF so that the LED voltage VLED will rise.

(j) The comparator output signal VCOMP3 is output from the third comparator COMP3. The third comparator COMP3 outputs a high level when the peak value Vp of (e) the LED voltage VLED is detected. Specifically, the comparator output signal VCOMP3 depends on the voltage (VSNSN+Vrst) fed to the inverting input terminal (−) of the third comparator COMP3 and the voltage VSNSP fed to its non-inverting input terminal (+). Accordingly, the comparator output signal VCOMP2 is at low or high level according to whether the voltage (VSNSN+Vrst) is higher or lower, respectively, than the voltage VSNSP. Thus, the comparator output signal VCOMP3 is at high level at time points t3, t5, t24, and t26 in the normal period Tnrl. At any other time point, the comparator output signal VCOMP3 is at low level. The comparator output signal VCOMP3 acts as what is generally termed a reset signal RST for resetting the flip-flop FF so that the LED voltage VLED will fall.

(k) The flip-flop signal VFF is generated by the flip-flop FF. The flip-flop signal VFF serves as a reference signal for generating the high-side gate signal VGH, the low-side gate signal VGL, the switching gate signal VSW, and the latch signal SLATCH.

(l) A forcible reset signal FRST is fed from the third counter COUNT3, which is part of the control logic circuit CL, to the masking circuit MASK. The forcible reset signal FRST is output at high level when the flip-flop signal VFF remains at high level for a predetermined time T3. Accordingly, the forcible reset signal FRST is at high level at time points t9, t13, and t18.

(m) The open detection enable/disable signal Sopen indicates whether or not detection of an LED open state is enabled. The indication DIS("0") indicates that no detection of an open state is performed. This means, in other words, that the unillustrated masking signal output from the masking circuit MASK is kept valid. The indication EN("1") indicates that detection of an open state is performed. This manes, in other words, that the unillustrated masking signal output from the masking circuit MASK is kept invalid. The open detection enable/disable signal Sopen remains in the DIS("0") state for a predetermined time T4 after a rise or a fall in the flip-flop signal VFF. Here, the target of masking, i.e., the circuit blocks of which the circuit operation is kept disabled, includes at least the LED current sense circuit CSC, and in particular the second comparator COMP2, which detects the bottom value Ib of the LED current ILED.

(n) The latch signal SLATCH is generated by the latch circuit LATCH in the control logic circuit CL. The latch signal SLATCH is used as a count start signal for the first counter COUNT1.

(o) An LED connection status notification flag signal VSG is generated by the notifying means SGC, and is output via the external terminal SG. The LED connection status notification flag signal VSG is given out from the integrated circuit 210, for example, by sounding or by lighting, extinguishing, or blinking a lamp.

The signals and voltages shown in FIG. 30 have thus far been described one by one. Now, the relevant time points shown FIG. 30 will be described one by one. First, a description will be given of the normal period Tnrl between time points t1 to t7.

Time point t1 is the time point that the enable signal VEN shifts from low level to high level. When the enable signal VEN shifts from low level to high level, the circuit operation of the light-emitting element driving circuit device 200 or 200A goes into the open state. At time point t1, the high-side gate signal VGH shifts from low level to high level, while the low-side gate signal VGL remains at low level. At time point t1, when the switching signal VSW shifts from low level to high level, a current starts to flow through the inductor L3, and the LED voltage VLED increases gradually. At time point t1, the comparator output signals VCOMP1 and VCOMP2, the OR signal VOR, and the flip-flop signal VFF shift from low level to high level. At time point t1, the comparator output signal VCOMP3, the forcible reset signal FRST, and the latch signal SLATCH are at low level. At time point t1, the LED connection status notification flag signal VSG is at high level, which indicates the normal state.

Time point t2 is the time point that (e) the LED voltage VLED reaches the bottom value Vb (Ib). The bottom value Vb (Ib) is detected by the second comparator COMP2. Accordingly, at time point t2, level shifts are observed in the comparator output signal VCOMP2 and the OR signal VOR, both shifting from the high level to low level at that time point.

Time points t3 and t5 are the time points that the LED voltage VLED reaches the peak value Vp (Ip). The peak value Vp (Ip) is detected by the third comparator COMP3. When the peak value Vp (Ip) is detected, the comparator output signal VCOMP3 shifts from low level to high level. When the LED voltage VLED reaches the peak value Vp (Ip), the LED voltage VLED is controlled to fall immediately toward the bottom value Vb (Ib), and thus the comparator output signal VCOMP3 is kept at high level momentarily. At time points t3 and t5, (b) the high-side gate signal VGH, (d) the switching signal VSW, and (k) the flip-flop signal VFF shift from high level to low level, and (c) the low-side gate signal VGL shifts from low level to high level.

Time points t4 and t6 are the time points that the LED voltage VLED reaches the bottom value Vb (Ib). The bottom value Vb (Ib) is detected by the second comparator COMP2. When the bottom value Vb (Ib) is detected, the comparator output signal VCOMP2 shifts from low level to high level. When the LED voltage VLED reaches the bottom value Vb (Ib), the LED voltage VLED is controlled to rise immediately toward the peak value Vp (Ip), and thus the comparator output signal VCOMP2 is kept at high level momentarily. At time points t4 and t6, (b) the high-side gate signal VGH, (d) the switching signal VSW, and (k) the flip-flop signal VFF shift from low level to high level, and (c) the low-side gate signal VGL shifts from high level to low level.

Time point t7 is the time point that marks the boundary between the normal period Tnrl and the LED-open period Topen. That is, the state from time point t1 to time point t7 is the normal state, and the state from time point t7 to time point t22 is the abnormal state.

Time point t8 is the time point a predetermined time T2 after time point t6 that the flip-flop signal VFF shifts from low level to high level. The length of the time T2 is a design choice, and is set, for example, such that T2=10 μs. The length of the time T2 serves as a reference time relative to the length of which whether or not the LED is in the open state is determined, and when the time T2 is exceeded, the high-level duration of the flip-flop signal VFF is set at a predetermined time T3. The length of the time T2 is set to be one digit or more longer than the time of one period (e.g., 0.5 μs) of the flip-flop signal VFF in the normal period Tnrl. It is thus possible to enhance the accuracy of discrimination between the normal and abnormal operation of the LED. The time T2 is set by the second counter COUNT2.X Time points t9 to t21 are the time points that, in the LED abnormal (open) state, the respective high-level and low-level times of the flip-flop signal VFF, the high-side gate signal VGH, the low-side gate signal VGL, and the switching signal VSW are set. The respective high-level and low-level times of the high-side gate signal VGH, the low-side gate signal VGL, and the switching signal VSW are set univocally by the flip-flop signal VFF. The time T3 (between time points t6 and t9, between time points t11 and t13, and between time points t15 and t18) is the time in which the flip-flop signal VFF is at high level, with the high-side gate signal VGH in the high-level period HH and the high-side transistor M1 in the on-state. The time T5 (between time points t9 and t11, between time points t13 and t15, and between time points t18 and t20) is the time in which the flip-flop signal VFF is at low level, with the low-side gate signal VGL in the high-level period LH and the low-side transistor M2 in the on-state.

Between time points t1 and t9 and between time points t24 and t27 are periods (DIS("0")) in which no detection of the LED connection status is performed. The period in which no detection of the LED connection status is performed occurs between time points t9 and t10, between time points t11 and t12, between time points t13 and t14, between time points t15 and t16, between time points t18 and t19, and between time points t20 and t21. These periods correspond to switching periods in which the flip-flop signal VFF shifts from low level to high level or from high level to low level, and are periods in which switching noise can occur. To eliminate degradation of the accuracy of detection of the connection status due to switching noise, detection of an LED open in those periods is avoided.

After time point t22 is a period after return to the normal period Tnrl. The circuit operation is then similar to that between time points t1 and t7, and therefore no overlapping description will be repeated.

The signals, voltages, and the like at relevant nodes in FIGS. 25 to 29 have been described with reference to FIG. 30. As described above, a light-emitting element driving circuit device according to the present invention is configured, in detecting the connection status of an LED, to determine whether the LED is in the normal state or in the abnormal state through both the measurement of the high-level time of the switching signal extracted from the output side of a switching regulator and the sensing of the LED current passing through the LED. It is thus possible to achieve higher checking accuracy.

First Packaging Example

Figure 31:
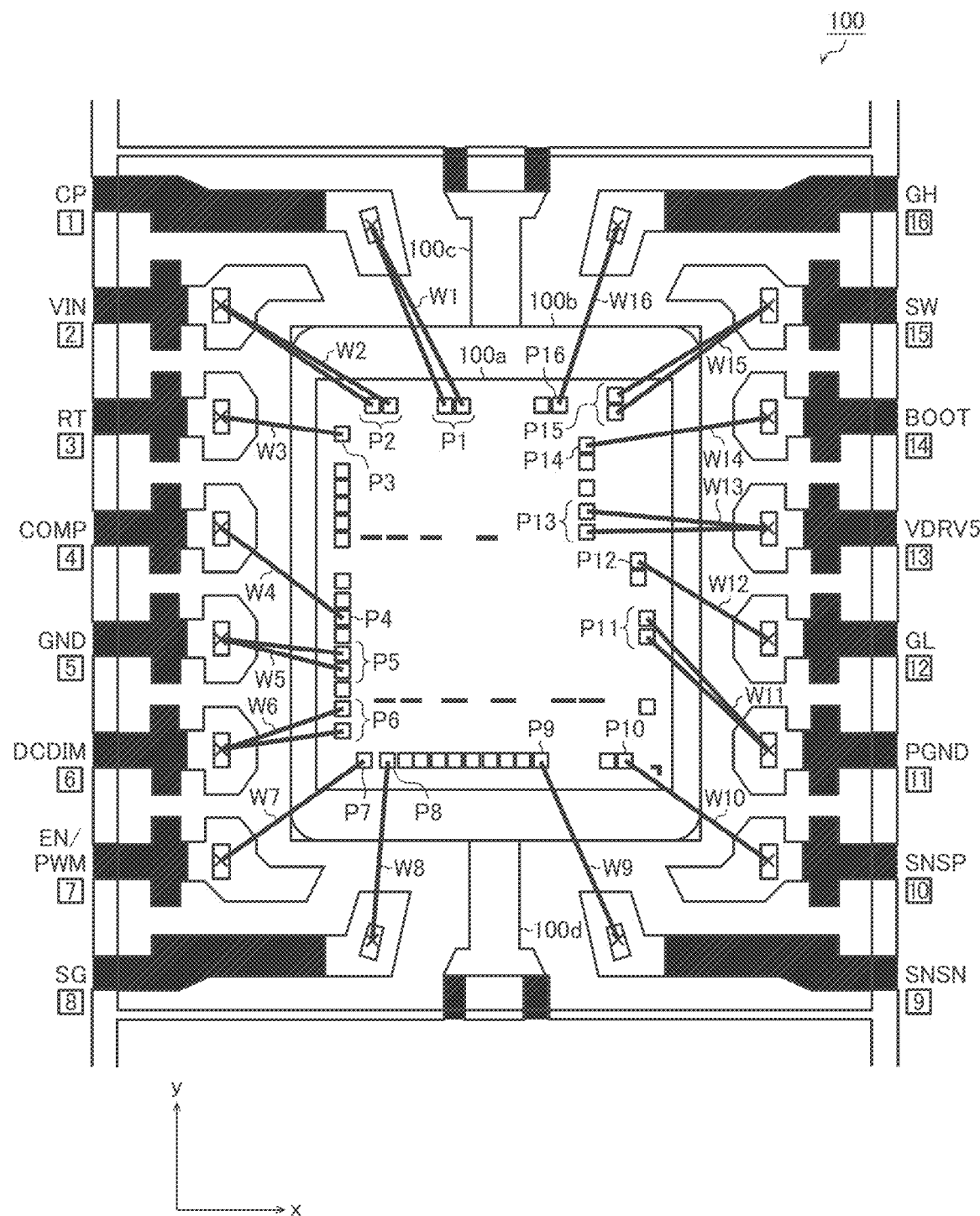
FIG. 31 is a diagram showing a first example of packaging of an LED driving control device.

FIG. 31 is a diagram (xy-plane view) showing a first example of packaging of the LED driving control device 100 (which can be understood as the light-emitting element driving circuit device 200 or 200A). In the following description, the left-right axis across the plane of the diagram is defined as the x-axis (i.e., the left-right axis with respect to the LED driving control device 100), and the top-bottom axis across the plane of the diagram is defined as the y-axis (i.e., the top-bottom axis with respect to the LED driving control device 100).

In the first packaging example, employed as the package of the LED driving control device 100 is a 16-pin HTSSOP. Along the left side of the package, there are provided, from top down, a CP pin (pin-1), a VIN pin (pin-2), an RT pin (pin-3), a COMP pin (pin-4), a GND pin (pin-5), a DCDIM pin (pin-6), an EN/PWM pin (pin-7), and an SG pin (pin-8). On the other hand, along the right side of the package, there are provided, from top down, an SNSN pin (pin-9), an SNSP pin (pin-10), a PGND pin (pin-11), a GL pin (pin-12), a VDRV5 pin (pin-13), a BOOT pin (pin-14), an SW pin (pin-15), and a GH pin (pin-16).

A semiconductor chip 100a sealed in the package is mounted on an island 100b. The semiconductor chip 100a is provided with pads P1 to P16 as a means for establishing electrical connection with outside the chip.

Two of the pads P1 are arranged side by side along the x-axis, and are each connected via a wire W1 to the CP pin (pin-1). Two of the pads P2 are arranged side by side along the x-axis, and are each connected via a wire W2 to the VIN pin (pin-2). The pad P3 is connected via a wire W3 to the RT pin (pin-3). The pad P4 is connected via a wire W4 to the COMP pin (pin-4). Two of the pads P5 are arranged side by side along the y-axis, and are each connected via a wire W5 to the GND pin (pin-5). Two of the pads P6 are arranged side by side along the y-axis, and are each connected via a wire W6 to the DCDIM pin (pin-6). The pad P7 is connected via a wire W7 to the EN/PWM pin (pin-7). The pad P8 is connected via a wire W8 to the SG pin (pin-8).

The pad P9 is connected via a wire W9 to the SNSN pin (pin-9). The pad P10 is connected via a wire W10 to the SNSP pin (pin-10). Two of the pads P11 are arranged side by side along the y-axis, and are each connected via a wire W11 to the PGND pin (pin-11). The pad P12 is connected via a wire W12 to the GL pin (pin-12). Two of the pads P13 are arranged side by side along the y-axis, and are each connected via a wire W13 to the VDRV5 pin (pin-13). The pad P14 is connected via a wire W14 to the BOOT pin (pin-14). Two of the pads P15 are arranged side by side along the y-axis, and are each connected via a wire W15 to the SW pin (pin-15). The pad P16 is connected via a wire W16 to the GH pin (pin-16).

The pads P1 to P16 are arranged in an outer edge region of the semiconductor chip 100a so that the wires W1 to W16 corresponding respectively to them are as short as possible, except that the pads P13 and P14 are arranged slightly nearer the center of the semiconductor chip 100a than the other pads are.

When attention is paid to the frame areas inside the package, the VIN pin (pin-2) and the EN/PWM pin (pin-7) located opposite the upper-left and lower-left corners, respectively, of the island 100b are both larger than the RT pin (pin-3), the COMP pin (pin-4), the GND pin (pin-5), and the DCDIM pin (pin-6) located opposite the left side of the island 100b. More specifically, pin-2 and pin-7 have a protruding part to extend farther along the x-axis than pin-3 to pin-6 do.

Likewise, the SNSP pin (pin-10) and the SW pin (pin-15) located opposite the lower-right and upper-right corners, respectively, of the island 100b are both larger than the PGND pin (pin-11), the GL pin (pin-12), the VDRV5 pin (pin-13), and the BOOT pin (pin-14) located opposite the right side of the island 100b. More specifically, pin-10 and pin-15 have a protruding part to extend farther along the x-axis than pin-11 to pin-14 do.

Next, the positions of pin-1 to pin-16 relative to the island 100b as seen along the x-axis will be described. Pin-2 to pin-7 and pin-10 to pin-15 each at least partly overlap with the island 100b as seen along the x-axis. On the other hand, none of pin-1, pin-8, pin-9, and pin-16 overlaps with the island 100b as seen along the x-axis.

Next, the positions of pin-1 to pin-16 relative to the island 100b as seen along the y-axis will be described. Pin-1, pin-2, pin-7 to pin-10, pin-15, and pin-16 each at least partly overlap with the island 100b as seen along the y-axis. On the other hand, none of pin-3 to pin-6 and pin-11 to pin-14 overlaps with the island 100b as seen along the y-axis.

Inside the package, between the CP pin (pin-1) and the GH pin (pin-16) and between the SG pin (pin-8) and the SNSN pin (pin-9), there are respectively formed support frames 100c and 100d that support the island 100b along the y-axis.

Figure 32:
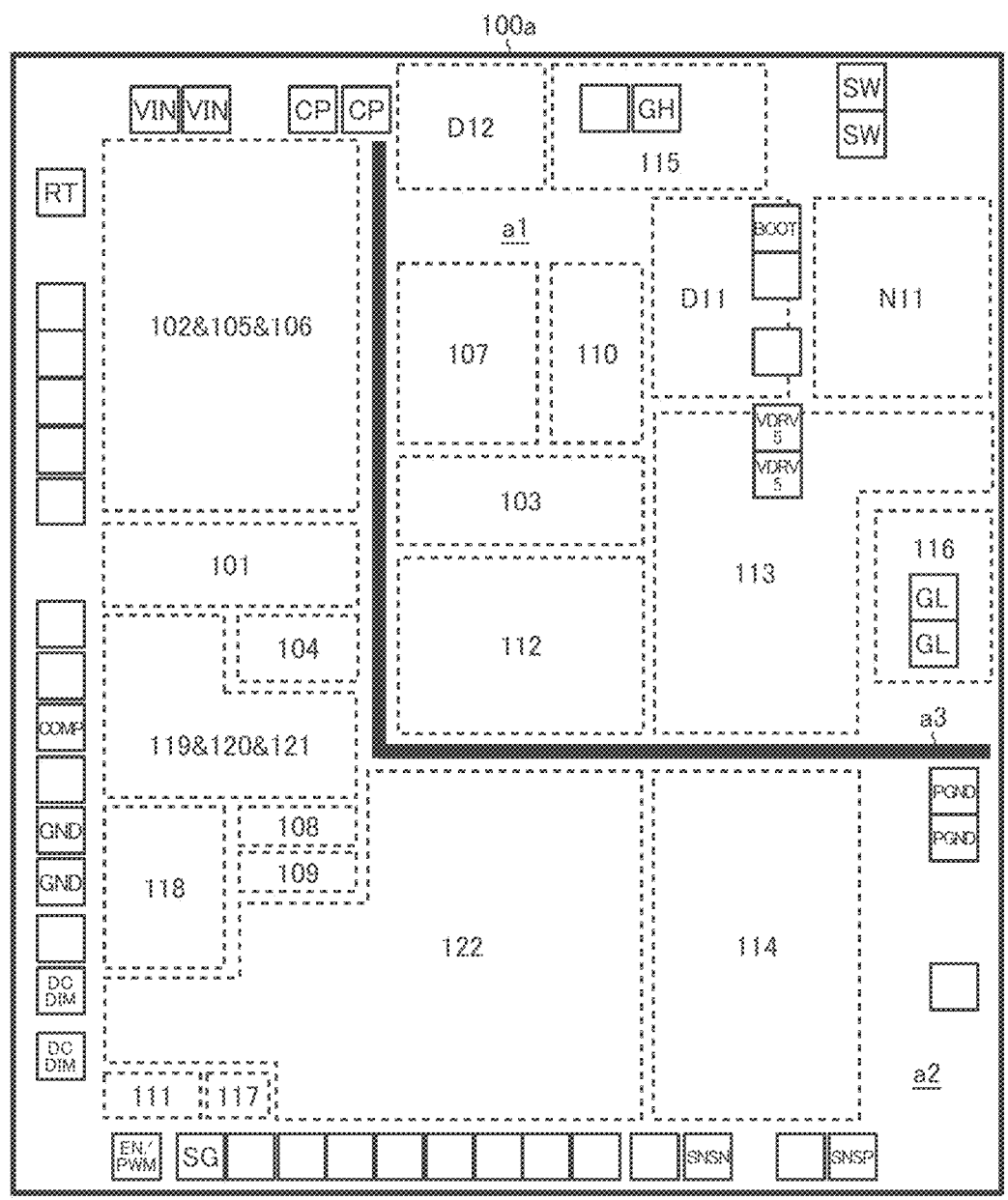
FIG. 32 is a diagram showing an example of a circuit layout of a semiconductor chip.

FIG. 32 is a diagram (xy-plane view) showing an example of the circuit layout of the semiconductor chip 100a. The pad arrangement in the diagram corresponds to that in FIG. 31. The reference signs attached to the broken-line boxes in the diagram correspond to the reference signs attached to the various circuit elements in FIG. 2. In the following description, the left-right axis across the plane of the diagram is defined as the x-axis (i.e., the left-right axis with respect to the semiconductor chip 100a), and the top-bottom axis across the plane of the diagram is defined as the y-axis (i.e., the top-bottom axis with respect to the semiconductor chip 100a).

As shown in FIG. 32, in the semiconductor chip 100a, high-withstand-voltage noise-system circuits a1 that can be a source of noise (i.e., the oscillator 103, the OCP circuit 107, the BOOTVULO circuit 110, the control logic circuit 112, the driving logic circuit (doubling as a level shifter) 113, the high-side driver 115, and the low-side driver 116 along with the transistor N11 and the diodes D11 and D12) are concentrated in one area (upper-right region) of the semiconductor chip 100a.

The high-side and low-side drivers 115 and 116 can be formed in regions right under the pad P16 (GH) and the pad P12 (GL), respectively, to make the output conductors from the high-side and low-side drivers 115 and 116 as short as possible. The diode D12 can be arranged nearer the pad P1 (CP) than the other circuit elements are. Instead of the diode D12, a transistor can be used. The control logic circuit 112 can be formed in a central region on the semiconductor chip 100a. The oscillator 103 can be formed next to the control logic circuit 112 to make the clock signal line as short as possible.

On the other hand, low-signal-system circuits a2 (the reference voltage generator 101, the constant voltage generator 102, the TSD circuit 104, the VINUVLO circuit 105, the VDRV5UVLO circuit 106, the LED short detector 108, the LED open detector 109, the EN/PWM controller 111, the current sense comparator 114, the SG output circuit 117, the DC dimmer 118, the F/V converter 119, the SSM circuit 120, the error amplifier 121, and the detection value setter 122) are formed in a left region and a lower region on the semiconductor chip 100a.

Each circuit block can be formed at an appropriate place so as to make the wiring distances to the pads connected to them as short as possible. For example, the constant voltage generator 102 can be formed nearer the pad P2 (VIN) than the other circuit blocks are. The TSD circuit 104 can be formed somewhat toward the center of the semiconductor chip 100a so that it can accurately measure the junction temperature Tj of the semiconductor chip 100a.

The high-withstand-voltage noise-system circuits a1 are separated from the low-signal-system circuits a2 by a buffer zone a3. It is thus possible to restrain noise propagation from the high-withstand-voltage noise-system circuits a1 to the low-signal-system circuits a2.

Figure 33:
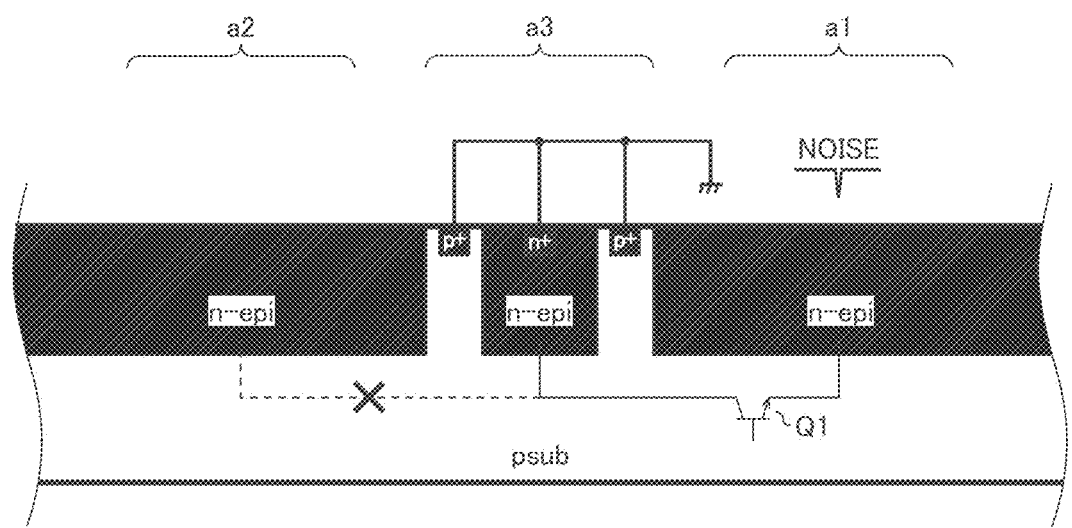
FIG. 33 is a diagram showing a vertical structure of a buffer zone.

FIG. 33 is a diagram showing the vertical structure of the buffer zone a3. As shown there, the buffer zone a3 can be formed with an n-type well and a p-type collector wall each connected to the ground terminal GND. With this buffer zone a3 provided, even when an n-type semiconductor region in the high-withstand-voltage noise-system circuits a1 comes to have a negative potential under the influence of noise and a parasitic transistor Q1 (an npn-type bipolar transistor) having that region as an emitter turns on, its collector current is drawn not from the n-type semiconductor region in the low-signal-system circuits a2 but from the n-type well in the buffer zone a3. It is thus possible to restrain noise propagation from the high-withstand-voltage noise-system circuits a1 to the low-signal-system circuits a2.

Second Packaging Example

Figure 34:
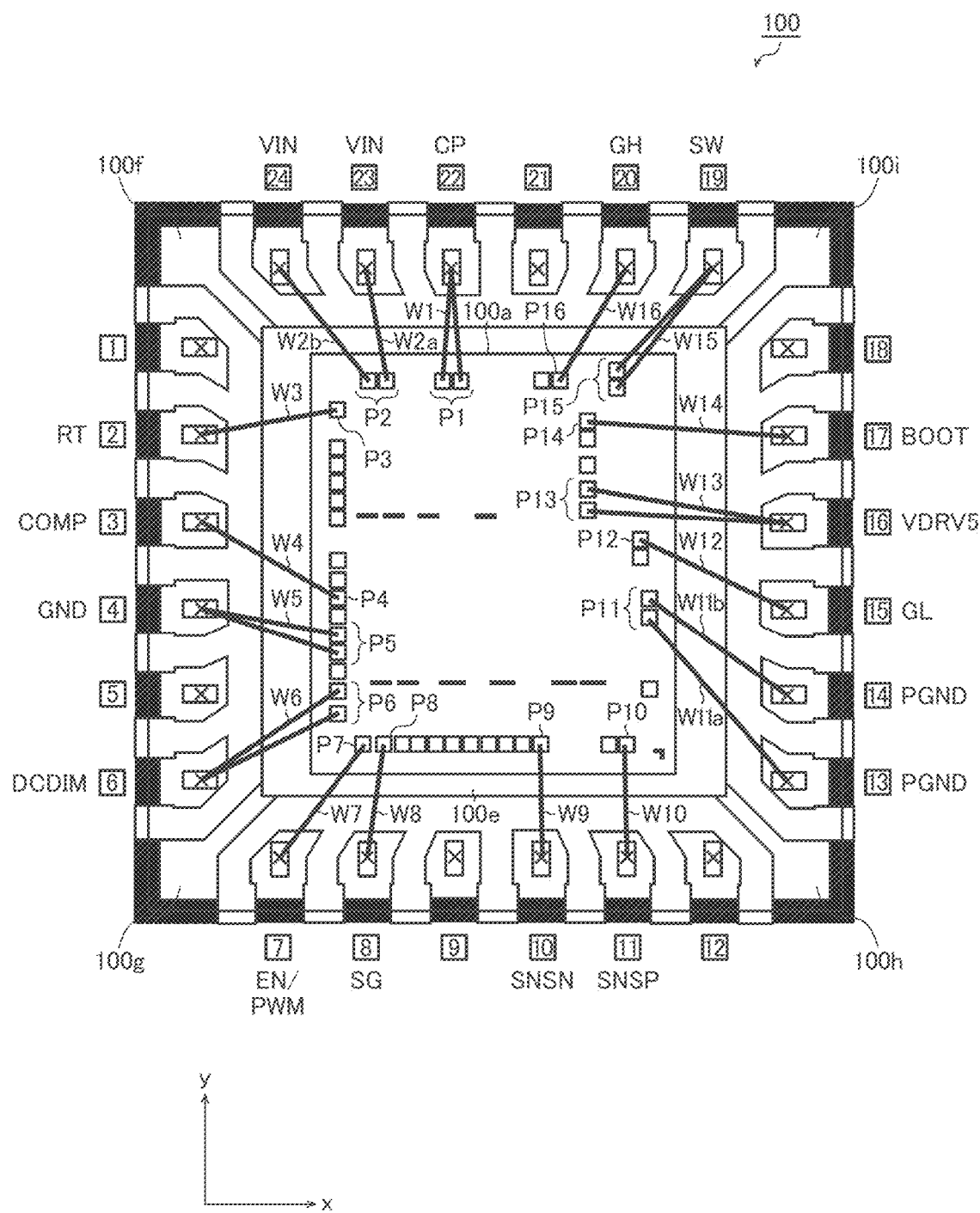
FIG. 34 is a diagram showing a second example of packaging of an LED driving control device.

FIG. 34 is a diagram (xy-plane view) showing a second example of packaging of the LED driving control device 100 (which can be understood as the light-emitting element driving circuit device 200 or 200A). In the following description, the left-right axis across the plane of the diagram is defined as the x-axis (i.e., the left-right axis with respect to the LED driving control device 100), and the top-bottom axis across the plane of the diagram is defined as the y-axis (i.e., the top-bottom axis with respect to the LED driving control device 100).

In the second packaging example, employed as the package of the LED driving control device 100 is a 24-pin VQFN (very thin quad flat non-leaded package). Along the left side of the package, there are provided, from top down, an unconnected pin (pin-1), an RT pin (pin-2), a COMP pin (pin-3), a GND pin (pin-4), an unconnected pin (pin-5), and a DCDIM pin (pin-6). Along the bottom side of package, there are provided, from left to right, an EN/PWM pin (pin-7), an SG pin (pin-8), an unconnected pin (pin-9), an SNSN pin (pin-10), an SNSP pin (pin-11), and an unconnected pin (pin-12). Along the right side of the package, there are provided, from bottom up, a PGND pin (pin-13), a PGND pin (pin-14), a GL pin (pin-15), a VDRV5 pin (pin-16), a BOOT pin (pin-17), and an unconnected pin (pin-18). Along the top side of the package, there are provided, from right to left, an SW pin (pin-19), a GH pin (pin-20), an unconnected pin (pin-21), a CP pin (pin-22), a VIN pin (pin-23), and a VIN pin (pin-24).

A semiconductor chip 100a sealed in the package is mounted on an island 100e. The semiconductor chip 100a is the same as that described with reference to FIGS. 31 to 33, and is provided with pads P1 to P16 as a means for establishing electrical connection with outside the chip.

Two of the pads P1 are arranged side by side along the x-axis, and are each connected via a wire W1 to the CP pin (pin-22). Two of the pads P2 are arranged side by side along the x-axis, and are connected respectively via wires 2a and 2b to the two VIN pins (pin-23 and pin-24). The pad P3 is connected via a wire w3 to the RT pin (pin-2). The pad P4 is connected via a wire W4 to the COMP pin (pin-3). Two of the pads P5 are arranged side by side along the y-axis, and are each connected via a wire W5 to the GND pin (pin-4). Two of the pads P6 are arranged side by side along the y-axis, and are each connected via a wire W6 to the DCDIM pin (pin-6). The pad P7 is connected via a wire W7 to the EN/PWM pin (pin-7). The pad P8 is connected via a wire W8 to the SG pin (pin-8).

The pad P9 is connected via a wire W9 to the SNSN pin (pin-10). The pad P10 is connected via a wire W10 to the SNSP pin (pin-11). Two of the pads P11 are arranged side by side along the y-axis, and are connected respectively via wires W11a and W11b to the two PGND pins Iin-13 and pin-14). The pad P12 is connected via a wire W12 to the GL pin (pin-15). Two of the pads P13 are arranged side by side along the y-axis, and are each connected via a wire W13 to the VDRV5 pin (pin-16). The pad P14 is connected via a wire W14 to the BOOT pin (pin-17). Two of the pads P15 are arranged side by side along the y-axis, and are each connected via a wire W15 to the SW pin (pin-19). The pad P16 is connected via a wire W16 to the GH pin (pin-20).

The pads P1 to P16 are arranged in an outer edge region of the semiconductor chip 100a so that the wires W1 to W16 corresponding respectively to them are as short as possible, except that the pads P13 and P14 are arranged slightly nearer the center of the semiconductor chip 100a than the other pads are.

In the second package example (FIG. 34), owing to the increased number, 24, of pins as compared with 16 in the first package example (FIG. 31), it is possible to increase the number of pins of the same function to provide a plurality of them (e.g., VIN pins and PGND pins). Needless to say, it is preferable that the pads P1 to P16 be connected, rather than such that they correspond to pin-1 to pin-16 on a one-to-one basis, to the pins located opposite the pads P1 to P16 respectively so as to make the laid lengths of the wires W1 to 16 as small as possible.

Next, the positions of pin-1 to pin-24 relative to the island 100e as seen along the x-axis will be described. Pin-1 to pin-6 and pin-13 to pin-18 each at least partly overlap with the island 100e as seen along the x-axis. On the other hand, none of pin-7 to pin-12 and pin-19 to pin-24 overlaps with the island 100e as seen along the x-axis.

Next, the positions of pin-1 to pin-24 relative to the island 100e as seen along the y-axis will be described. Pin-7 to pin-12 and pin-19 to pin-24 each at least partly overlap with the island 100e as seen along the y-axis. On the other hand, none of pin-1 to pin-6 and pin-13 to pin-18 overlaps with the island 100e as seen along the y-axis.

Inside the package, between the unconnected pin (pin-1) and the VIN pin (pin-24), between the DCDIM pin (pin-6) and the EN/PWM pin (pin-7), between the unconnected pin (pin-12) and the PGND pin (pin-13), and between the unconnected pin (pin-18) and the SW pin (pin-19), there are respectively formed support frames 100f, 100g, 100h, and 100i that support the island 100e along the y-axis.

Application Examples

Figure 35:
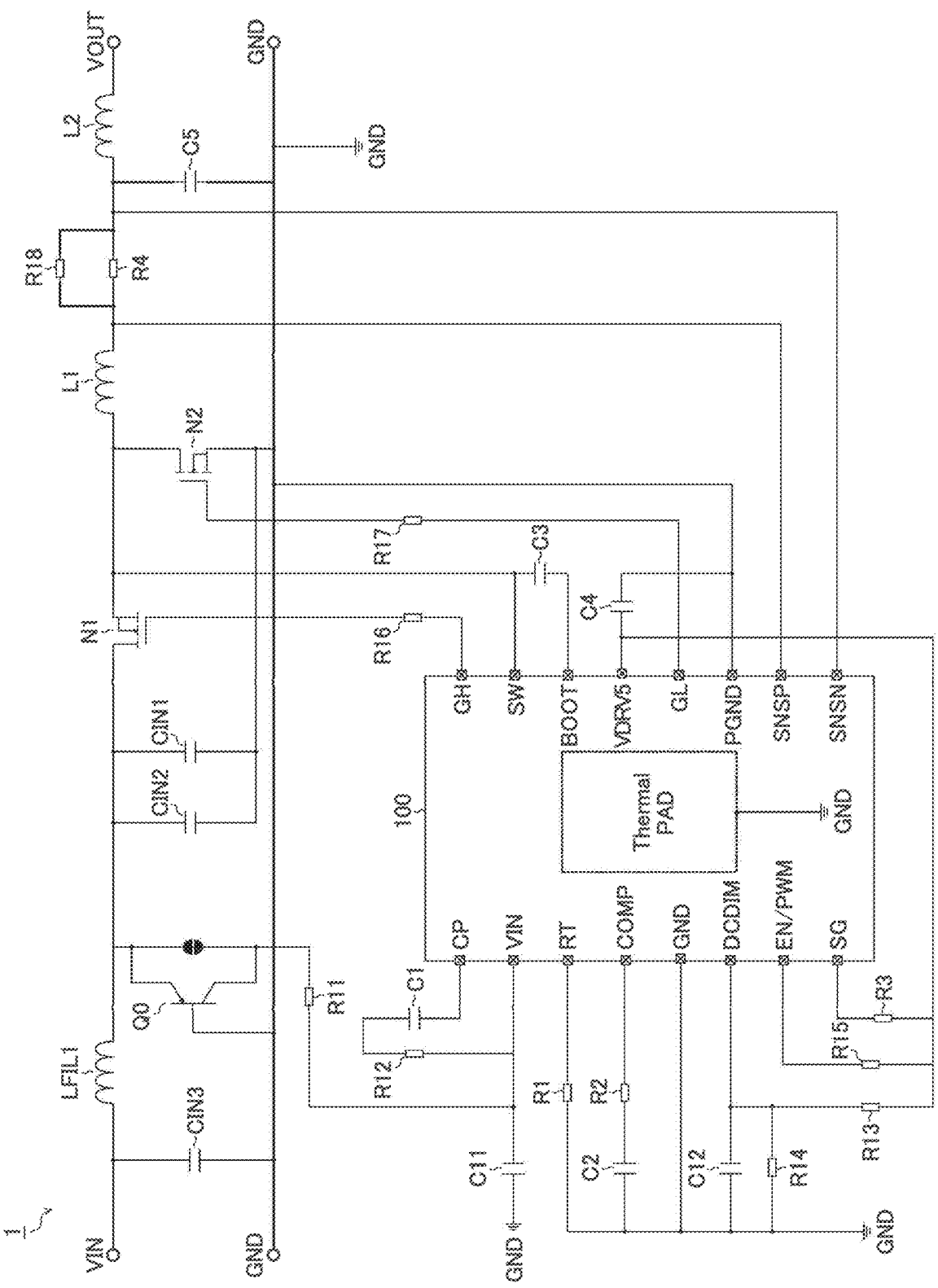
FIG. 35 is a diagram showing an example of application of an LED driving control device.

FIG. 35 is a diagram showing an example of application of the LED driving control device 100. The circuit elements that have already been mentioned are identified by the same reference signs as in FIG. 1 referred to earlier, and no overlapping description will be repeated. The following description focuses on new circuit elements (resistors R11 to R18, capacitors C11 and C12, capacitors CIN1 to CIN3, an inductor LFIL1, and a pnp-type bipolar transistor Q0).

The respective first terminals of the inductor LFIL1 and the capacitor CIN3 are connected to an application terminal for the input voltage VIN. The second terminal of the inductor LFIL1, the respective first terminals of the capacitors CIN1 and CIN2, and the emitter of the transistor Q0 are connected to the drain of the transistor N1. The respective second terminals of the capacitors CIN1 to CIN3 and the base of the transistor Q0 are connected to an application terminal for the ground voltage GND. These circuit elements ILFIL1, CIN1 to CIN3, and Q0) constitute an input filter for eliminating the noise components carried on the input voltage VIN.

The resistor R11 is connected between the collector of the transistor Q0 and the VIN pin of the LED driving control device 100. The resistor R12 and the capacitor C1 are connected in series between the CP pin and the VIN pin of the LED driving control device 100. The resistor R13 is connected between the DCDIM pin and the VDRV5 pin of the LED driving control device 100. The resistor R14 is connected between the DCDIM pin of the LED driving control device 100 and the application terminal for the ground voltage GND. The resistor R15 is connected between the EN/PWM pin and the VDRV5 pin of the LED driving control device 100. The resistor R16 is connected between the GH pin of the LED driving control device 100 and the gate of the transistor N1. The resistor R17 is connected between the GL pin of the LED driving control device 100 and the gate of the transistor N2. The resistor R18 is connected in parallel with the resistor R4. The capacitor C11 is connected between the VIN pin of the LED driving control device 100 and the application terminal for the ground voltage GND. The capacitor C12 is connected between the DCDIM pin of the LED driving control device 100 and the application terminal for the ground voltage GND.

Circuit Board Wiring Pattern

Figure 36:
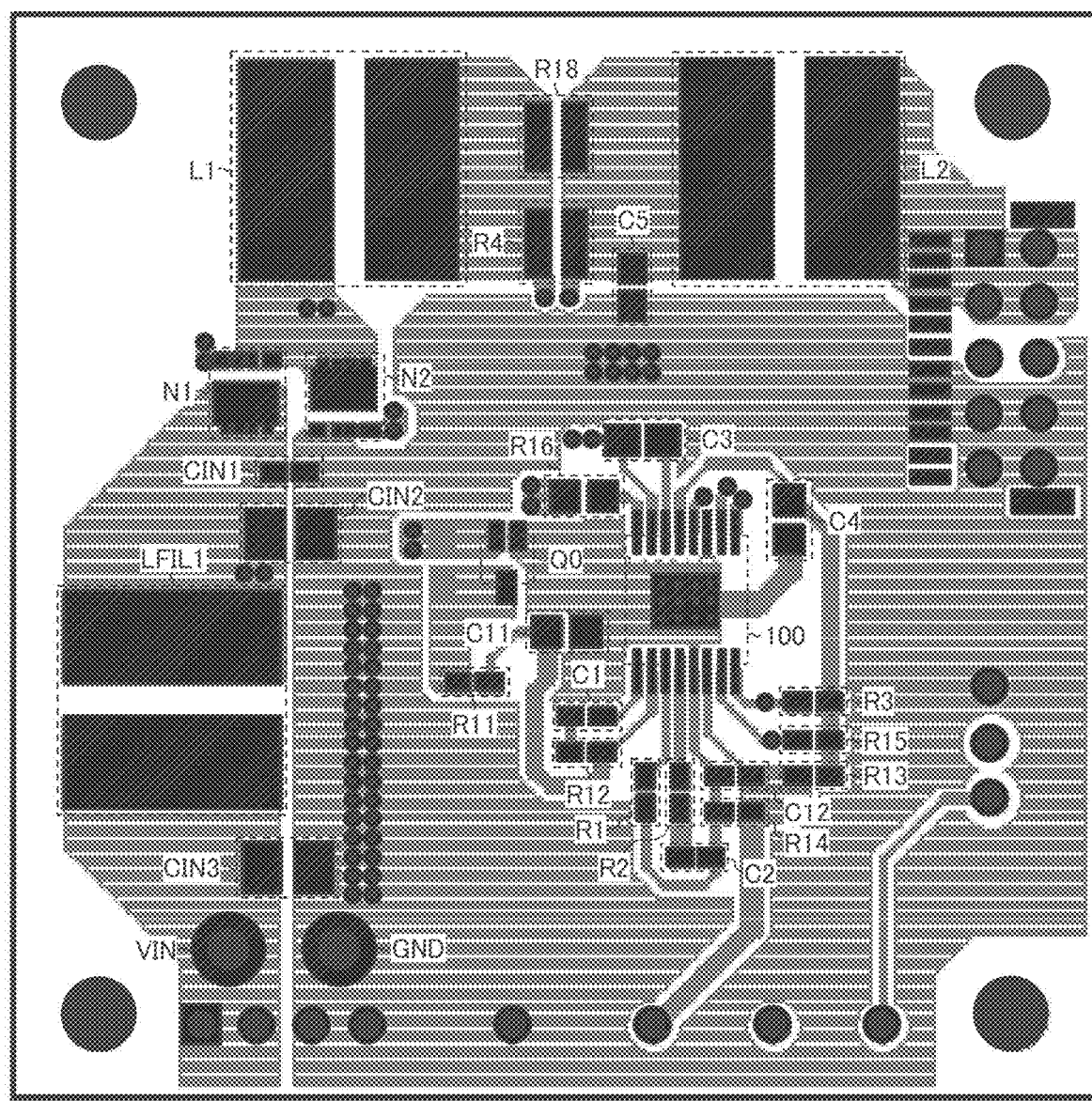
FIG. 36 is a diagram showing an example of a wiring pattern on a circuit board on which an LED driving control device is mounted.

FIG. 36 is a diagram showing an example of the wiring pattern on the first main face (obverse face) of a circuit board (a printed circuit board or a module board) on which the LED driving control device 100 is mounted. The regions shown in gray scales are regions where the conductors (wiring) laid on the board are coated with an insulating film (solder resist), and the hatched regions are regions where the conductors (wiring) are exposed to serve as component mounting regions. The broken-line rectangular boxes indicate the places where the circuit elements shown in FIG. 35 referred to previously are mounted.

It is preferable that, for example as shown in FIG. 36, the circuit elements (the resistors R1 to R3 and R13 to R15 and the capacitors C2 and C12) that are connected to low-signal-system circuits be connected to a low-signal-system GND conductor separated from a power-system GND conductor of the LED driving control device 100. The power-system GND conductor is a plain conductor that occupies a large part of the first main face, and thus has an extremely low impedance. However, connecting a low-signal-system circuit to it may cause small noise on the power-system GND conductor to adversely affect the operation of the low-signal-system circuit. To avoid that, it is preferable that the low-signal-system GND conductor be provided as an independent conductor as described above.

It is preferable that the capacitor CIN1, which is part of the input filter, be arranged nearer the transistor N1 than the other circuit elements are to reduce ringing noise in the 70 the 80 MHz band.

Overview

To follow is an overview of the various embodiments disclosed in the present description.

According to one aspect of what is disclosed in the present description, a light-emitting element driving control device includes: a driving logic circuit configured to drive and control a switching output stage configured to buck an input voltage to an output voltage to supply the output voltage to a light-emitting element; a charge-pump power supply configured to generate a boosted voltage higher than the input voltage; and a current sense comparator configured to be supplied with, as a supply voltage, the boosted voltage and the output voltage and to compare a current sense signal commensurate with an inductor current in the switching output stage directly with a peak detection value and a bottom detection value to generate a control signal for the driving logic circuit. (A first configuration.)

Preferably, the light-emitting element driving control device of the first configuration described above further includes: a driver configured to turn on and off an output switch in the switching output stage; and a bootstrap power supply configured to raise a switching voltage with a rectangular waveform appearing at one terminal of the output switch to generate a supply voltage for the driver. Preferably, the charge-pump power supply is configured to be suppled with electric charge from the bootstrap power supply to generate the boosted voltage. (A second configuration.)

Preferably, the light-emitting element driving control device of the first or second configuration described above further includes: a frequency feedback controller configured to adjust the peak detection value and the bottom detection value such that, even when the output voltage varies, the switching frequency of the switching output stage remains at a constant value. (A third configuration.)

In the light-emitting element driving control device of the third configuration described above, preferably, the frequency feedback controller is configured to variably control the upper limit of the peak detection value and the lower limit of the bottom detection value in accordance with a target setting value for the output current supplied to the light-emitting element. (A fourth configuration.)

According to another aspect of what is disclosed in the present description, a light-emitting element driving device includes: the light-emitting element driving control device of any of the first to fourth configurations described above; and a switching output stage configured to be driven and controlled by the light-emitting element driving control device. The light-emitting element driving device supplies a light-emitting element with a constant output current. (A fifth configuration.)

According to another aspect of what is disclosed in the present description, a light-emitting device includes: the light-emitting element driving device of the fifth configuration described above; and at least one light-emitting element driven by the light-emitting element driving device (A sixth configuration.)

Preferably, the light-emitting device of the sixth configuration described above further includes: a light-emitting element string composed of a plurality of light-emitting elements connected in series; a switch matrix configured to light and extinguish the plurality of light-emitting elements individually; and a switch controller configured to control the switch matrix. (A seventh configuration.)

In the light-emitting device of the seventh configuration described above, preferably, the light-emitting elements are light-emitting diodes or organic EL elements. (An eighth configuration.)

According to another aspect of what is disclosed in the present description, a vehicle includes: the light-emitting device of any of the sixth to eighth configurations described above. (A ninth configuration.)

In the vehicle of the ninth configuration described above, preferably, the light-emitting device is at least one of a headlight, a daylight running light, a taillight, a stoplight, and a turn light. (A tenth configuration.)

According to another aspect of what is disclosed in the present description, a light-emitting element driving control device includes: a driving logic circuit configured to drive and control a switching output stage configured to generate an output voltage from an input voltage to supply the output voltage to a light-emitting element; a current sense comparator configured to compare a current sense signal commensurate with an inductor current in the switching output stage with a peak detection value and a bottom detection value to generate a control signal for the driving logic circuit; and a current adjuster configured to adjust, in accordance with a first time after the current sense signal reaches one of the peak detection value and the bottom detection value until the inductor current actually takes one extremal value, the other extremal value of the inductor current. (An eleventh configuration.)

In the light-emitting element driving control device of the eleventh configuration described above, preferably, the switching output stage includes an output switch and a synchronous rectification switch, and the first time is a simultaneously-off time after the current sense signal reaches the bottom detection value and the synchronous rectification switch is turned off until the output switch is turned on. (A twelfth configuration.)

In the light-emitting element driving control device of the twelfth configuration described above, preferably, the current adjuster is configured to adjust, in accordance with the first time, a second time after the current sense signal reaches the peak detection value until the output switch is turned off. (A thirteenth configuration.)

In the light-emitting element driving control device of the thirteenth configuration described above, preferably, when the input voltage is represented by VIN, the output voltage is represented by VOUT, the first time is represented by T11, and the second time is represented by T12, then T12= [VOUT/(VIN−VOUT)]×T11. (A fourteenth configuration.)

According to another aspect of what is disclosed in the present description, a light-emitting element driving device includes: the light-emitting element driving control device of any of the eleventh to fourteenth configurations described above; and a switching output stage configured to be driven and controlled by the light-emitting element driving control device. The light-emitting element driving device supplies a light-emitting element with a constant output current. (A fifteenth configuration.)

According to another aspect of what is disclosed in the present description, a light-emitting device includes: the light-emitting element driving device according to the fifteenth configuration described above; and at least one light-emitting element. (A sixteenth configuration.)

Preferably, the light-emitting device of the sixteenth configuration described above further includes: a light-emitting element string composed of a plurality of light-emitting elements connected in series; a switch matrix configured to light and extinguish the plurality of light-emitting elements individually; and a switch controller configured to control the switch matrix. (A seventeenth configuration.)

In the light-emitting device of the seventeenth configuration described above, preferably, the light-emitting elements are light-emitting diodes or organic EL elements. (An eighteenth configuration.)

According to another aspect of what is disclosed in the present description, a vehicle includes: the light-emitting device according to any of the sixteenth to eighteenth configurations described above. (A nineteenth configuration.)

In the vehicle of the nineteenth configuration described above, preferably, the light-emitting device is at least one of a headlight, a daylight running light, a taillight, a stoplight, and a turn light. (A twentieth configuration.)

According to another aspect of what is disclosed in the present description, a light-emitting element driving circuit device includes: a high-side transistor and a low-side transistor of which the main conducting paths are connected in series in the named order between a power terminal and a ground potential; a clock signal generator configured to generate a clock signal that drives the high-side and low-side transistors to turn them on and off complementarily; an inductor, a current sense resistor, and a capacitor connected in series between the common connection node of the high-side and low-side transistors and the ground potential and supplied with a current by a switching signal appearing at the common connection node; a light-emitting element connected to a voltage source appearing at one terminal of the capacitor; a first comparator configured to sense a voltage appearing across the terminals of the current sense resistor; a light-emitting element current sense circuit configured to sense the light-emitting element current passing through the current sense resistor; and a duration determining circuit configured to measure the duration of the high level or the low level in the switching signal. The light-emitting element driving circuit device gives out a notification as to whether the connection status of the light-emitting element is good or bad based on the comparator output signal from the first comparator and the output from the duration determining circuit. (A twenty-first configuration.)

In the light-emitting element driving circuit device of the twenty-first configuration described above, preferably, the current sense circuit includes: a second comparator configured to detect the bottom value of the light-emitting element current; and a third comparator configured to detect the peak value of the light-emitting element current. (A twenty-second configuration.)

In the light-emitting element driving circuit device of the twenty-first or twenty-second configuration described above, preferably, the duration determining circuit is a counter including a flip-flop. (A twenty-third configuration.)

In the light-emitting element driving circuit device of any of the twenty-first to twenty-third configurations described above, preferably, the duration determining circuit includes: an integrator configured to integrate the switching signal; and a comparator configured to compare the integrated voltage output from the integrator with a predetermined reference voltage. Preferably, the light-emitting element driving circuit device gives out the notification as to whether the connection status of the light-emitting element is good or bad based on the output from the comparator. (A twenty-fourth configuration.)

In the light-emitting element driving circuit device of any of the twenty-first to twenty-third configurations described above, preferably, the duration determining circuit includes a voltage-current converter configured to convert the switching signal into a current, and the light-emitting element driving circuit device gives out the notification as to whether the connection status of the light-emitting element is good or bad based on the output from the voltage-current converter. (A twenty-fifth configuration.)

In the light-emitting element driving circuit device of any of the twenty-first to twenty-fifth configurations described above, preferably, the first comparator has a first input terminal and a second input terminal, the first input terminal of the first comparator is fed with the voltage on the low-potential side of the current sense resistor, and the second input terminal of the first comparator is fed with the voltage resulting from subtracting a first threshold value from the voltage on the high-potential side of the current sense resistor. (A twenty-sixth configuration.)

In the light-emitting element driving circuit device of the twenty-sixth configuration described above, preferably, the first threshold value is set so as to be switched between a first threshold voltage and a second threshold voltage in synchronization with the switching signal, and the second threshold voltage is one digit or more higher than the first threshold voltage. (A twenty-seventh configuration.)

In the light-emitting element driving circuit device of the twenty-seventh configuration described above, preferably, the first threshold value is switched between the first and second threshold voltages in the period in which the first comparator detects the connection status of the light-emitting element being bad. (A twenty-eighth configuration.)

In the light-emitting element driving circuit device of the twenty-second configuration described above, preferably, the second comparator has a first input terminal and a second input terminal, the first input terminal of the second comparator is fed with the voltage resulting from adding a second threshold value to the voltage on the low-potential side of the current sense resistor, and the second input terminal of the second comparator is fed with the voltage on the high-potential side of the current sense resistor. (A twenty-ninth configuration.)

In the light-emitting element driving circuit device of the twenty-second configuration described above, preferably, the third comparator has a first input terminal and a second input terminal, the first input terminal of the third comparator is fed with the voltage on the high-potential side of the current sense resistor, and the second input terminal of the third comparator is fed with the voltage resulting from adding a third threshold value to the voltage on the low-potential side of the current sense resistor. (A thirtieth configuration.)

In the light-emitting element driving circuit device of the twenty-third configuration described above, preferably, the duty ratio $\alpha DH=DH/(DH+DL)$ of the high-level period DH to the low-level period DL of the switching signal is set such that $\alpha DH=0.950$ to $0.999$ when the counter has counted a predetermined time, and in the low-level period DL, the low-side transistor is turned on and the voltage appearing across the terminals of the current sense resistor is sensed. (A thirty-first configuration.)

In the light-emitting element driving circuit device of the thirty-first configuration described above, preferably, the counter includes a first counter, a second counter, and a third counter configured to operate based on combination signals generated by combining together frequency-divided signals resulting from dividing the frequency of the clock signal as an input signal. Preferably, the second counter is configured to count the high-level duration of the switching signal; the third counter is configured, when the second counter has counted a predetermined time, to set the period at which the switching signal repeats high and low levels; and the first counter is configured, when the period set by the third counter has occurred more than a predetermined times, to output a notification signal as to the connection status. (A thirty-second configuration.)

In the light-emitting element driving circuit device of the thirty-second configuration described above, preferably, when the times counted by the first, second, and third counters are represented by T1, T2, and T3 respectively, then T2<T3<T1. (A thirty-third configuration.)

In the light-emitting element driving circuit device of the thirty-third configuration described above, preferably, the times T1, T2, and T3 are 1.28 ms, 10 µs, and 80 µs respectively, and the period of the clock signal is 0.1 µs to 5 µs. (A thirty-fourth configuration.)

In the light-emitting element driving circuit device of any of the thirty-second to thirty-fourth configurations described above, preferably, in the period in which the first comparator detects the connection status of the light-emitting element being bad, open detection with respect to the light-emitting element is suspended during the period in which the high-side and low-side transistors shift from high level to low level and during the period in which the high-side and low-side transistors shift from low level to high level. (A thirty-fifth configuration.)

In the light-emitting element driving circuit device of any of the twenty-first to thirty-fifth configuration described above, preferably, the light-emitting element current is supplied from a switching regulator. (A thirty-sixth configuration.)

In the light-emitting element driving circuit device of the thirty-sixth configuration described above, preferably, the switching regulator is a synchronous-rectification switching regulator of one of a bucking type, a boosting type, and a boosting/bucking type. (A thirty-seventh configuration.)

In the light-emitting element driving control device according to any of the first to fourth and eleventh to fourteenth configurations described above, preferably, the light-emitting element driving control device is sealed in an HTSSOP (heat-sink thin shrink small outline package) or in a VQFN (very thin quad flat non-leaded package). (A thirty-eighth configuration.)

Preferably, the light-emitting element driving control device according to any of the first to fourth and eleventh to fourteenth configurations described above further includes: a buffer zone provided between high-withstand-voltage noise-system circuits including the driving logic circuit and low-signal-system circuits including the current sense comparator, and the buffer zone restrains noise propagation from the high-withstand-voltage noise-system circuits to the low-signal-system circuits. (A thirty-ninth configuration.)

In the light-emitting element driving control device according to the thirty-ninth configuration described above, preferably, the buffer zone is formed with an n-type well and a p-type collector wall each connected to a grounded terminal. (A fortieth configuration.)

In the light-emitting element driving control device according to the thirty-third or thirty-fourth configuration described above, preferably, a circuit element connected to the low-signal system is connected to a low-signal-system GND conductor separated from a power-system GND conductor. (A forty-first configuration.)

Further Modifications

While the embodiments described above deal with, as examples, configurations where light-emitting diodes (LEDs) are used as light-emitting elements, this is not meant to limit the present invention; instead, for example, organic EL (electroluminescence) elements can be used as light-emitting elements.

The various technical features disclosed in the present specification can be implemented in any other manner than in the embodiments described above, and allow for many modifications without departing from the spirit of the technical ingenuity involved. That is, the embodiments descried above should be understood to be in every aspect illustrative and not restrictive. The technical scope of the present invention is defined not by the description of the embodiments given above but by the appended claims, and should be understood to encompass any modifications made in a sense and scope equivalent to those of the claims.

INDUSTRIAL APPLICABILITY

The invention disclosed in the present description finds applications in, for example, vehicle-mounted exterior lights (such as DRL/position lights, turn lights, and taillights) and in matrix-controlled vehicle-mounted exterior lights (such as sequential turn lights, ADB headlights, and AFS (adaptive front-lighting system) headlights).

REFERENCE SIGNS LIST

1 LED light-emitting device
10 LED driving device (corresponding to a light-emitting element driving device)
20 LED string
21 to 25 LED (corresponding to a light-emitting element)
30 switch matrix
31 to 35 switch
40 switch controller
100 LED driving control device (corresponding to a light-emitting element driving control device)
100a semiconductor chip
100b, 100e island
100c, 100d, 100f, 100g, 100h, 100i support frame
101 reference voltage generator
102 constant voltage generator
103 oscillator
104 TSD circuit
105 VINUVLO circuit
106 VDRV5UVLO circuit
107 OCP circuit
108 LED short detector
109 LED open detector
110 BOOTVULO circuit
111 EN/PWM controller
112 control logic circuit
113 driving logic circuit (doubling as a level shifter)
114 current sense comparator
114a, 114b comparator
115 high-side driver
116 low-side driver
117 SG output circuit
118 DC dimmer
119 F/V converter
120 SSM circuit
121 error amplifier
122 detection value setter
122a, 122b current source
122c, 122d resistor
123 peak current adjuster (corresponding to a current adjuster)
130 semiconductor chip
210 integrated circuit
200, 200A light-emitting element driving circuit device
a1 high-withstand-voltage noise-system circuit
a2 low-signal-system circuit
a3 buffer zone
+B supply voltage
C1 to C9, C11, C12, CIN1 to CIN3 capacitor CL control logic circuit
COMP1 first comparator
COMP2 second comparator (LED current detection circuit)
COMP3 third comparator (LED current detection circuit)
COUNT1 first counter (duration determining means)
COUNT2 second counter (duration determining means)
COUNT3 third counter (duration determining means)
CSC LED current sense circuit
D1, D2, D11, D12 diode
DL driving logic circuit
DRVH high-side driver
DRVL low-side driver
GND1, GND2 external terminal (ground terminal)
GND ground potential
Ib bottom current
ILED LED current
Ip peak current
L1, L2, L3, LFIL1 inductor
LED light-emitting element
LOGIC logic circuit
M1 high-side transistor
M2 low-side transistor
N1, N2, N11, N12 N-channel MOS field-effect transistor
OSC clock signal oscillator
P1 to P16 pad
Q0 pnp-type bipolar transistor
Q1 parasitic transistor (npn-type bipolar transistor)
R1 to R5, R11 to R18 resistor
RA current sense resistor
RST reset signal
SC1 first combination signal
SC2 second combination signal
SC3 third combination signal
SCOUNT1 first count signal
SCOUNT2 second count signal
SCOUNT3 third count signal
SD1 first frequency-divided signal
SD2 second frequency-divided signal
SD3 third frequency-divided signal
SD4 fourth frequency-divided signal
SET set signal
SGC notifying means
Sopen open detection enable/disable signal
SOSC clock signal
Vb bottom value
VCP charge-pump voltage
VGH high-side gate signal
VGL low-side gate signal
VIN power terminal
VLED LED voltage
Vopen first threshold value
Vopen1 first threshold voltage
Vopen2 second threshold voltage
Vp peak value
VSG LED connection status notification flag signal
VSW switching signal
W1 to W16 wire
X10 vehicle
X11 headlight
X12 daylight running light
X13 taillight
X14 stoplight
X15 turn light
Y10 LED headlight module
Y20 LED turn light module
Y30 LED taillight module
α bootstrap power supply
β charge-pump power supply

The invention claimed is:

1. A light-emitting element driving circuit device comprising:
a high-side transistor and a low-side transistor of which main conducting paths are connected in series in named order between a power terminal and a ground potential;
a clock signal generator configured to generate a clock signal that drives the high-side and low-side transistors to turn them on and off complementarily;
an inductor, a current sense resistor, and a capacitor connected in series between a common connection node of the high-side and low-side transistors and the ground potential and supplied with a current by a switching signal appearing at the common connection node;
a light-emitting element connected to a voltage source appearing at one terminal of the capacitor;
a first comparator configured to sense a voltage appearing across terminals of the current sense resistor;
a light-emitting element current sense circuit configured to sense a light-emitting element current passing through the current sense resistor; and
a duration determining circuit configured to measure a duration of a high level or a low level in the switching signal,
wherein
the light-emitting element driving circuit device gives out a notification as to whether connection status of the light-emitting element is good or bad based on a comparator output signal from the first comparator and an output from the duration determining circuit.

2. The light-emitting element driving circuit device according to claim 1, wherein
the current sense circuit includes:
a second comparator configured to detect a bottom value of the light-emitting element current; and
a third comparator configured to detect a peak value of the light-emitting element current.

3. The light-emitting element driving circuit device according to claim 1, wherein
the duration determining circuit is a counter including a flip-flop.

4. The light-emitting element driving circuit device according to claim 1, wherein
the duration determining circuit includes:
an integrator configured to integrate the switching signal; and
a comparator configured to compare an integrated voltage output from the integrator with a predetermined reference voltage,
wherein
the light-emitting element driving circuit device gives out the notification as to whether the connection status of the light-emitting element is good or bad based on an output from the comparator.

5. The light-emitting element driving circuit device according to claim 1, wherein
the duration determining circuit includes a voltage-current converter configured to convert the switching signal into a current, and
the light-emitting element driving circuit device gives out the notification as to whether the connection status of the light-emitting element is good or bad based on an output from the voltage-current converter.

6. The light-emitting element driving circuit device according to claim 1, wherein
the first comparator has a first input terminal and a second input terminal,
the first input terminal of the first comparator is fed with a voltage on a low-potential side of the current sense resistor, and
the second input terminal of the first comparator is fed with a voltage resulting from subtracting a first threshold value from a voltage on a high-potential side of the current sense resistor.

7. The light-emitting element driving circuit device according to claim 6, wherein
the first threshold value is set so as to be switched between a first threshold voltage and a second threshold voltage in synchronization with the switching signal, and
the second threshold voltage is one digit or more higher than the first threshold voltage.

8. The light-emitting element driving circuit device according to claim 7, wherein
the first threshold value is switched between the first and second threshold voltages in a period in which the first comparator detects the connection status of the light-emitting element being bad.

9. The light-emitting element driving circuit device according to claim 2, wherein
the second comparator has a first input terminal and a second input terminal,
the first input terminal of the second comparator is fed with a voltage resulting from adding a second threshold value to a voltage on a low-potential side of the current sense resistor, and
the second input terminal of the second comparator is fed with a voltage on a high-potential side of the current sense resistor.

10. The light-emitting element driving circuit device according to claim 2, wherein
the third comparator has a first input terminal and a second input terminal,
the first input terminal of the third comparator is fed with a voltage on a high-potential side of the current sense resistor, and
the second input terminal of the third comparator is fed with a voltage resulting from adding a third threshold value to a voltage on a low-potential side of the current sense resistor.

11. The light-emitting element driving circuit device according to claim 3, wherein
a duty ratio αDH=DH/(DH+DL) of a high-level period DH to a low-level period DL of the switching signal is set such that αDH=0.950 to 0.999 when the counter has counted a predetermined time, and
in the low-level period DL, the low-side transistor is turned on and a voltage appearing across the terminals of the current sense resistor is sensed.

12. The light-emitting element driving circuit device according to claim 11, wherein
the counter includes a first counter, a second counter, and a third counter configured to operate based on combination signals generated by combining together frequency-divided signals resulting from dividing a frequency of the clock signal as an input signal,
the second counter is configured to count a high-level duration of the switching signal,
the third counter is configured, when the second counter has counted a predetermined time, to set a period at which the switching signal repeats high and low levels, and
the first counter is configured, when the period set by the third counter has occurred more than a predetermined times, to output a notification signal as to the connection status.

13. The light-emitting element driving circuit device according to claim 12, wherein
when times counted by the first, second, and third counters are represented by T1, T2, and T3 respectively, then T2<T3<T1.

14. The light-emitting element driving circuit device according to claim 13, wherein
the times T1, T2, and T3 are 1.28 ms, 10 μs, and 80 μs respectively, and a period of the clock signal is 0.1 μs to 5 μs.

15. The light-emitting element driving circuit device according to claim 12, wherein
in a period in which the first comparator detects the connection status of the light-emitting element being bad, open detection with respect to the light-emitting element is suspended during a period in which the high-side and low-side transistors shift from high level to low level and during a period in which the high-side and low-side transistors shift from low level to high level.

16. The light-emitting element driving circuit device according to claim 1, wherein
the light-emitting element current is supplied from a switching regulator.

17. The light-emitting element driving circuit device according to claim 16, wherein
the switching regulator is a synchronous-rectification switching regulator of one of a bucking type, a boosting type, and a boosting/bucking type.

* * * * *